(12) United States Patent
Vasel et al.

(10) Patent No.: US 6,543,365 B1
(45) Date of Patent: Apr. 8, 2003

(54) NON-LETHAL PROJECTILE SYSTEMS

(75) Inventors: Edward J. Vasel; Scott C. Nunan; Gregory A. Niederhaus, all of San Diego; Peter G. Coakley, Cardiff; Eric Wenaas, Del Mar; Roger Behrendt, Olivenhain, all of CA (US)

(73) Assignee: Jaycor Tactical Systems, Inc., San Diego, CA (US)

( * ) Notice: Subject to any disclaimer, the term of this patent is extended or adjusted under 35 U.S.C. 154(b) by 0 days.

(21) Appl. No.: 09/543,289

(22) Filed: Apr. 5, 2000

Related U.S. Application Data

(63) Continuation-in-part of application No. 09/289,258, filed on Apr. 9, 1999, now Pat. No. 6,393,992, which is a continuation-in-part of application No. 08/751,709, filed on Nov. 18, 1996, now Pat. No. 5,965,839.

(51) Int. Cl.[7] ............................................. F42B 12/46
(52) U.S. Cl. ..................... 102/502; 102/367; 102/370; 102/517; 102/529; 102/473; 102/577
(58) Field of Search .................... 102/367, 37, 395, 102/444, 498, 501, 502, 513, 517, 529; 42/1.08; 473/577; 86/20.14

(56) References Cited

U.S. PATENT DOCUMENTS

| | | | |
|---|---|---|---|
| 1,517,554 A | 12/1924 | Fulcher | 102/370 |
| 2,112,758 A | 3/1938 | Blacker | 102/23 |
| 3,419,274 A | 12/1968 | Tabor | 102/517 |
| 3,528,662 A | 9/1970 | Merchant et al. | 273/106.5 |
| 3,650,213 A | 3/1972 | Abbott et al. | 102/444 |
| 3,707,793 A | 1/1973 | Holton, II | 42/1 G |
| 3,765,116 A | 10/1973 | Zaid | 42/89 |
| 3,791,303 A | 2/1974 | Sweeney et al. | 102/502 |
| 3,865,038 A | 2/1975 | Barr | 102/502 |
| 3,895,579 A | 7/1975 | Gawlick et al. | 102/65.2 |
| 3,898,932 A | 8/1975 | Flateau et al. | 102/66 |
| 3,921,614 A | 11/1975 | Fogelgren | 124/30 R |
| 4,153,927 A | 5/1979 | Owens | 362/99 |
| 4,352,316 A | 10/1982 | Medlin | 89/36 A |
| 4,449,474 A | 5/1984 | Mariol | 116/2 |
| 4,560,168 A | 12/1985 | Aoyama | 273/232 |
| 4,686,905 A | 8/1987 | Szabo | 102/444 |
| 4,856,218 A | 8/1989 | Reynolds, Jr. | 42/103 |
| 4,895,076 A | 1/1990 | Looger et al. | 102/439 |
| 4,899,660 A | 2/1990 | Brighton | 102/447 |
| 4,979,747 A | 12/1990 | Jonkouski | 273/232 |
| 5,001,880 A | 3/1991 | Smith | 53/453 |
| 5,009,164 A | 4/1991 | Grinberg | 102/502 |
| 5,018,450 A | 5/1991 | Smith | 102/513 |
| 5,035,183 A | 7/1991 | Luxton | 102/502 |
| 5,078,117 A | 1/1992 | Cover | 124/71 |
| 5,217,708 A | 6/1993 | Pinkney | 424/45 |
| 5,221,809 A | 6/1993 | Cuadros | 102/439 |

(List continued on next page.)

FOREIGN PATENT DOCUMENTS

| | | | | |
|---|---|---|---|---|
| DE | 4321041 | 1/1995 | | 102/502 |
| WO | 9428371 | 12/1994 | | 102/502 |

*Primary Examiner*—Harold J. Tudor
(74) *Attorney, Agent, or Firm*—Fitch, Even, Tabin & Flannery

(57) ABSTRACT

A non-lethal projectile system for non-lethally inhibiting a living target, multi-functional launching devices for delivering the non-lethal projectile systems to a target, methods of assembling the non-lethal projectiles, and tactical methods of the use of the non-lethal projectile, the non-lethal projectile consists of a projectile body to be impacted with a living target and an inhibiting substance within the projectile body, wherein upon impact with the target, the inhibiting substance is dispersed on and about the target. In a variation, the projectile body ruptures upon impact releasing the substance. In another variation, the inhibiting substance is a powdered substance comprising a powdered pepper derived substance, for example, oleoresin capsicum or capsaicin.

13 Claims, 24 Drawing Sheets

U.S. PATENT DOCUMENTS

| | | |
|---|---|---|
| 5,254,379 A | 10/1993 | Kotsiopoulos et al. ...... 428/35.7 |
| 5,353,712 A | 10/1994 | Olson .......................... 102/502 |
| 5,361,700 A | 11/1994 | Carbone ...................... 102/439 |
| 5,402,729 A | 4/1995 | Richert ........................ 102/502 |
| 5,450,795 A | 9/1995 | Adelman ..................... 102/444 |
| 5,529,215 A | 6/1996 | Banks et al. ................. 222/113 |
| 5,565,649 A | 10/1996 | Tougeron et al. ........... 102/502 |
| 5,620,704 A | 4/1997 | Cade et al. .................. 424/456 |
| 5,639,526 A | 6/1997 | Kotsiopoulos et al. ...... 102/502 |
| 5,640,945 A | 6/1997 | Slonaker et al. .............. 124/56 |
| 5,671,559 A | 9/1997 | Ludaesher et al. ........... 42/1.08 |
| 5,750,918 A | 5/1998 | Mangolds et al. .......... 102/502 |
| 5,791,327 A * | 8/1998 | Riggs et al. ................... 124/71 |
| 5,821,450 A | 10/1998 | Fedida ....................... 102/370 |
| 5,965,839 A * | 10/1999 | Vasel et al. ................. 102/502 |
| 6,145,441 A | 11/2000 | Woodall et al. |
| 6,223,658 B1 | 5/2001 | Rosa et al. |
| 6,230,630 B1 | 5/2001 | Gibson et al. |
| 6,302,028 B1 * | 10/2001 | Guillat-Ulmann et al. .. 102/502 |

\* cited by examiner

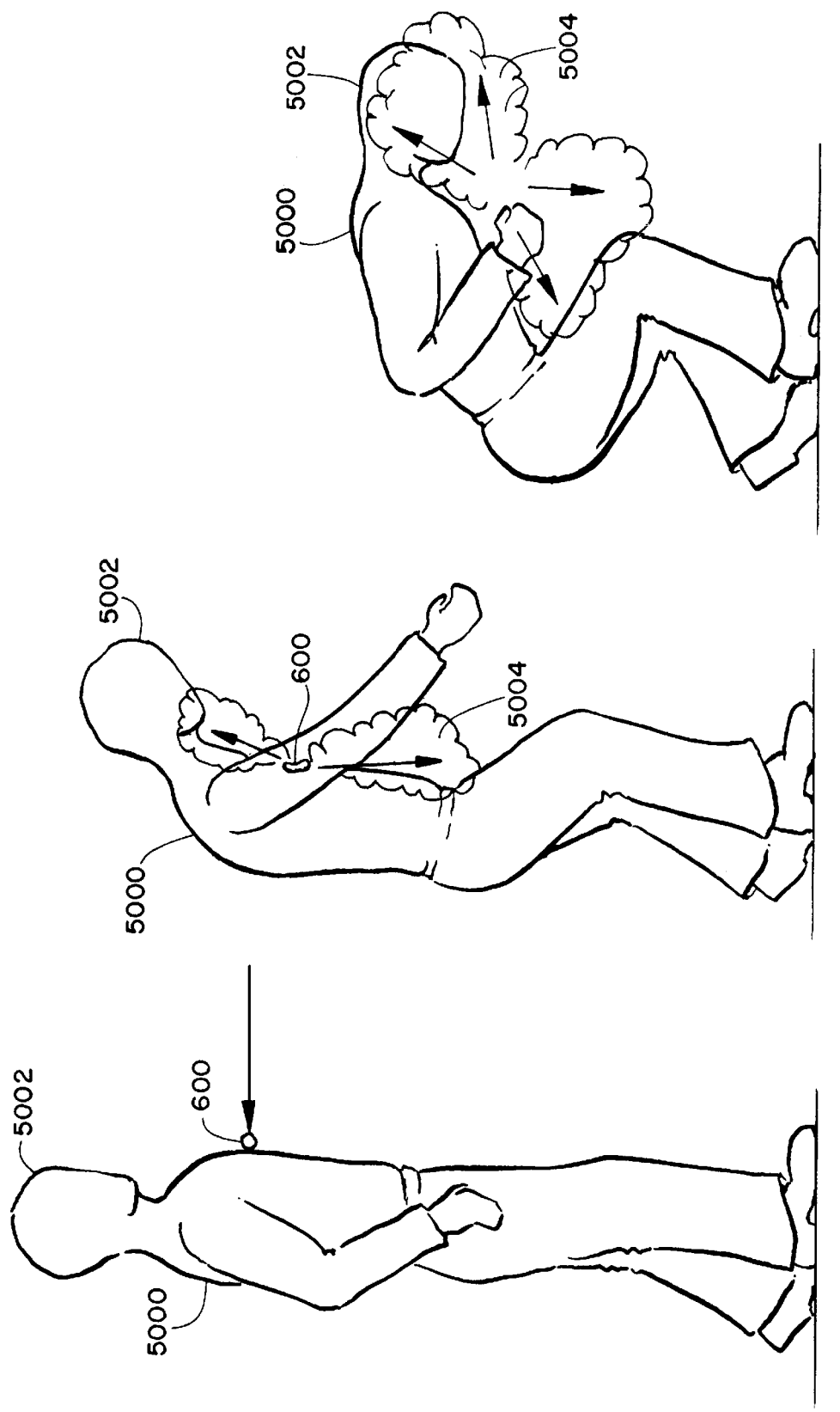

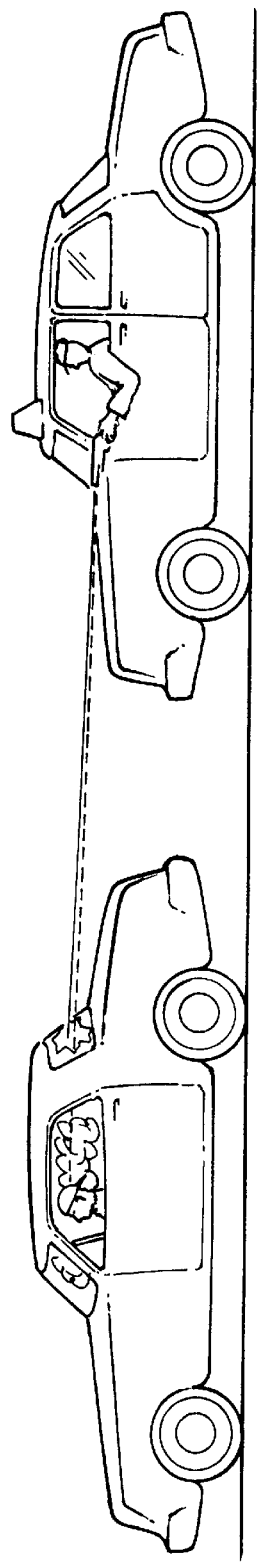
FIG. 30
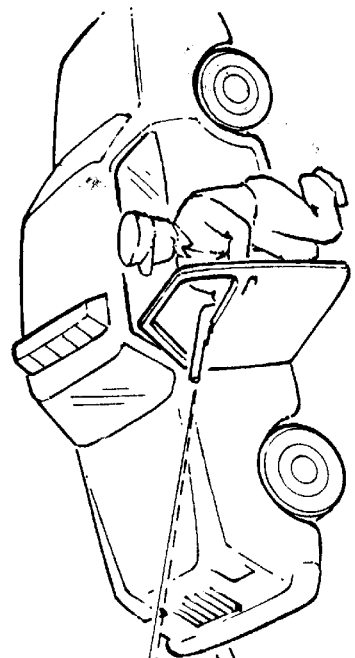
FIG. 31A
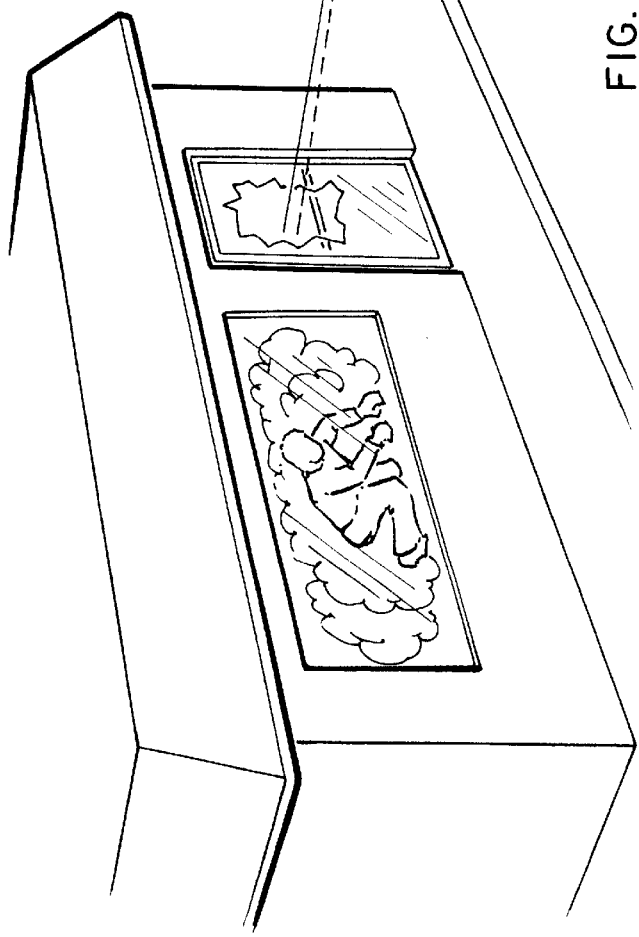

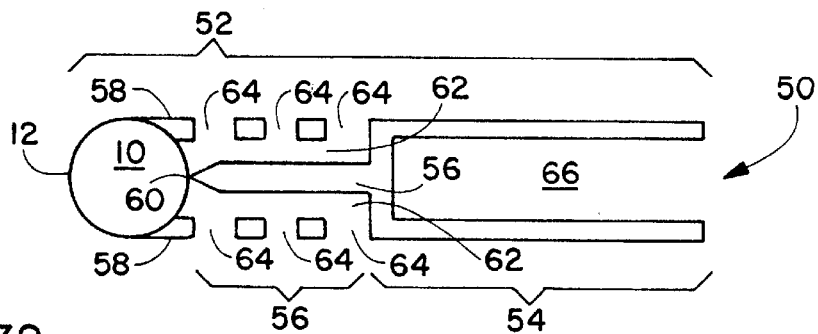
FIG. 32
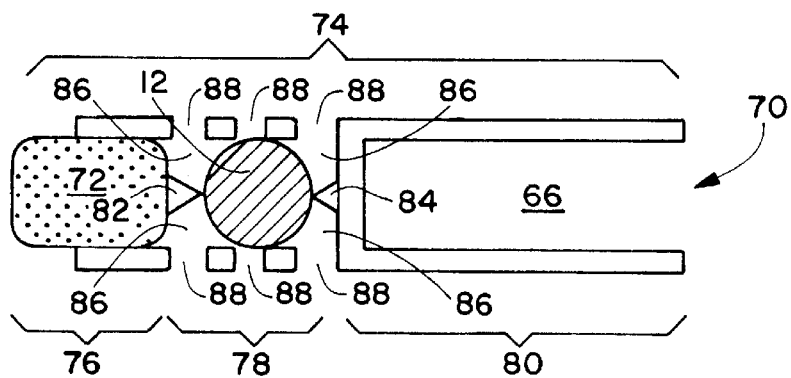
FIG. 33
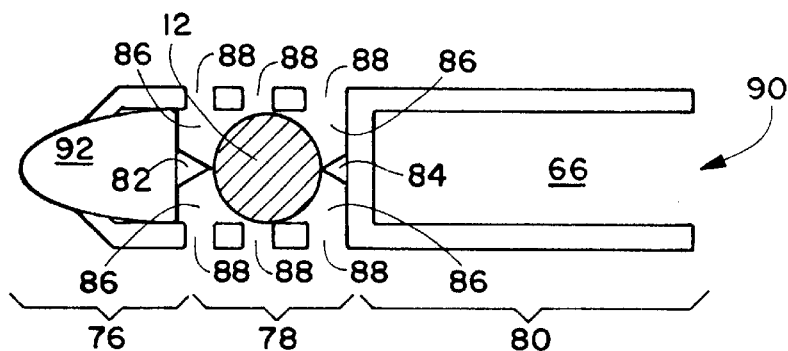
FIG. 34
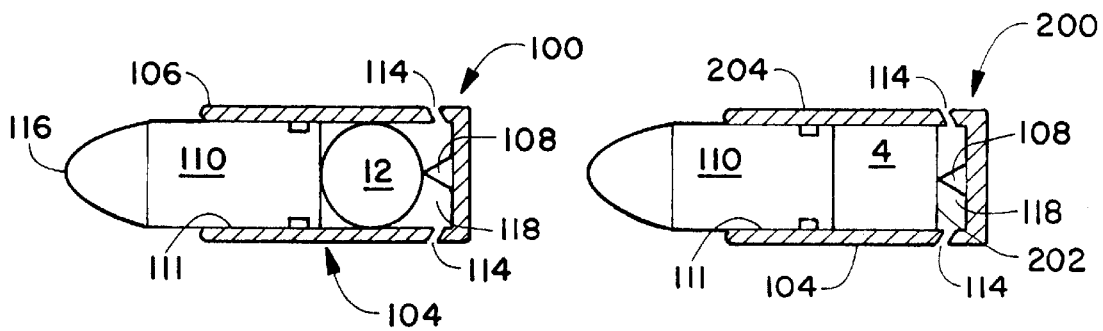
FIG. 35
FIG. 36

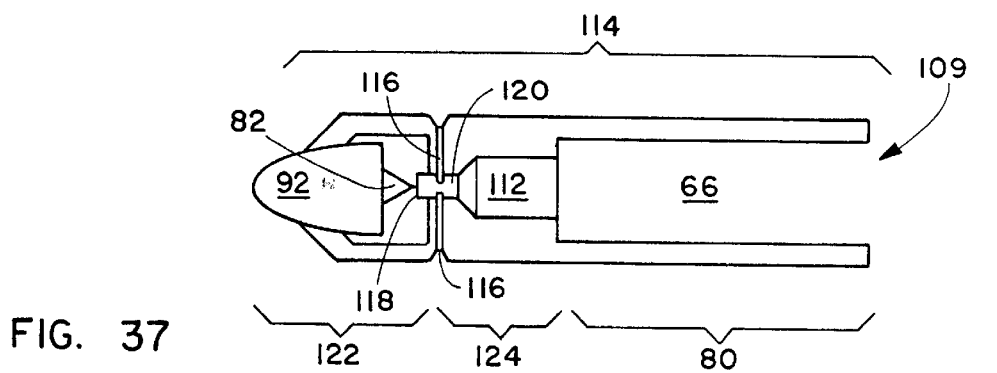
FIG. 37
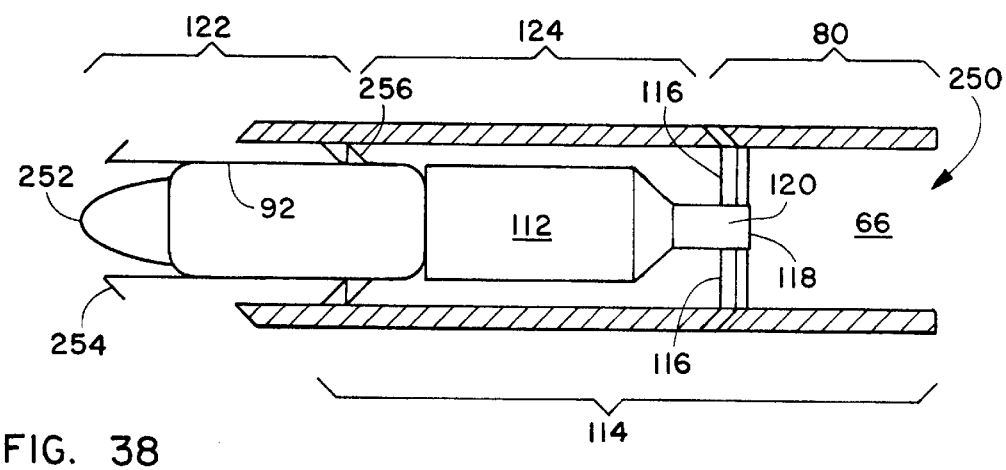
FIG. 38
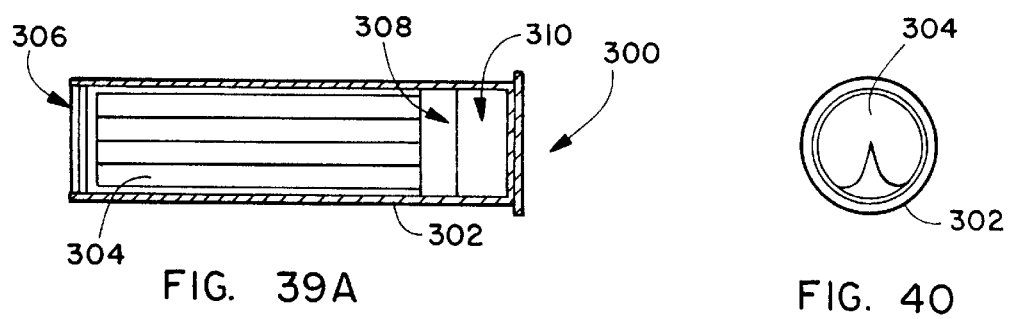
FIG. 39A
FIG. 39B
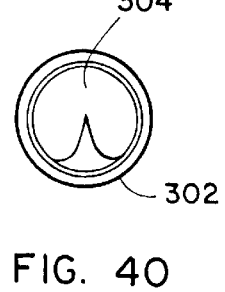
FIG. 40

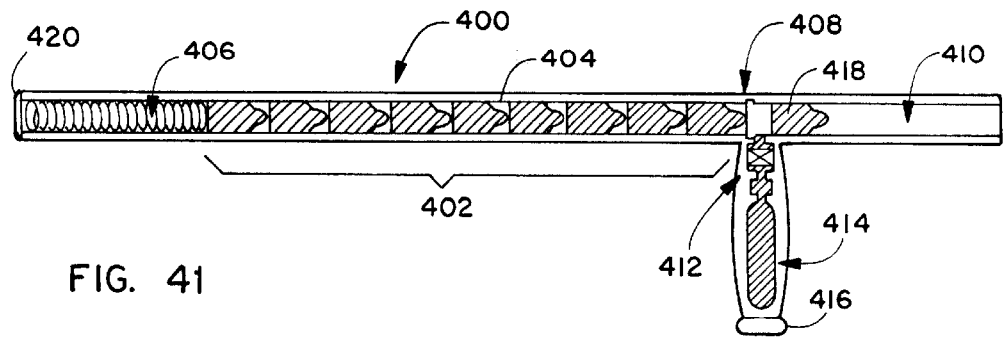
FIG. 41
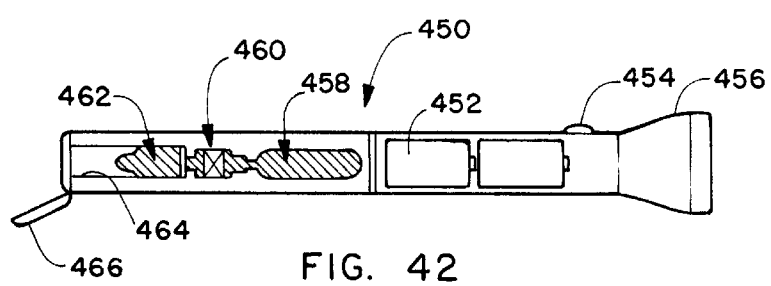
FIG. 42
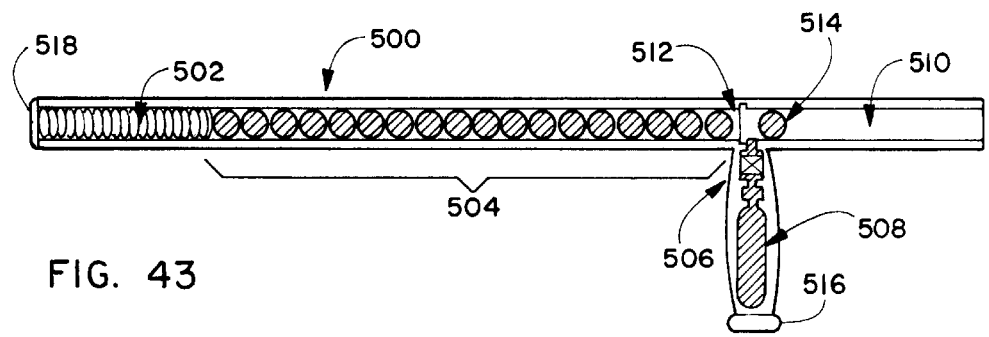
FIG. 43
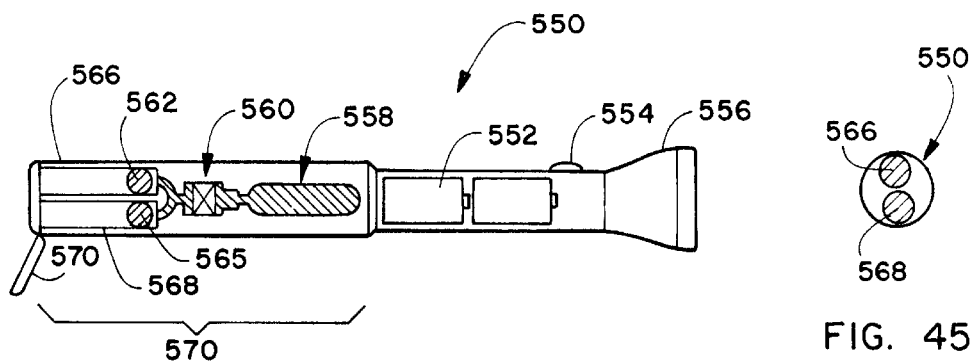
FIG. 44
FIG. 45

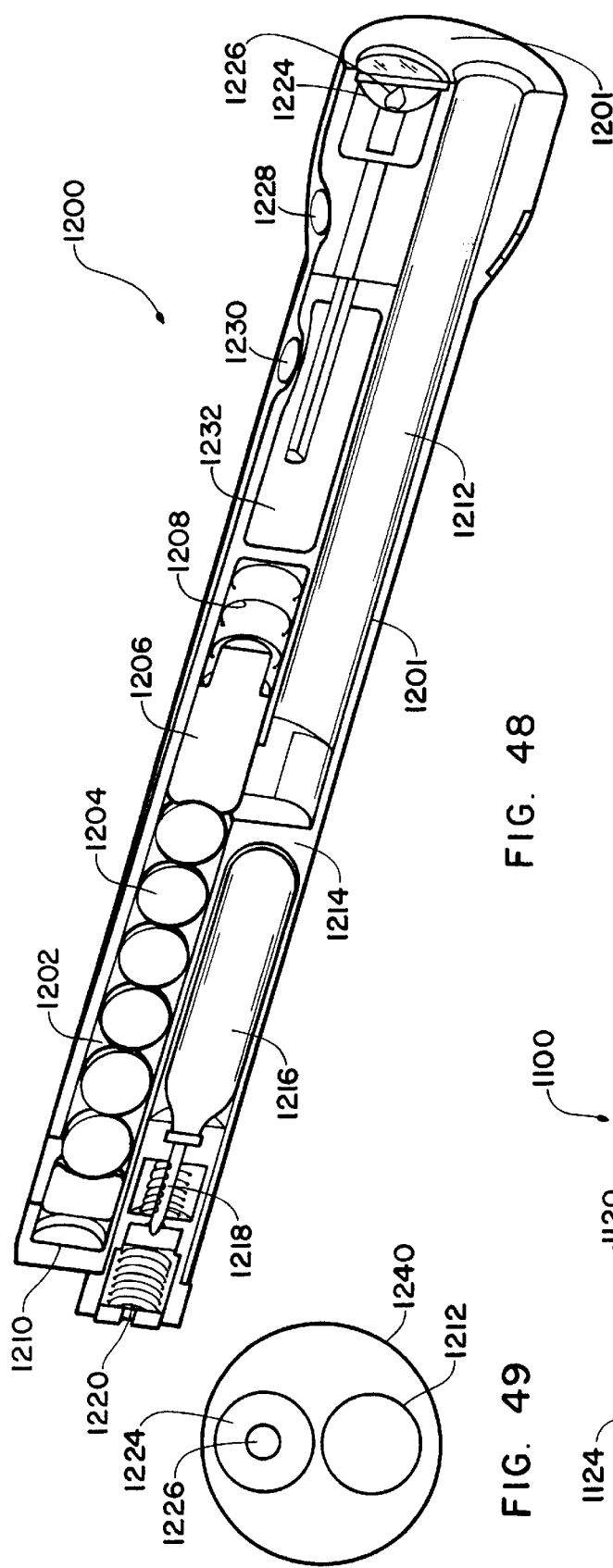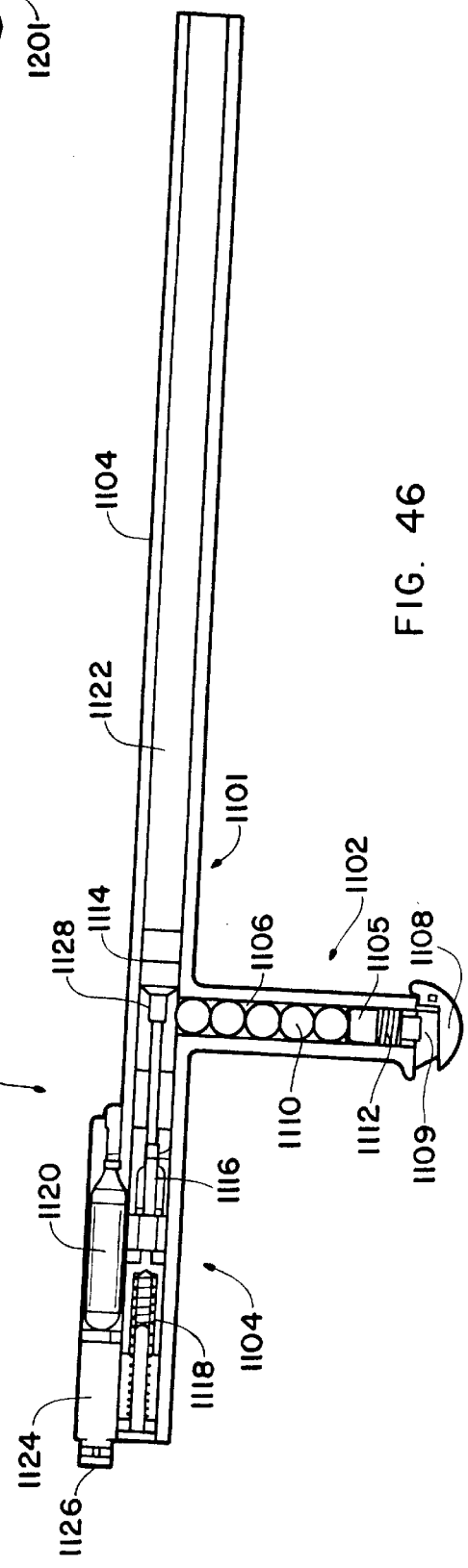

NON-LETHAL PROJECTILE SYSTEMS

This application is a Continuation-In-Part (CIP) of U.S. Ser. No. 09/289,258, filed Apr. 9, 1999, entitled "NON-LETHAL PROJECTILE FOR DELIVERING AN INHIBITING SUBSTANCE TO A LIVING TARGET", now U.S. Pat. No. 6,393,992, which is a Continuation-In-Part (CIP) of U.S. Ser. No. 08/751,709, filed Nov. 18, 1996, entitled "NON-LETHAL PROJECTILE FOR DELIVERING AN INHIBITING SUBSTANCE TO A LIVING TARGET", now U.S. Pat. No. 5,965,839, the entirety of which application and patent (as issued, as filed, and as amended during pendency) are hereby incorporated by reference.

BACKGROUND OF THE INVENTION

The present invention relates to a non-lethal projectile systems and launching devices and, more specifically to non-lethal projectiles that deliver an inhibiting and/or marking substance to a target, especially a living target. Even more specifically, the present invention relates to non-lethal projectile systems including a projectile body, most preferably a generally spherical projectile body, containing an inhibiting and/or marking substance, multi-functional launching devices for launching the projectile systems the incorporate other utilitarian functions within the device, methods of making such non-lethal projectile systems, and tactical methods for using the non-lethal projectile systems in combination with a launch device that delivers the non-lethal projectile systems in order to most effectively inhibit, impair, repel or disable the living target in a less-than-lethal way.

Steadily rising crime rates have led to an increased need for technologically enhanced crime devices. Furthermore, excessive use of force claims against law enforcement have increased as the public is becoming more aware of and sensitive to the use of lethal force, typically by law enforcement officials, in situations where lethal force may not be required, such as in situations where suspects are armed with non-lethal objects, such as sticks, rocks, or screwdrivers. There is particularly a need for non-lethal devices that are capable of at least temporarily incapacitating, slowing, repelling or inhibiting a suspected criminal and/or marking such individuals for later identification. As populations increase, the risk that a criminal will be surrounded by or in close proximity to innocent persons when officers are trying to subdue him/her also increases without the application of lethal force. Whereas non-permanently injuring an innocent bystander, while subduing a suspected criminal, is acceptable, killing the bystander is not. Thus, there is great need for non-lethal (or less-than-lethal), highly effective weapons that may be used by officers and others to slow, stop, repel and/or mark criminals. Presently available, non-lethal devices include, for example, stun guns, mace, tear gas, and liquid pepper spray devices that impair the vision, breathing or other physical or mental capabilities of the target.

One attempt to provide a non-lethal device for delivering an inhibiting substance is shown in U.S. Pat. No. 3,921,614, issued to Fogelgren for a COMPRESSED GAS OPERATED GUN HAVING VARIABLE UPPER AND LOWER PRESSURE LIMITS OF OPERATION, which patent is incorporated herein by reference in its entirety. Fogelgren describes a gas-operated gun and associated projectiles. In one illustrated embodiment, a projectile consists of a projectile casing that houses a structure in which a firing pin is situated so as to detonate a primary charge upon impact of the projectile with a target. Deterioration of the primary charge causes the expulsion of a load carried in a load chamber. The load chamber may contain various types of load, such as tear gas, dye, flash-powder or wadding.

Another embodiment illustrated in the Fogelgren patent consists of a projectile casing that encloses a body member, which, together with a frontal member, defines a load chamber. The body member and the frontal member are attached so as to be readily separable in flight to enable the load to escape from the load chamber and to proceed to the desired target. In this embodiment, the load is buckshot or plastic pellets.

A further embodiment of the projectile shown by Fogelgren stores a portion of a compressed gas, utilized to expel the projectile, to be used to expel a load upon striking a target. Upon firing, an outer body member separates from an inner body member thereby exposing and releasing a holding pin, which holding pin prevents premature release of the projectile's load. Apertures, from which the load is expelled upon impact, are sealed with wax to prevent expulsion of the load before the projectile impacts the target. The portion of the compressed gas used to expel the load is stored in a rear chamber of the projectile during flight, while the load is stored in a forward chamber. When the projectile strikes the target, the compressed gas is released, forcing the load through the apertures and out of the projectile.

An additional embodiment of the projectile shown by Fogelgren consists of outer members that form a container into which is fitted a breakable glass vile. Rearward of the breakable vile, padding is provided to prevent breakage of the vile upon firing of the projectile. Forward of the vile is a firing pin assembly against which the breakable vile impacts, as it shifts forward within the members forming the container, upon impact. As with the above embodiment, a holding pin, which normally prevents the breakable vial from shifting forward in the container, is expelled as an outer body member separates from an inner body member. This allows the breakable vial to shift forward upon impact, shattering the breakable glass vial against the firing pin. The breakable vile contains a load to be delivered to the target, which is delivered through apertures near the front of the projectile upon the shattering of the breakable glass vial. The vile may be charged with a compressed gas so as to provide a charged load.

Disadvantageously, the projectiles described by Fogelgren, particularly those projectiles described that would be suitable for delivering loads such as tear gas or dye, are complicated and expensive to manufacture. The embodiment employing pressurized gas to both expel the projectile and to expel the load upon impact with the target requires a great amount of pressurized gas, that is, a sufficient quantity to both fire the projectile and to provide the portion of pressurized gas necessary to ensure expulsion of the load. In addition, such embodiment requires complicated and tedious methods to manufacture components such as a microminiature ball valve (through which the portion of the pressurized gas enters the rear chamber upon firing), wax sealer within each of the plurality of apertures and a holding pin that must fall away from the projectile in flight.

The embodiment employing the breakable glass vial is also complicated to manufacture, because it also employs a holding pin that must fall away during the flight of the projectile and employs numerous structures that must be precisely fitted together to allow them to separate during firing and in flight. This embodiment also must be carefully handled so that the breakable glass vial does not shatter while being handled by the user. This can be particularly problematic, for example, when the Fogelgren device is being used by a police officer in pursuit of a fleeing criminal (or when used by a police officer threatened by a suspected criminal). Thus, significant room for improvement still exists in the development of non-lethal projectiles.

Another approach to providing non-lethal projectiles for delivering an inhibiting substance to a living target is suggested in passing in U.S. Pat. No. 5,254,379, issued to Kotsiopoulos, et al., for a PAINT BALL, which patent is hereby incorporated herein by reference in its entirety. The Kotsiopoulos, et al., device is directed primarily to a paint ball projectile for delivering a load (or blob) of paint to a target, and for expelling the blob of paint onto the target upon impact, and is to be used primarily for paint ball sporting games. The paint ball shown by Kotsiopoulos, et al. consists of a shell that fractures upon impact with a target. Additionally, the Kotsiopoulos, et al. disclosure includes a only passing reference to the use of such a paint ball for delivering dyes, smoke or tear gas to a target; however, provides no mechanism for dispersing an inhibiting load upon explosion of the projectile, which is important for a non-lethal inhibiting projectile to be effective. Specifically, when the Kotsiopoulos, et al. projectile impacts the target, by-design, the load is dispersed rather locally. Thus, even if one skilled in the art were to act upon the passing reference to using tear gas in the Kotsiopoulos, et al. patent, the present inventors believe that such a device would be generally ineffective because the tear gas would not be dispersed to the target's face, where it needs to be to be effective. Furthermore, as Kotsiopoulos, et al. is an unpressurized projectile, the amount of tear gas delivered would necessarily be limited to an unpressurized volume having dimensions of a paint ball. Additionally, the Kotsiopoulos, et al., reference does not describe any details about the specific type of tear gas, how to fill the paint ball with the tear gas, or any techniques to adequately disperse the tear gas upon impact with the target.

To elaborate on the importance of localized dispersion of loads carried by the Kotsiopoulos et al. projectile, Kotsiopoulos, et al. describe a device for delivering a blob of paint to a target dictating a relatively confined dispersion, i.e., a blob of about 3 to 6 or 8 inches in diameter on the target. This limited amount of dispersed paint in the context in which the Kotsiopoulos, et al., device is used (as a paint ball) would be ineffective as a non-lethal device unless the target was hit near the eyes in order to blind a target. However, such a direct hit in the eyes or face could prove dangerous to the target. In contrast, for applications where an inhibiting substance is to be delivered using the paint ball of Kotsiopoulos et al., wide dispersion is not only desired but extremely important, particularly when the projectile impacts the target with force, and the inhibiting substance (e.g. a tear gas) must be taken in through facial openings in order to be effective. Since the device of Kotsiopoulos et al., has a low dispersion, the device would require an impact at or very near the facial openings. Because firing even a non-lethal or less-than-lethal projectile at or within a few inches of a target's face is extremely dangerous, potentially causing permanent injury or death, which is, of course, contrary to the objective of non-lethal projectiles, devices such as those suggested by the teachings of Kotsiopoulos, et al., would be considered undesirable by those of skill in the art to achieve a non-lethal inhibition of a target.

Still other non-lethal projectiles are described, for example, in U.S. Pat. Nos. 5,009,164, issued to Grinberg (Apr. 23, 1991), U.S. Pat. No. 5,221,809 issued to Cuadros (Jun. 22, 1993) and U.S. Pat. No. 5,565,649, issued to Tougeron, et al. (Oct. 15, 1996), each of which is hereby incorporated by reference in its entirety. Grinberg describes a projectile that changes its shape upon impact with a target, thereby reducing the danger of penetration into a live target. For example, Grinberg uses a double leaf construction to facilitate rupture of the projectile upon impact. Cuadros describes a projectile that increases in size either during flight or upon impact to spread its force over a large area to provide a knock-down effect without body penetration, and Tougeron, et al., describe a self-propelled projectile intended to deliver an active substance to a living target. While each of the devices described by these patents attempts to provide a projectile that may be used to stop or slow a living target without causing lethal injury, all of the devices have proven to be less than ideal and some have even proven to be fatal when fired at close range to the target. They are complicated and expensive to manufacture, and they are variously difficult to use and unreliably effective. As a result of these problems and others, there is no widely commercially accepted non-lethal projectile in use by law enforcement or military personnel today that delivers an inhibiting substance to a target.

A significant disadvantage to the prior art devices is that none takes into consideration the need to deliver an inhibiting (or active) substance under fairly precise dispersal conditions to insure effectiveness thereof. When a target is impacted with a projectile delivering a substance thereto, to be maximally effective, the substance should disperse in a generally radial manner (or transverse to the motion of the projectile) such that the target's face is quickly and fully contacted thereby. At the same time, the projectile should, most desirably, be able to be aimed with a degree of precision so as to be able to avoid hitting the target in, for example, the face. At the same time, the dispersion of the inhibiting substance must be sufficient that, for example, a projectile impacting on a target's chest delivers inhibiting substance to the target's face where it can be effective. Unfortunately, prior art projectiles, not only rarely contemplate these problems, but also frequently fail to provide for dispersal of the inhibiting substance to a target's face after impacting the target at a remote area. Specifically, for example, while powdered inhibiting substances, in the view of the inventors, offer distinct advantages over the vast majority of prior art devices that deliver inhibiting substances to a target, no commercially viable device known to the inventors has ever been produced that addresses the problem of both accurately delivering the projectile to the target at a location remote from the target's face, and dispersing a powdered inhibiting substance in a cloud-like, radial manner so as to assure that the powdered inhibiting substance reaches the target's face. Yet, there remains a significant commercial market and tactical advantage to a non-lethal or less-than-lethal projectile that can be accurately delivered to a target, impacting the target in an area other than the target's face, while at the same time providing dispersal of a powdered inhibiting substance to the target's face, where it is effective. Unfortunately, using devices heretofore known to the inventors, targets are often able to escape and/or minimize their exposure to the delivered substance.

A further disadvantage to most non-lethal weapons heretofore known is that they either operate at close ranges, for example, pepper spray canisters, or operate at long ranges, for example, rubber bullet devices, but do not operate at both close and long ranges. The inventors are not aware of any prior devices that are both sufficiently safe to be used at close range and, at the same time, effective at longer ranges, such as 10 feet or more, e.g., 20 or 30 feet or more. In particular, the close range weapons are generally not deployed with sufficient force to travel further than a few meters, and the longer range weapons generally are not "muzzle safe" in that they cannot be safely deployed at very short distances because of the chemical/explosive nature of the launching mechanism. Thus, presently, law enforcement and military personnel are required to employ two different technologies, one for close range applications, and another for long range applications. At the same time, the advantages of using a single device for both applications are numerous, and readily apparent. For example, cost is a significant factor recognized universally by governmental agencies, but perhaps even more importantly is a tactical disadvantage imposed by the use of both short range and long range non-lethal or less-than-lethal technologies. Specifically, all technologies known to the present inventors require that a user make a decision as to whether a particular situation calls for a short range non-lethal technology or a long range non-lethal technology. This requires not only spending time to assess a situation in order to determine whether non-lethal or lethal technology should be employed, but also requires expenditure of more time determining which non-lethal technology is appropriate, that is whether the situation calls for short-range technology or long-range technology. As a result, non-lethal and less-than-lethal projectiles are rarely used by law enforcement and military personnel, and, when used, are generally used only in situations where sufficient time exists for the user to make the chain of decisions necessary to first select non-lethal technology and second, to select what range of non-lethal technology is appropriate. Furthermore, most non-lethal technologies are "single shot" devices that require may time and effort to reload the device, reducing the effectiveness of the non-lethal device and the reducing the users decision to employ the non-lethal device over traditional lethal devices.

Cost becomes an important consideration in these tactical issues as well. Because two types of non-lethal technology must, using heretofore known technology, be available, many, if not most, law enforcement and military agencies cannot afford to fully equip their personnel. This cost constraint is further exacerbated because heretofore available non-lethal technologies, at least the ones that are effective, and thus actually useable, are complicated and highly specialized and most non-lethal devices do not offer a low-cost inert training version. Thus, training is costly and therefore, use is infrequent. As a result, even if currently available technologies could be used at both short and long ranges (thus presumably providing tactical and cost advantages), the actual costs of currently available devices is still prohibitive and therefore dictates only limited deployment.

Furthermore, there are currently, no effective projectile systems available on the market for delivering powdered substances to a living target. One reason for this unavailability is that such heretofore contemplated projectile systems are difficult to manufacture or are ineffective. While dispensing a powdered substance into a cup is straightforward, dispensing the substance into two parts of an apparatus that must subsequently be sealingly joined together, without loss of any of the powdered substance, is not so straightforward. Kotsiopoulos, et al., for example, show completely filling their paint ball through a small hole using a capillary. Such an approach, however, cannot be used to fill the Kotsiopoulos, et al. device with a powder, as it is known that powder generally cannot be conducted through a capillary as can a liquid or gas. This manufacturing difficulty combined with the aforementioned difficulties in insuring adequate dispersal of the substance, especially powdered substances, has prevented manufacturers of non-lethal projectile systems from entering the market with powder-filled devices. Today, to the knowledge of the present inventors, there is no heretofore commercially viable, non-lethal or less-than-lethal projectile for delivering a powdered inhibiting substance to a target. While powdered inhibiting substances are known, there is presently no delivery mechanism available for accurately delivering and dispersing such an inhibiting substance in a non-lethal, short or long range manner.

Finally, an additional problem faced, in particular with law enforcement personnel, is that an officer essentially becomes "bogged down" with too many physical devices. For example, an officer may carry a short range weapon (e.g. pistol), a long range weapon (e.g. rifle), a "baton", a radio, a flashlight, an inhibiting spray canister and a non-lethal device as taught by the prior art above. Disadvantageously, the officer must carry all of these items on his or her person in order to be ready for a variety of situations. Due to size considerations of the various devices and the available real estate, it is very difficult to fit all of these types of devices on the officer's person, on a belt, for example. The devices simply take up too much physical space. Such an assortment of devices may actually bog down the officer such that the officer will not be able to move as quickly if pursuing a suspect, or the officer will be delayed in selecting the appropriate device to use. The reality is that an officer typically does not have much time to "sort through" such a variety of devices in order to select the appropriate weapon or device needed. What is needed is a multi-functional non-lethal projectile launching device that increases the available real estate on an officer's belt by incorporating the functionality of several other devices within its physical structure.

An example of a prior art attempt at combining multiple devices into a single integrated unit is shown in U.S. Pat. No. 4,153,927, issued to Owens for a "MULTI-FUNCTION CLIPBOARD APPARATUS, which patent is incorporated herein by reference in its entirety. Owens teaches a clipboard for police officers to write tickets, and includes a built in flashlight, a gun that can fire a bullet or a tear gas cartridge, a camera, and can act as a shield against projectiles. Such a device, in the form of a clipboard would not be practical for law enforcement officers other than in the standard traffic stop to issue a ticket. The clipboard would not be useful to an officer conducting a drug raid or pursuing a suspect, since the clipboard itself is bulky and not conducive to fitting on the belt of an officer.

Thus, as will be appreciated by those of skill in the art, significant improvements are needed in non-lethal projectiles for delivering inhibiting and/or marking substances to targets, especially to living targets. For example, muzzle safe projectile systems that provide optimum dispersal of the substances contained therein are desirable. Further, projectile systems that may be readily incorporated into existing officer training programs would be advantageous, as such systems would insure that officers could be quickly, cost effectively, and easily trained in the use of the system, which, in turn would be of particular advantage to the officer when attempting to use the system under stressful situations, as would normally be the case. Also, projectile systems that incorporate other utilitarian functions, e.g. a flashlight or club, into their basic structure would be advantageous, since they would increase the real estate available on an officer's belt. Additionally, non-lethal projectile systems designed to impact a living target in such a way as to actually facilitate the effectiveness of the system are desirable, as are methods of employing such projectile systems to maximize effectiveness thereof.

SUMMARY OF THE INVENTION

The present invention advantageously addresses the above-identified needs, as well as other needs, by providing a non-lethal or less-than-lethal projectile system for delivering a substance to a target, especially a living target, such as a human or animal target, wherein the projectile system is specially designed to maximize its effectiveness by providing a kinetic impact against the target at a first location on or near the target combined with optimum dispersal of the substance on and/or about the target at a second location. The projectile systems of the present invention provide an improved mechanism for delivering the inhibiting substance to the target's face, without requiring that the projectile impact the target's face, or even the target at all, due to a non-local dispersal or atomization of the inhibiting substance in a "cloud" that may envelop the target. Further, the projectile system is designed such that deployment facilitates its effectiveness by creating sufficient force, upon impact with the target, to cause the target to move his, her or its face into the dispersing substance, while at the same time experiencing impairment, or temporary disability as a result of the impact. Specifically, the non-lethal projectiles are able to be launched with sufficient non-lethal force to immediately slow and/or stop a moving target, before the inhibiting substance carried thereby affects the target. Thus, a synergism is created between the stunning effect and the inhibiting effect of the inhibiting substance, such that the net result of the stunning and the inhibiting is greater than each effect separately. Additionally, the projectile systems of the present invention are easier and cheaper to manufacture than heretofore known projectiles, are effective at safer, stand-off distances as well as at close range distances, are easily integrated into normal officer training programs, and can be used with conventional, as well as custom multi-functional, launching devices.

In one aspect, the projectile system employs an inhibiting/impairing substance and/or a marking substance, such as a colored dye or chemical compound having a particularly offensive odor (i.e. malodorant), to slow/stop, repel and/or mark for identification (either by a dye or through attendant bruising of the target as a result of the kinetic impact), a living target. In another aspect, the projectile system includes a projectile body, for example, a capsule, filled to greater than 50%, preferably to 75% to 99%, more preferably to 85% to 95% and most preferably to about 90% to 95%, of its volume with an inhibiting/impairing substance and/or marking substance and/or inert substance, such that upon impact with a target, the substance is radially (or transversely to the motion of the projectile system) dispersed on and/or about the target. In a still further aspect, the present invention provides a projectile system that operates by impacting a living target with sufficient force to cause the target to move or hunch towards the projectile thereby bringing his/her face more proximate to the nearly simultaneously dispersing cloud of inhibiting/marking substance.

In another aspect, embodiments of the present invention advantageously are filled with any of the following substances: an inhibiting substance, either in liquid or powder form, such as oleoresin capsicum (also referred to as "OC"), capsaicin (i.e., the active ingredient or capsaicinoid within oleoresin capsicum), tear gas (e.g., CS or CN); a marking or tagging substance, such as a colored dye; a malodorant; and/or an inert substance, such as talcum or water; or any combination thereof. For example, it is contemplated herein, by the present inventors, that a projectile system in accordance with one embodiment could include a combination of oleoresin capsicum and talcum (or alternatively, a combination of capsaicin and talcum), at a desired ratio, and to an appropriate fill level in order to improve dispersion of and the effect of the oleoresin capsicum to a desired level.

Alternatively, a combination of oleoresin capsicum, and/or other inhibiting substance, and a colored dye, malodorant and/or other marking substance, may be employed to simultaneously incapacitate the target and mark him/her for later identification. In one embodiment of a marking substance, a chemical marker or chemical fingerprinted paint, such as produced by Yellow Jacket, Inc. of California, can be used which effectively leaves a chemical ID or chemical fingerprint on the target, which can be used by the police to verify a person was struck by a non-lethal projectile. As such, the chemical marker includes a chemical ID, identifying the batch of the marker, that is formulated into the marker during manufacture. For example, a fleck of the chemical marker found on a suspect two weeks after the being impacted with the chemical marker, can be chemically identified and traced to the shooter; thus, the suspect may be linked to a crime scene by the chemical marker. In yet another alternative, it may be desirable to employ only a marking substance or only an inert substance, such as talcum or water, in the projectile system, such as when the projectile system is being used for training purposes. In a still further embodiment, the projectile system may have no substance contained therein. In this embodiment, the projectile system may be used to mark a living target by bruising him/her upon impact.

In a particular embodiment, the projectile system comprises a projectile body, for example, a spherical capsule (although other shapes of projectile bodies may be used) separable into two about equal halves (e.g. a first part and a second part), wherein the halves contain a powdered impairing substance sufficient in amount so that the projectile body is at least greater than 50% full and preferably between about 60% and 99% full, for example, from between 75% and 95%, for example, about 90% filled with a powdered substance and wherein, to facilitate manufacture of the projectile system, the powdered substance within each half is compressed and/or retained therein by a thin membrane, for example a paper foil, which contacts the inhibiting substance during assembly of the spherical capsule. In this preferred embodiment, the thin membrane is preferably sufficiently strong to retain the desired substance within the capsule as it is manufactured or assembled, yet frangible enough to readily rupture subsequent sealing of the capsule and prior to, or at least simultaneously with, impact with the target. The inhibiting substance may, for example, contain at least 0.5% oleoresin capsicum, e.g., between 1% and 30%, e.g., between 5% and 20%, with a remainder of the inhibiting substance being either an inert substance or a marking substance or a different inhibiting substance, such as tear gas liquid or powder or a liquid or powder malodorant. Alternatively, the inhibiting substance may, for example, comprise at least 0.1% capsaicin (which is the active ingredient within oleoresin capsicum in either natural form or pharmaceutical grade), preferably at least 0.5% capsaicin, and more preferably at least 1% capsaicin with the remainder of the inhibiting substance as either a marking substance, an inert substance, and/or a malodorant. Similarly, more than one inhibiting substance m ay be combined to provide a total of at least 0.1% to about 30% or more of inhibiting substances within the capsule depending on the target to be impacted, e.g. a higher percentage may be required for impacting large animals.

In a further embodiment, the projectile system comprises the projectile body, e.g., spherical capsule, separable into two about equal halves, wherein the halves contain the powdered impairing substance sufficient in amount so that the projectile is at least greater than 50% full and preferably is between about 60% and 99% full, for example, from between 75% and 95%, e.g. about 90% filled with the powdered substance and wherein, to facilitate manufacture of the projectile system, the powdered substance within each half is compacted using, for example, a mandrel, whereby respective portions of the powdered substance each remain packed within a respective half during assembly of the halves into a spherical (or other suitably shaped projectile body) capsule. As indicated above, the powdered impairing substance may, for example, contain at least 0.5% oleoresin capsicum, e.g., between 1% and 30%, e.g., between 5% and 20%, with a remainder of the powdered substance being an inert substance, a marking substance or a different inhibiting substance. Alternatively, the powdered impairing substance may, for example, contain at 0.1% capsaicin, preferably at least 0.5% capsaicin, and more preferably at least 1% capsaicin with the remainder of the powdered substance being either a marking substance, an inert substance, and/or a malodorant.

In some variations, the inhibiting substance may include fragments of solid material to enhance dispersion of the inhibiting substance. For example crushed walnut shells, rice, wood shavings, metal particles, such as metal powder or metal filings, or the like may be added to the inhibiting substance to help carry the inhibiting substance away from a point of impact of the projectile against the target. The solid material, having a greater density and mass than the inhibiting substance, inert substance or marking substance, t ends to project further from the point of impact, there by facilitating dispersion of the substance as it is carried by the solid material.

In yet other variations, a weighting substance, for example metal balls, metal shot metal balls, wood pieces or other high mass and/or high density materials, such as higher density powders or granules, can be added to or in place of the inhibiting substance to not only facilitate dispersion of a powdered substance, but to also increase the kinetic impact of the projectile against the target, thus enhancing the initial impact effectivity of the projectile. This variation can be used to enhance the already synergistic combination of kinetic impact and inhibiting substance, which act, for example, serially, in order to initially stun a target with the kinetic impact, and then debilitate the target with the inhibiting substance. Alternatively, this variation may be employed, where one or more targets are located behind a glass or similar barrier, to break the glass, thereby providing access to other targets.

In use, these higher kinetic force projectiles may, or optionally may not, contain an inhibiting substance. And, if such high kinetic impact projectiles do not contain an inhibiting substance, such projectile bodies may optionally be, for example, solid, rather than hollow projectile bodies, e.g., capsules, and thus may be made from solid steel, rubber, glass, plastic, or the like. These kinetic projectiles may be used alone or intermixed with projectiles containing inhibiting substance. When intermixed, a pattern of one kinetic projectile for every X inhibiting projectiles may be utilized, where X may be, for example, from between 1 and 10. Or, kinetic projectiles may be used to initially subdue a target, followed by inhibiting projectiles to impair the target. In addition, these kinetic projectiles may be arranged such that successive projectiles carry an increasing kinetic impact, so that an initial impact would be of relatively low kinetic force, and successive kinetic impacts would be of relatively higher forces. In this approach, kinetic projectile bodies may be intermixed with inhibiting capsules, or may themselves carry an inhibiting substance. Also, each successive round may be of increasing kinetic force, or a group of projectiles at a given kinetic force may be fired before a subsequent group of high kinetic force.

In further variations, a marking agent, dye, malodorant, or taggant can be added to the inhibiting substance in order to provide a mechanism for identifying the target at a later time. This feature of this variation may be particularly useful in law enforcement applications, where evidence gathering may be enhanced if the target can be marked. By combining a marking agent with an inhibiting substance a significant synergism is achieved. In another aspect, marking can be effected by bruising of the target due to the kinetic impact of the projectile against the target.

In one embodiment of a marking substance, the projectile body, e.g., capsule of the projectile system may contain a chemical compound that has a particularly offensive odor, also referred to as a malodorant. In use, the projectile system can be launched at a suspect, such that the suspect will have an unwelcome odor on his or her person. Such odor will effectively "mark" the person. Additionally, a projectile body containing a malodorant may be used to repel or keep persons away from a particular area. As such, several projectile systems can be launched at the ground or wall, for example, of an area that it is desired to others away from. The area will typically smell so offensive that it will keep others from coming near the smell. The malodorant has applications in crowd dispersal and crowd control, as well. On example of a malodorant that has a particularly offensive odor is called "Dragons Breath" which is an organic sulfur compound produced by DeNovo Industries, of The Woodlands, Texas. In variations of this embodiment, a specially designed projectile body, e.g., capsule, is produced that includes a glass capsule contained within the projectile body. The glass capsule seals within itself certain malodorants, such as Dragons Breath and other sulfur compounds, that have solvent properties that can eat through a plastic variety projectile body. The glass capsule within the projectile body is ruptured upon impact of the projectile body, releasing the malodorant. In further variations, the glass capsule is guided centrally within the projectile body with protrusions formed within the projectile body. These protrusions center the glass capsule within the projectile capsule and additionally may provide pressure points to assist in the fracturing of the glass capsule upon impact.

In yet a further variation, a powdered inhibiting substance can be combined with a liquid or gas irritant, or other agent to be delivered. The liquid or gas, and the powdered irritant can be carried in separate chambers, in for example, separate halves of the projectile using the membranes described herein to contain the powdered inhibiting substance and the other agent, keeping them separated, if needed. If a liquid or gas is contained by one or both of the membranes, such membranes can be made, for example out of plastic, vinyl, rubber or the like.

In an alternative embodiment, the projectile body, e.g., capsule of the projectile system is constructed to facilitate rupture thereof upon impact with a target. In one aspect, the projectile body has a plurality of structurally weakening dimples within its exterior or interior surface, and, more particularly, the structurally weakening dimples have a minimum depth of about 15%, preferably about 20%–75% and most preferably about 30% to 60% of the thickness of the projectile body. In one embodiment, as few as two structurally weakening dimples, e.g. located at each pole of a spherical capsule, will be sufficient to enhance the rupturing of the projectile system upon impact. Advantageously, these dimples also provide enhanced aerodynamic qualities, thus serving a dual and synergistic combination of uses. Alternatively, the projectile body employs a matrix of global surface scoring in its exterior and/or interior surface to provide a weakened surface and facilitate rupture upon impact. Further alternatively, a combination of dimples, with surface scoring connecting the dimples may be employed to provide both enhanced aerodynamic qualities and to facilitate rupturing of the projectile body upon impact.

In a further embodiment, a three-part projectile is produced which contains a three-part projectile body, e.g., a three-part capsule. The first and second parts are typically two halves of the projectile body (or capsule); however, one of the halves has a fill hole formed therein. A third part, or lid is designed to seal the fill hole of the second part once a substance or substances (whether liquid, solid, powder or gas) are filled into the three-part capsule. Thus, advantageously, the substances are able to be filled into the capsule, after sealing the first and second parts together, through the fill hole. The fill hole is large enough to fill the volume to at least 50%, more commonly at least 80%, and even at least 90% of the available volume without spillage occurring, at least in a controlled use. The substances, especially if a powdered substance, may then be compressed using a mandrel or similar device, and refilled. Further advantageously, this embodiment allows for a single apparatus that may be filled with either liquids or powders effectively. Thus, advantageously, the need to design a separate projectile body for liquids and for powders is not required.

In other embodiments, the contents of projectile system as described herein may be pressurized, for example, by producing the projectile in an increased pressure environment or atmosphere, or by adding compounds to the substance contained within the projectile that release gases or expand upon warming up to a room temperature. As such, since the contents of the projectile body are pressurized, upon impact, the dispersal of the contents on and about a target is enhanced.

In another embodiment, stabilizing fins are coupled, attached, bonded, or otherwise formed into the body of the projectile body. These fins assist in stabilizing the flight of the projectile body so that the projectile body can travel farther distances. These fins may be straight fins or, alternatively, may be curved fins such that the flight of the projectile body is spin stabilized.

In another embodiment, the projectile may be comprised of a glow-in-the-dark material such that the projectile bodies may be seen and used during the evening or at night. As such, users will be able to see the flight of the projectile bodies and also determine by sight if a target has been impacted.

In another embodiment, the present invention includes a method of assembling the projectile system herein comprising the steps of filling each half of the projectile body, e.g., the capsule, with a portion of the substance to be delivered to the target, covering the substance within each half of the projectile body, e.g., the capsule, with a thin membrane to retain the substance therein and sealingly attaching the two halves to one another. In a particular embodiment, the two halves of the capsule are welded to one another using ultrasound, glue or a suitable solvent. Or alternatively, the two halves may be formed with interlocking flanges, so as to snap together without need for the use of solvent, glue or ultrasonic welding, or so as to provide a mechanical closure, while, for example, a solvent or glue is used to provide hermeticity to the projectile body, thereby preventing contamination of, for example, a powder irritant with, for example, water vapor, which can cause clumping of the powder irritant, and thus reduce the ability of the powder irritant to disperse. In a still further embodiment, the sealed capsule is shaken or otherwise subjected to forces sufficient to rupture the membranes therein, after sealing thereof.

In another embodiment, the present invention includes a method of assembling the projectile system herein comprising the steps of filling each half of the projectile body, e.g., capsule, with a portion of the substance to be delivered to the target, compressing (or tamping) the substance within each half, such as with a mandrel, to retain the substance therein, and sealingly attaching the two halves to one another. As above, in a particular embodiment, the two halves of the capsule are welded to one another using ultrasound, glue of a suitable solvent. Or alternatively, the two halves may be formed with interlocking flanges, so as to snap together without need for the use of solvent, glue or ultrasonic welding, or so as to provide a mechanical closure, while, for example, a solvent or glue is used to provide hermeticity to the capsule, thereby preventing contamination of, for example, a powder irritant with, for example, water vapor, which can cause clumping of the powder irritant, and thus reduce the ability of the powder irritant to disperse.

Advantageously, the structure provided by the embodiments herein provides a highly accurate, muzzle safe projectile. By making available an option of using existing paint ball launcher technology, the inventors provide not only a highly accurate launch device, but one that is readily available, and extremely cost effective for law enforcement agencies and military branches.

Advantageously, present training programs for law enforcement and military personnel include training such personnel to target a target's chest area when using lethal weaponry. Use of the above methodology with the above non-lethal or less-than-lethal projectile does not change this tactic, and thus, both the above method and above projectile are readily deployable with and readily compatible with the training of current law enforcement and military personnel.

In a variation, rapid firing of projectiles, such as for example from an automatic or semi-automatic weapon, in accordance with the embodiments herein can be used to enhance both kinetic stunning, and impairing of the target with the inhibiting substance. Such rapid firing can be effected with projectiles having successively more concentrated fills of inhibiting substance, such as 1%, 5%, 10%, 15%, 20% and possibly higher mixes of inhibiting powder with inert powder, in order to initially deliver a minimum of inhibiting substance, gradually increasing strength of the inhibiting substance with successive projectiles. Several projectiles at each strength may be used followed by several at a next higher strength or each successive projectile may contain substance at an increasing strength or any combination of strengths may be employed.

Whether or not projectiles with successively more concentrated fills are employed, or, for example, a single fill concentration is employed, the rapid firing of projectiles at a target offers an advantage in that a larger more diffuse cloud of inhibiting substance is created with each impact of a projectile against or near the target. Thus, in effect, successively greater amounts of inhibiting substance are delivered to the target with each successively impacting, rapidly rifled projectile.

When rapid firing is employed, a pattern of projectile impacts beginning near a target's shoulder, and moving toward a target's groin may be particularly advantageous at causing the target to move his or her face into the cloud of powdered inhibiting substance, or irritant, as he or she hunches over and turns to protect him or herself from the pattern of projectile impacts. Similarly, a pattern beginning near the target's groin, and moving toward the target's shoulder may also be effective and advantageous. This latter approach particularly lends itself to use when an aggressive target may ultimately need to be targeted in an extremely aggressive manner, such as at the target's head. Specifically, a pattern of projectile impacts beginning near a target's groin can move up the target's torso, and, if needed, terminate with projectile impacts on or near the target's head. The inventors envision that the targeting of a target's head be used only in extreme cases, perhaps only in cases that would justify the use of deadly force.

Thus, in yet a further embodiment, the invention contemplated herein includes a method of impairing a human target by impacting the target's upper torso, especially upper chest area, with a projectile system in accordance herewith, with sufficient force to cause the target's upper torso to move posteriorly and the target's head to move anteriorly that is, to hunch forward towards the projectile. This effect is enhanced by the target's natural propensity to close around a point of impact, and to protect a wounded area. Upon impact with the target, the projectile body, e.g., the substance radially disperses on and about the target. For example, the capsule ruptures, causing the radial dispersion of the substance contained therein. And thus, as the target's head moves anteriorly, it moves toward a cloud of radially dispersing substance. As a result, the substance comes in contact with the target's face, and, especially, the mucous membranes, such as, of the target's airway, thereby maximizing the inhibiting effects of the substance. As a further advantage of the present method, the target will naturally be caused to inhale as his or her face is moved anteriorly, and, thus, the target is forced to inhale the substance from the cloud, causing a significantly enhanced effectivity as compared to commercially available device of which the present inventors are aware.

In another aspect of the present invention, frangible projectile bodies, e.g., capsules, in accordance herewith, containing breaker balls, such as steel balls, ceramic balls, glass balls or other materials having enhanced mass/weight characteristics, may be fired initially, for example, from a rapid fire rifle, so as to open a passage through a barrier, for example glass, acrylic or similar glass-like material, followed by firing of one or more projectiles filled with an inhibiting substance, i.e., irritant. This variation provides a particular advantage in situations such as car chases, where a target can be impaired while stopped momentarily in traffic as he or she attempts to elude law enforcement personnel. Specifically, while stopped, an officer can fire a series of breaker balls followed by projectiles containing inhibiting substance. The use of breaker balls can also, for example, be useful in situations such as hostage situations where a target is located inside a building behind glass that first needs to be broken before inhibiting projectiles can be fired into the building toward the target. Most advantageously, because the capsules containing the breaker balls are frangible and break upon impact with the glass-like barrier, they are less dangerous to the living targets than would be a non-encapsulated breaker ball.

In a further method, the projectiles of the above embodiments need not strike the target to be effective. Instead the projectiles can be aimed at a wall, a ceiling, or at another structure near, especially above, the target, whether or not the target is not visible. Specifically, for example, a target hiding behind a wall can be effectively inhibited by the widely dispersed cloud of inhibiting substance, e.g., powder, produced upon impact of the projectile against a nearby structure. This method is useful, for example, in armed robbery situations, prison riots, cell extractions, and the like, where targets may be intentionally hiding from law enforcement or military personnel.

Thus, it is a feature of the present invention to provide a projectile system for delivering a desired substance, especially an impairing/inhibiting substance and/or a marking substance to a target, which projectile system provides optimum dispersal, and therefore effectiveness, of the substance(s) on and/or about the target.

In yet another aspect of the present invention, the technologies used to produce common paint ball launchers are used in creating custom, multi-functional launching devices. Such multi-functional launching devices incorporate other utilitarian functions into the non-lethal projectile launcher other than the ability to fire non-lethal projectiles. In one embodiment of the present invention, a multi-functional launch device is incorporated into a flashlight body such that the resulting launcher is able to launch non-lethal projectiles and provides a sight function, i.e. the flashlight. Therefore, advantageously, the non-lethal projectile launcher could be used at night or in darkly lit areas without the use of a separate flashlight. The launcher body could further be constructed of a rigid material to provide a kinetic function in enabling the launcher to be used as a physical striking weapon, as well.

In additional embodiments, the flashlight launcher may also incorporate an inhibiting spray canister (i.e. pepper spray (OC), "mace" or tear gas) and/or a siren canister (i.e. a "screamer"). Furthermore, the flashlight launcher may also include a radio transmitter that transmits a signal to other police officers requesting backup or transmits a signal to a security system that automatically dials the police or a security station when the launcher is used to fire a non-lethal projectile. Thus, the multi-functional custom launch device of the present invention would replace several devices currently being carried by police officers, e.g. a separate flashlight, a separate non-lethal projectile launcher, a separate "nightstick" or club, a separate inhibiting spray canister (i.e. mace), and a separate siren canister. Thus, an officer is less burdened by a variety of devices since the officer only has to carry one multi-functional custom launch device on his or her belt to perform all of these functions.

In another embodiment, the multi-functional custom launch device may take the form of a PR-24 police baton. In this embodiment, non-lethal projectiles of the present invention are fired from the "arm" of the baton, while the device remains a fully functioning baton that can be used to subdue or strike suspects. Additionally, the multi-functional custom launcher may also include inhibiting spray canisters and siren canisters incorporated into the "handle" or other portions of the baton, such that the custom launch device will perform the functions of a non-lethal projectile launcher, a baton, an inhibiting spray, and a siren spray. Again, advantageously, this multi-functional custom launch device would replace several different devices that would be carried by law enforcement personnel, resulting in more available space or real estate on the belt of the officer for other devices. Furthermore, such multi-functional launch devices incorporate combinations of known technologies, e.g. paint ball launchers, flashlights, batons, inhibiting canisters, and electronics, to create to single integrated multi-functional launch device.

BRIEF DESCRIPTION OF THE DRAWINGS

The above and other aspects, features and advantages of the present invention will be more apparent from the following more particular description thereof, presented in conjunction with the following drawings wherein:

FIGS. 25, 26 and 27 are a sequence of profile views of a human target as he/she is impacted with a projectile system in accordance herewith;

FIG. 30 is a side view of a tactic, contemplated herein, for stopping a car under chase using the projectile systems described herein;

FIG. 31A is a perspective view of a further tactic contemplated herein, for delivering projectile systems in accordance herewith, to a target within a building;

FIG. 32 is a cross-sectional view of a projectile for delivering an inhibiting substance to a target in accordance with another embodiment of the present invention, wherein the embodiment of FIG. 1 is employed to carry the inhibiting substance, and a stabilizer portion is employed to increase range;

FIG. 33 is a cross-sectional view of a projectile made in accordance with one variation of the projectile of FIG. 32, wherein a plunger is employed to explode a capsule containing the inhibiting substance;

FIG. 34 is a cross-sectional view of a projectile made in accordance with another variation of the projectile of FIG. 32, wherein the plunger employed to explode the capsule containing the inhibiting substance is aerodynamically-shaped;

FIG. 35 is a cross-sectional view of a projectile made in accordance with a further variation o of the projectile of FIG. 32, wherein the plunger is employed to explode a capsule containing the inhibiting substance, and wherein an atomization matrix made up of forward pointing exit orifices is located at a rearward end of the projectile in order to increase a spray pattern area on the target;

FIG. 36 is a cross-sectional view of a projectile made in accordance with a variation of the projectile of FIG. 35, wherein the plunger is employed to puncture a membrane behind which the inhibiting substance is encapsulated;

FIG. 37 is a cross-sectional view of a projectile for delivering an inhibiting substance to a living target in accordance with a further embodiment of the present invention, wherein a pressurized canister is employed to carry the inhibiting substance, and a stabilizer section is employed to increase range;

FIG. 38 is a cross-sectional view of the projectile for delivering an inhibiting substance to a living target, wherein a pressurized canister is employed to carry the inhibiting substance, and a stabilizer section is employed to increase range, and wherein the projectile employs an adhesive material and a mechanical attachment system to attach the projectile to the target during delivery of the inhibiting substance to the target and further employs forward pointing exit orifices to increase a spray pattern area on the target;

FIG. 39A is a cross-sectional view of a projectile for delivering an inhibiting substance to a living target in accordance with an additional embodiment of the present invention, wherein a twelve-gauge shotgun shell is packed with a rosin bag (or alternatively a spherical capsule) that contains an inhibiting substance, such as powdered or liquid oleoresin capsicum or capsaicin;

FIG. 39B is a cross-sectional view of an alternative of the projectile of FIG. 39A, wherein the twelve-gauge shotgun shell is packed with one or more spherical capsules, for example, as illustrated in FIG. 1, which capsules preferably contain an inhibiting substance, such as oleoresin capsicum or capsaicin.

FIG. 40 is an end cross-sectional view of the projectile for delivering an inhibiting substance in accordance with the additional embodiment of FIG. 39A;

FIG. 41 is a cross-sectional view of a launch device useable in combination with the projectile for delivering an inhibiting substance to a living target in accordance with an additional embodiment of the present invention, wherein the launch device assumes the form of a PR24 police baton thus allowing dual use of the launch device, i.e., as a launch device and as a PR24 police baton;

FIG. 42 is a cross-sectional view of a launch device suitably used with the projectile for delivering an inhibiting substance to a living target in accordance with another embodiment of the present invention, wherein the launch device assumes the form of a flashlight thus allowing dual use of the launch device, i.e., as a launch device and as a flashlight;

FIG. 43 is a cross-sectional view of an adaptation of the launch device of FIG. 41 for delivering ball-type projectiles;

FIG. 44 is a side cross-sectional view of an adaptation of the launch device of FIG. 42 for delivering ball-type projectiles, wherein a plurality of barrels, such as two, are employed so as to allow for the firing of multiple projectiles without reloading; and FIG. 45 is an end cross-sectional view of the adaptation of the launch device of FIG. 44 illustrating the plurality of barrels.

FIG. 46 is a cross-sectional view of another embodiment of the multi-functional launch device of FIG. 41 useable in combination with the non-lethal projectiles as variously described herein and for delivering an inhibiting substance to a living target in accordance with an additional embodiment of the present invention, wherein the launch device assumes the form of a PR24 police baton;

FIG. 48 is a cross-sectional view of another embodiment of the multi-functional launch device of FIG. 42, suitably used with the projectile for delivering an inhibiting substance to a living target in accordance with another embodiment of the present invention, wherein the multi-functional launch device assumes the form of a flashlight thus allowing dual use of the launch device, i.e., as a launch device and as a flashlight;

FIG. 49 is an end cross-sectional view of the adaptation of the multi-functional launch device of FIG. 48 illustrating the flashlight portion and the barrel for launching the non-lethal projectiles;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

As used herein, the term "projectile system" or "projectile" or "non-lethal projectile" refers generally to the entire projectile apparatus of the various embodiments of the present invention that travels to the target. For example, in all embodiments contemplated herein, the projectile system or projectile at least includes a projectile body that contains a substance for delivery to the target. For example, this projectile body may be embodied as a capsule having a hollow volume within that contains the substance. The terms "capsule", "casing" and "shell" are used interchangeably herein to refer to an embodiment of the projectile body as being a container portion of the projectile system within which the substance is contained, whether or not a deliverable substance is actually contained therein. This projectile body may be a variety of shapes, for example, the projectile body may be spherical or oblong, depending on the specific embodiment. In some embodiments (discussed near the end this patent document), the projectile body may be embodied as a stabilizer body, for example, which apparatus travels to the target.

Non-Lethal Projectile Systems

Figure 1:
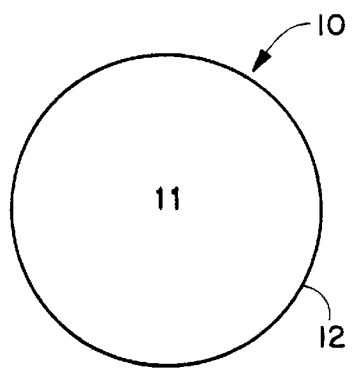
FIG. 1 is a side view of a projectile including a projectile body, embodied as a capsule, for delivering an inhibiting substance, such as oleoresin capsicum, capsaicin, tear gas, malodorant or the like, to a living target, such as a human target, in accordance with one embodiment of the present invention.
Figure 4:
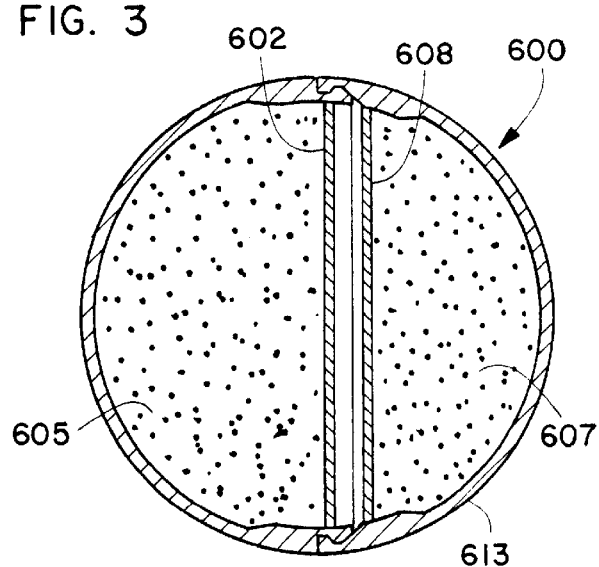
FIG. 4 is a cross-sectional side view of a sealed capsule of a projectile system in accordance herewith, illustrating the membranes employed to retain the substance within the capsule.
Figure 5:
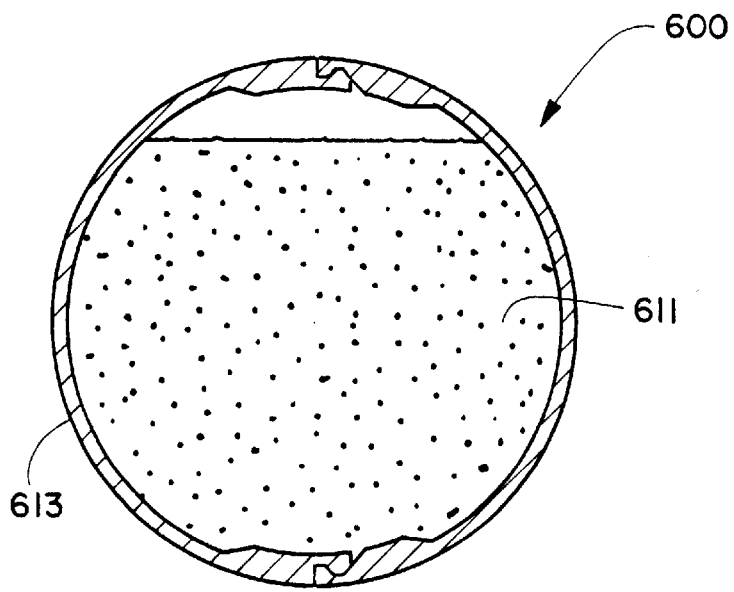
FIG. 5 is a cross-sectional view of a fully assembled capsule in accordance with preferred embodiments herein, illustrating optimal fill of the capsule with a substance to be delivered to a living target.

Referring now to FIG. 1, a side view is shown of a projectile 10 (also referred to as a projectile system) for delivering an inhibiting liquid or powder substance, such as, pepper spray, oleoresin capsicum, capsaicin, tear gas, malodorant, marking substance or the like, to a living target, such as a human target, in accordance with one embodiment of the present invention. The projectile system 10 includes a projectile body 12 (here embodied as a capsule 12) that contains the substance 11 to be delivered to the target. Upon impact with the target, the substance 11 is dispersed at and about the target, thereby inhibiting, repelling, and/or marking the target. In a preferred embodiment, the projectile body 12 ruptures upon impact with the target dispersing the substance 11, and the substance 11 contains an inhibiting substance.

Preferably, the inhibiting substance comprises finely powdered oleoresin capsicum, such as may be purchased from Defense Technology of America in Casper, Wyo. (for example, Blast Agent oleoresin capsicum 943355, Cas. No. 8023-77-6, #T14, #T16, #T21 and/or #T23). Oleoresin capsicum is a pepper-derived substance consisting of three capsaicinoids: capsaicin, dihydrocapsaicin, and nordihydrocapsaicin, of which capsaicin is the primary active substance. Capsaicin may be found in natural form within oleoresin capsicum or may be synthetically produced as pharmaceutical grade capsaicin or nonivamide. Such pharmaceutical capsaicin is commercially available from Chemarmor of Missoula, Mont. In the present embodiment, the oleoresin capsicum powder, to be used for the substance 11 in some embodiments (referred to with respect to the present embodiment as "powder") is preferably purchased at a concentration of at least about 0.5%, e.g., between 1% and 30%, e.g., 3% and 10%, e.g. about 5% by volume. Thus, the substance should be at least 1% oleoresin capsaicin by volume, more preferably at least 3%, and most preferably at least 5% by volume.

Alternatively, in terms of capsaicin, the powdered inhibiting substance should comprise at least 0.1% capsaicin by volume to be effective, preferably at least 0.5% capsaicin, most preferably at least 1% capsaicin. In either case, the powder may be diluted, to a desired concentration, by mixing with an inert powdered substance, such as talcum, corn starch or other inert substances.

Thus, in the broadest sense, in a preferred embodiment, the substance should in part comprise a pepper-derived powder substance, including for example, one or more of oleoresin capsicum, capsaicin, dihydrocapsaicin, nordihydrocapsaicin, or combinations of the above pepper-derived substances.

Furthermore, in the powdered embodiments, it is advantageous that the substance 11 is a finely ground powdered substance such that the particle sizes or grain are less than 1000 microns in diameter, and preferably less than 500 microns, more preferably less than 250 microns, and most preferably less than 100 microns. it has been found that the generally the smaller the particle diameter in a powdered substance, the more effective the radial dispersal of the substance upon impact and the larger the volume of the dispersal. Likewise, the larger the particle diameter, the less effective the radial dispersal of the powdered substance and the less volume is covered by the dispersal, or the less "cloud-like" the dispersal becomes. For example, particle diameters above 500 microns and specifically above 1000 microns, tend to simply splatter, spray, or scatter on the target and/or quickly fall to the ground. Furthermore, particle diameters generally above 250 microns and above 500 microns are easily prevented from entering a targets nostrils or mouth by placing a handkerchief thereagainst. Furthermore, a powdered substance having, for example, a particle size of greater than 500 microns, or greater than 1000 microns, may only disperse into a very small volume, whereas a finely ground powdered substance will create a cloud of a much larger volume.

It is preferable to produce a "cloud" of the powdered substance to disperse radially and envelop a large volume upon impact with the target and rupture of the capsule 12, for example, a cloud that is formed when clapping erasers together. As will be seen, it is advantageous that the substance produce a fine cloud of the powdered substance such that the cloud will be dispersed on and about the target, such that the target inhales the substance.

In preferred embodiments, the substance comprises a powdered oleoresin capsicum powder or capsaicin powder that has a particle size of less than 500 microns, preferably less than 100 microns, more preferably less than 20 microns, and most preferably less than 10 microns, e.g. 5 microns in diameter. Thus, when such powder is contained within a small capsule 12, such as shown in FIG. 1, which may be paint ball sized, the capsule 12 upon impact and rupture, will produce a cloud of finely powdered substance 11 at least 2 feet in diameter, and preferably at least 3 feet in diameter. This cloud advantageously "wafts" in the air for several seconds, for example, between 6 and 10 seconds before settling, allowing sufficient time to inhale the powdered substance.

Furthermore, and advantageously, the powdered pepper-derived substances, such as oleoresin capsicum and capsaicin, are more than topically acting substances. These substances react internally by entering the mouth and nostrils of the target and contacting the lung tissue, for example, causing a temporary inability to breathe, whereby the target is inhibited.

In other embodiments, the projectile 10 may also be used to deliver other substances such as marking substances, including for example, dyes or paint, or the like, to a living or an inanimate target, and may also be used to deliver inert substances, such as talcum powder. Such dyes may be colored dyes, such as those found in common paint ball technologies, or may contain other markers, such as a neon or glow-in-the-dark marker, which may be useful for marking a suspect at night, making it easier for law enforcement personnel to see the marked suspect at night. In one embodiment of a marking substance, a chemical marker or chemical fingerprinted paint, such as produced by Yellow Jacket, Inc. of California, can be used which effectively leaves a chemical ID or chemical fingerprint on the target, which can be used by the police to verify that a person was struck by a specific non-lethal projectile and place the suspect at a crime scene. As such, the chemical marker includes a chemical ID formulated into the paint substance during manufacture, identifying the batch of the chemical marker. For example, a fleck of the chemical marker found on a suspect two weeks after the being impacted with the chemical marker, can be chemically identified and traced to the shooter; thus, the suspect may be linked to a crime scene by the chemical marker.

Furthermore, chemical compounds having a particularly offensive odor, i.e. malodorants, may be contained within the projectile 10, to be used to mark suspects by scent or to repel or keep people away from desired areas. One example of a malodorant that is particularly effective is called "Dragons Breath", which is an organic sulfur compound and is produced by DeNovo Industries of The Woodlands, Tex. In still further embodiments, the projectile may be used to deliver both inhibiting and marking substances, or even inert substances to the target.

In accordance with the present embodiment, the substance 11 including an inhibiting substance is encapsulated within a plastic, gelatinous or similar material projectile body 12 (also referred to as a capsule 1,2 which is a specific embodiment of a projectile body). The capsule 12, or shell, may be made from various known substances, such as acrylic, vinyl, plastic, polystyrene and/or other polymers, sodium alginate, caicium chloride, coated alginate and/or polyvinyl alginate (PVA). Furthermore, the capsule 12 may be spherical or oblong or have another desirable shape according to the specific embodiment; however, some capsule shapes may provide for better dispersal of the substance contained within upon impact. Additionally, the capsule may be made out of colored materials or even glow-in-the-dark materials to enhance the night time use of such projectiles.

In a preferred embodiment, the projectile systems contemplated herein include a projectile body that is a generally spherical hollow capsule, preferably formed of a polymer substance, for example and without limitation, polystyrene, polyvinyl, vinyl or acrylic. Preferably, the outer diameter of the spherical capsule 12, or shell, is from between about 1.0 cm and 15.0 cm, e.g., 1.8 cm; however, these dimensions depend upon the specific application of the non-lethal projectile. The inner-diameter of the shell 12 (which defines the volume in which the substance is carried) preferably has a diameter of from between about 0.3 cm and 15.0 cm, e.g., 1.7 cm. In preferred embodiments described in detail herein, the capsule 12 is filled to at least greater than 50%, preferably 60% to less than 100%, more preferably 85% to 95%, and most preferably to about 90%, of its volume with a substance, for example an inhibiting and/or marking substance, to be delivered to a target, for example a human target. The capsule 12 is preferably formed, in halves, by injection molding or by being hot pressed; however other methods are also suitable. For example, the spherical capsules of U.S. Pat. No. 5,254,379, incorporated herein by reference, (hereinafter the '379 patent) are formed using a carefully temperature controlled draw of polystyrene. Production of the capsule of the '379 patent in this fashion can be time consuming and, where being manufactured for the purpose of delivering paint to a target, requires careful attention to feed rates and maintenance of temperature differences between injection feeds of the paint and forming of the capsules. In contrast, and as discussed further herein, the preferred capsules of the present invention may be quickly formed, filled and sealed at very high production rates, in part, because the capsules are formed in halves, or multiple parts, then appropriately filled, joined and sealed.

It has been discovered, by the present inventors, that the effectiveness of projectile systems employing capsules to deliver powdered non-lethal substances, such as powdered oleoresin capsicum or powdered capsaicin, to a target are maximized by filling the capsules to at least greater than 50%, preferably 60% to less than 100%, more preferably 85% to 95% of their maximum volume, and most preferably to about 90% of their maximum volume. This is somewhat counterintuitive as it would be expected that a capsule that is full or nearly full of a powdered substance would, upon rupture, disperse its contents in a rather small, local area (i.e., as a lump or blob) and therefore be of minimal effectiveness unless facial openings of a target were directly targeted. However, it would also be expected that a capsule that is only about half-full or less with a powdered substance would disperse more effectively, which is not proven to be the case.

Figure 6A:
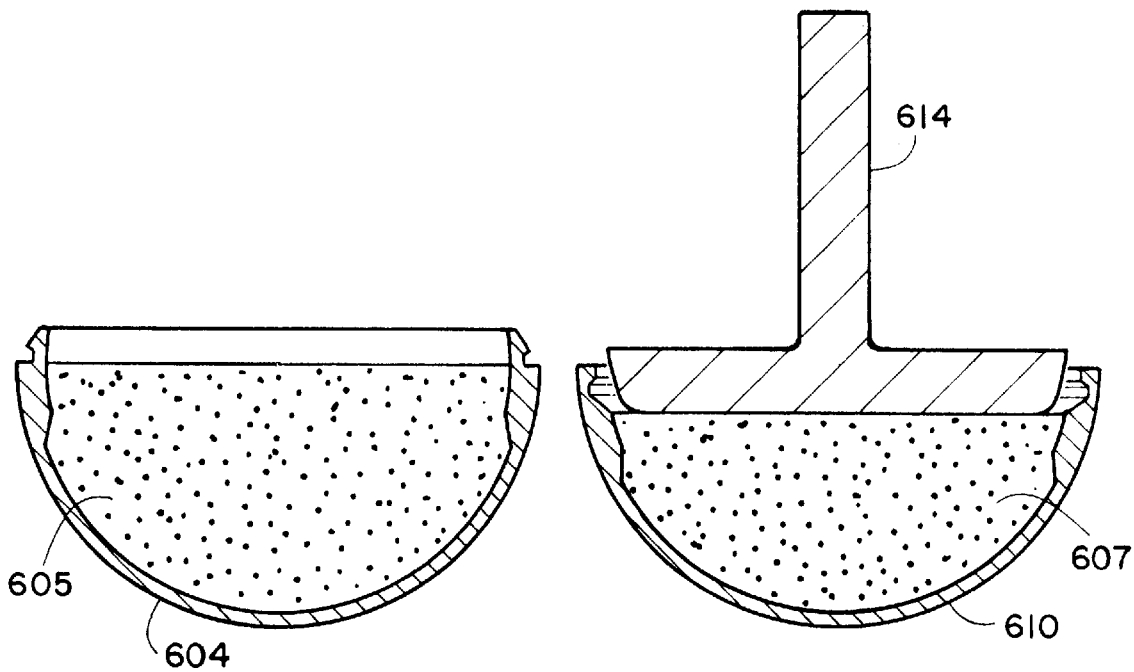
FIG. 6A is a cross-sectional view of two capsule halves, in accordance with preferred projectile systems herein, during assembly of the capsule, illustrating use of a mandrel to compress the substance within the capsule half, thereby preventing spillage during assembly of the capsule.

For example, capsule fills of less than about 60% have been found by the inventors to not disperse with sufficient transverse or radial motion to reach the critical face region of the target but rather provide only local application of the inhibiting substance, i.e., produce only a lump or blob of powder on the target. Similarly, and as expected, where capsule fills are full, i.e., approach 100% of their total volume, the substances do adhere to themselves and clump, moving as though they were a large particle rather than dispersing in a radial, cloud-like fashion.

Thus, the present inventors discovery of an optimal fill range, i.e., at least greater than 50% and preferably from between 60% and less than 100%, e.g., between 75% and 99%, e.g., 95%, represents a significant improvement, one that enables the use of powdered inhibiting substances, for the first time known to the inventors, in a commercially viable non-lethal or less-than-lethal projectile. For the reasons above, this optimal fill range further represents an unexpected result. However, at the same time, this optimal fill range poses a different problem, which is addressed herein below, that is, how to fill two halves of a spherical capsule so that a resultant capsule has the optimal fill range, without significant spillage of the substance contained therein during closure of the two capsule halves.

To further facilitate maximum dispersal of the contents of the capsule in a non-lethal projectile system, the inhibiting substance should be formulated so that it is not strongly cohesive. For example, where a liquid substance is employed, it should be selected to have very low surface tension (or should be placed under pressure), and where powders are concerned, highly structured surfaces are to be avoided. Thus, for example corn starch is a smooth surfaced powder that will readily disperse in a cloud-like manner; whereas other powders may require micro-grinding to remove structured surfaces. Various substances, well known to those of skill in the art, may be used in the present projectile systems. Particularly preferred herein, however, is powdered oleoresin capsicum, which is a pepper-derived substance, ie., essentially a food product, or powdered capsaicin (which is the active ingredient in oleoresin capsicum), which is found naturally in oleoresin capsicum or in a synthetically derived or pharmaceutical version thereof. When powdered oleoresin capsicum or capsaicin is delivered to a target, in accordance with the apparatus and methods described herein, the target inhales the substance into its lungs, which not only is painful to the target but also results in a temporary inability to breathe effectively. Although the inability to breathe is temporary, it is of sufficient duration to cause panic in the individual, thereby providing adequate time for apprehension. Furthermore, like the liquid form, powdered oleoresin capsicum/capsaicin causes significant irritation and pain when it contacts the mucous membranes, such as for example, eyes, nose, mouth or throat, of a living target. Again, powdered oleoresin capsicum, preferred for use herein, may be purchased from Defense Technology of America in Casper, Wyo. (for example, Blast Agent oleoresin capsicum 943355, #T14, #T16, #T21 and/or #T23), or pharmaceutical capsaicin (nonivamide) which may be purchased from Chemarmor of Missoula, Mont.

As mentioned above, the use of optimal fills with powdered inhibiting substances in a spherical projectile poses a serious practical problem, i.e., how to fill two halves of a spherical capsule with enough powder so that, when assembled the capsule contains an optimal fill, without spillage of the powder. As one of skill will appreciate, spillage is a problem in nearly any environment, but when the material spilled is as inhibiting as oleoresin capsicum powder or capsaicin powder, the elimination of such spillage becomes important to the safety of persons performing the assembly. Furthermore, as those of skill will readily appreciate, where a liquid substance may be dispensed into a capsule using a capillary, a powdered substance cannot be so dispensed with any sort of accuracy. Thus, the inventors herein have had to devise a method of filling capsules to greater than 50% of their volume, with a powdered substance, in accordance herewith.

Referring then to FIGS. 2–6B, illustrated are the stages of several preferred assembly methods of a projectile system (600), in accordance herewith, comprising a capsule (613) (also referred to generically as a projectile body), illustrated as a spherical capsule (613) containing a powdered substance (605, 607 & 611). FIG. 2 shows cross sectional views of the two halves of a capsule 604, 610 (also referred to as a bottom or first part 604 and a top or second part 610 of the capsule) in accordance with one embodiment of the present invention. As illustrated in FIGS. 2–4, the problem of spillage during assembly is overcome in this embodiment by employing a thin membrane 602, 608, within each half of the capsule 604, 610 after the each is filled to a desired level with a powdered substance 605, 607 (the two portions of substance 605, 607 together constituting the optimal fill of the capsule 613). The membranes 602, 608 retain respective portions of the substance 605, 607 within each half 604, 610 to facilitate assembly of the halves 604, 610 to form the capsule 613 without spilling the substance 605, 607 during assembly. Each half 604, 610 is preferably a generally hemispherical, symmetrical half of the capsule.

FIG. 2, then, illustrates the two capsule halves 604, 610 after being filled to their desired level with the powdered substance 605, 607 and then covered with a membrane 602, 608. Next, as can be seen in FIG. 3, the two halves 604, 610 are rotated toward one another and brought together so that a sphere is formed. FIG. 4 shows the capsule 613 after the halves are joined to one another. Upon joining of the two halves 604, 610 into a closed spherical capsule 613, the capsule 613 is then, optionally, sealed along the point of joining (606 FIGS. 18–22) by, for example, ultrasound welding or use of a glue or solvent. In a preferred embodiments, the capsule 613 is hermetically sealed along the joining seam, such that moisture and/or other contaminants cannot enter the capsule, spoiling its contents. In a still further preferred aspect, the sealed capsule of the projectile system 600 FIG. 4 is shaken or otherwise subjected to sufficient force to cause rupture of the membranes within the capsule 613, such that the substance 611 within the capsule becomes mixed and moves relatively freely within the capsule 613. It is noted that the glue/solvent is not illustrated in FIGS. 4 or 5 because they are cut away views of the projectile system 613. Also, not illustrated are the remnants of the membranes 602, 608 in FIG. 5 following rupture of the same, as just described.

In an alternative preferred assembly method, illustrated in FIG. 6A, a mandrel, 614 or other similar tool, may be employed to mechanically compress or tamp the powdered substance 607 within each half capsule 604, 610 to retain the substance therein during the remainder of the assembly process. In FIG. 6A, one half of the capsule 604 is shown as having had its contents compressed, while the second half 610 is shown with the mandrel 614 therein. It will be appreciated by those of skill in the art that the mandrel or other similar tool may be, and preferably is, a part of a machine (not illustrated) used to mechanically assemble the capsules in accordance herewith.

Figure 6B:
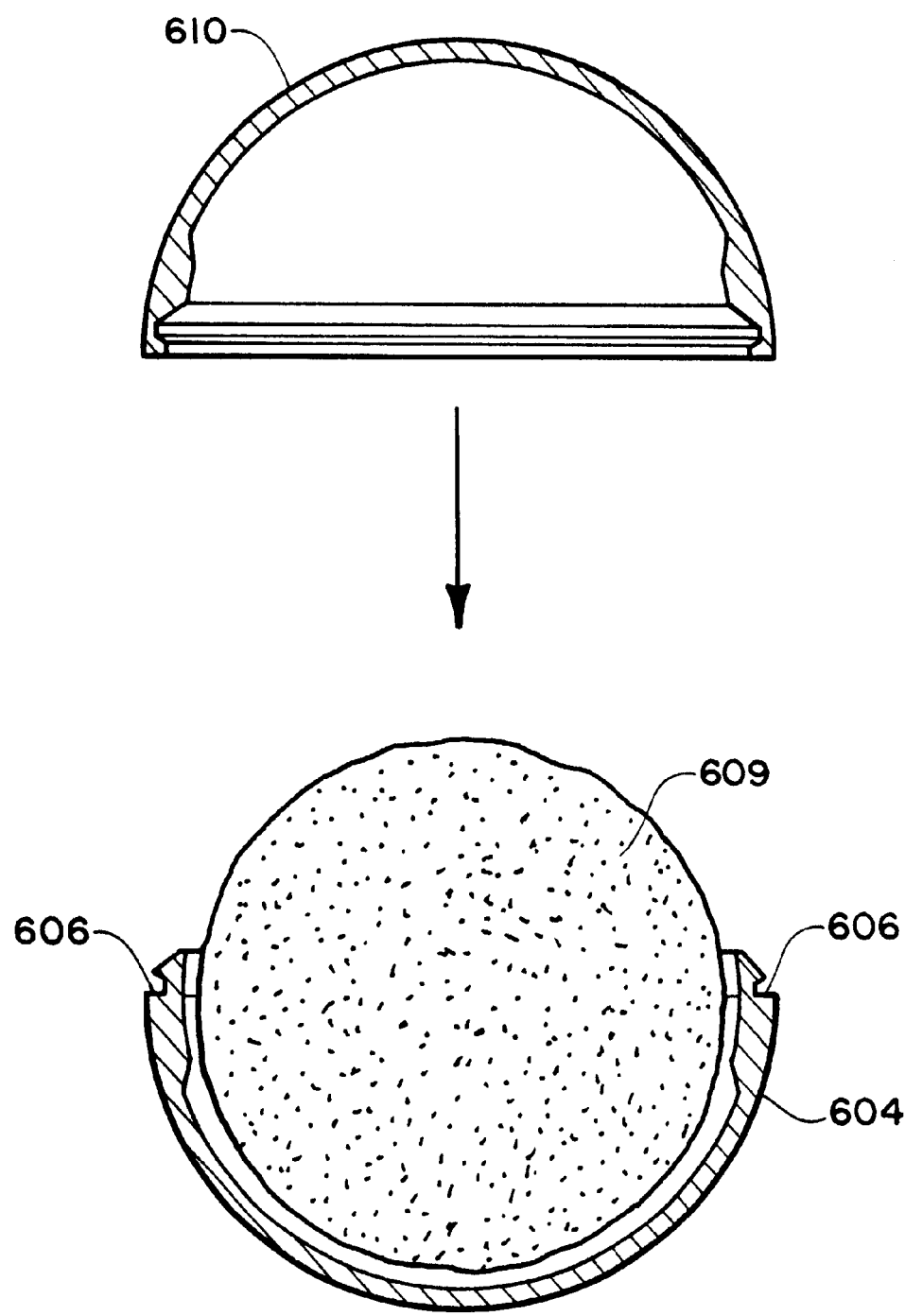
FIG. 6B is a cross-sectional view of two capsule halves during assembly of a two-part capsule in accordance with another embodiment of the invention.

Referring next to FIG. 6B, a cross-sectional view is shown of two capsule halves during assembly of a two-part capsule in accordance with another embodiment of the invention. Shown is a two-part capsule including the first part 604 and the second part 610 (i.e. the respective capsule halves 604 and 610), and a vacuum compressed ball 609. The vacuum compressed ball 609 is formed using known vacuum compression techniques in which the substance, in this case a powder, to be contained within the capsule is sucked into a cavity which includes a vacuum vent having a filter formed within the cavity. The cavity, through the vent, pulls the substance within the cavity such that the substance is tightly compressed. For example, the powder is compressed by being sucked together and forming the vacuum compressed ball 609. This is similar to forming a snow ball by applying pressure to snow to form the snow into a snow ball; however, the pressure is applied by pulled the substance into a cavity with a vacuum through a vacuum vent. The cavity may be spoon shaped or hemispherically shaped, for example, or any other cavity shape as known in the art. Once the vacuum compressed ball 609 is formed, it is placed into one half of the capsule, for example, the first part 604. This is done by positioning the cavity over the first part 604, releasing the vacuum, and allowing the vacuum compressed ball 609 to sit into the first part 604. The second part 610 is then placed over the first part 604 and sealed thereto, for example, by using any of the sealing techniques described herein.

It is noted that in this embodiment, some of the powdered substance may begin to decompress and fall into the seal area or interface 606 between the first part 604 and the second part 610, shown as the edge of the first part 604 that will contact the edge of the second part 610. The seal may still be effectuated by actually excessively sealing the first part and the second part together (by using an excessive amount of adhesive or sealant, or by excessively friction bonding or ultrasonically bonding the first part 604 to the second part 610) such that the small portion of the substance at the interface 606 is contained within the seal between the first part and the second part 610.

Advantageously, the capsule is thus filled so that a substantial portion of the interior volume contains the substance without using the membranes or mandrels, as described above. Furthermore, a greater amount of substance may be placed into the capsule using this technique.

Figure 7:
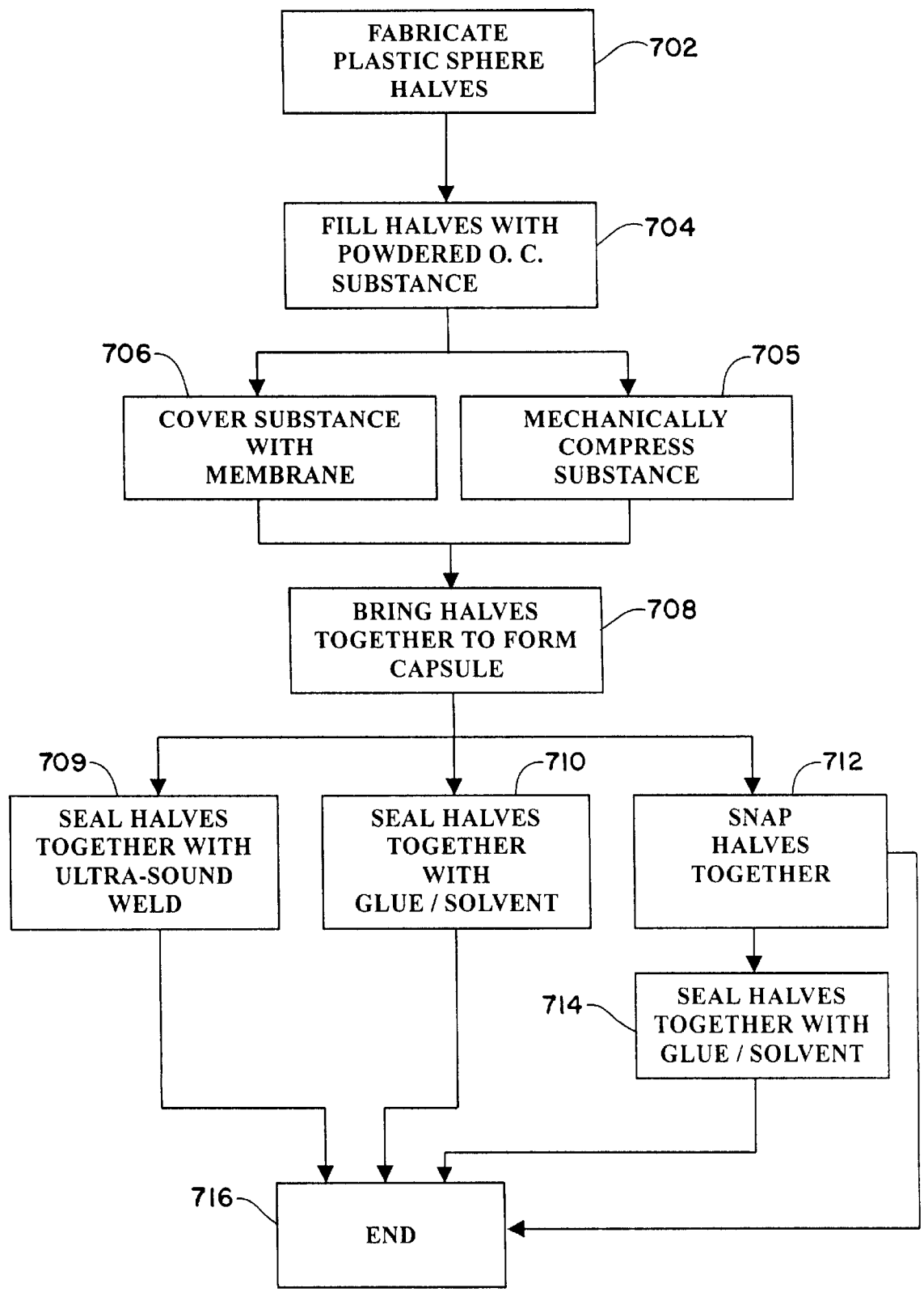
FIG. 7 is a flow chart showing alternative, preferred methods of assembly of a projectile system in accordance herewith.

Referring now to FIG. 7, a flow chart is shown illustrating in detail preferred methods of assembly of a projectile system 600, in accordance herewith, wherein the projectile system 600 comprises a capsule 613 formed from two about equal halves 604, 610 shown in FIGS. 2–6A as hemispherical halves, the structures of which are described above, which capsule 613 contains a powdered substance, especially a powdered inhibiting substance and most preferably a powdered oleoresin capsicum or a powdered capsaicin composition. The method illustrated includes some of the preferred alternatives for assembly.

Figure 2:
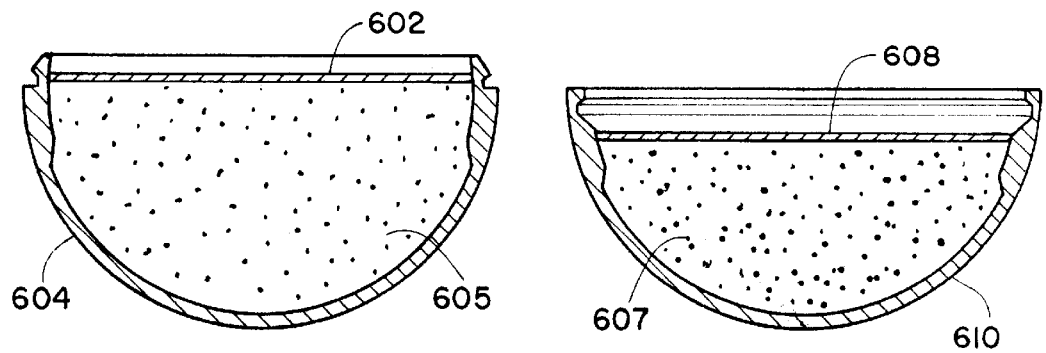
FIG. 2 is a cross-sectional side view of two halves (i.e. a first part and a second part) of the capsule of a projectile system in accordance herewith, illustrating the use of membranes, within each half, to retain the substance contained therein, during assembly.
Figure 3:
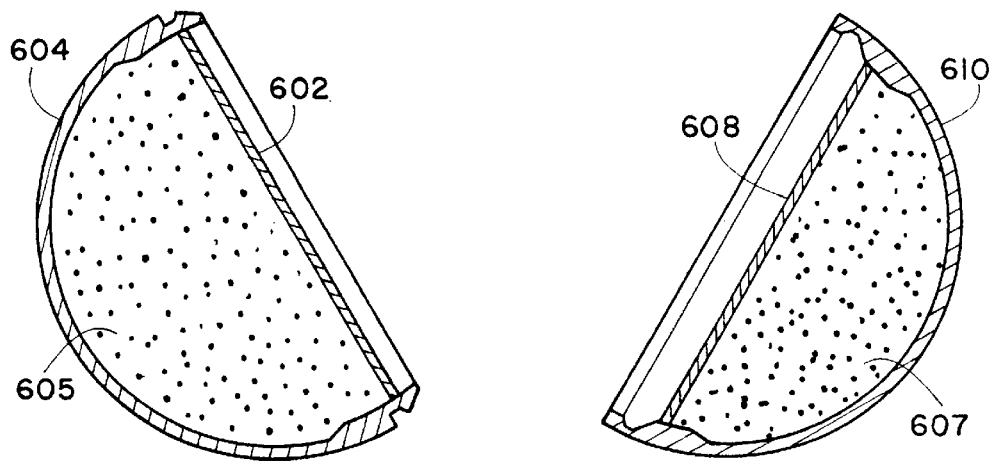
FIG. 3 is a cross-sectional side view of the two capsule halves of FIG. 2 in a rotated position as they would be during assembly, when brought together.

Thus, in a preferred method, each half 604, 610 (FIGS. 2, 3 & 6A) is fabricated using suitable molding or forming techniques (Block 702), and each is filled (Block 704) to about 90% of its volume with the substance 605, 607, respectively, to be delivered to the target, especially a powdered substance, and most preferably an oleoresin capsicum or capsaicin composition. In one alternative, a thin membrane 602, 608 is then placed (Block 706) into each half of the capsule 604, 610 to cover the substance 605, 607 contained therein. In a second alternative a mandrel 614, or other tool, is used to mechanically compress the substance within each half (Block 705). At this point in the method, the halves 604, 610 are substantially as shown in FIGS. 2 and 6, with and without membranes, respectively.

In practice, the two halves 604, 610, after having been covered by the membranes 602, 608 or mechanically compressed, are then preferably rotated about 90°, towards one another and brought together (Block 708). The halves 604, 610 are then preferably sealed to one another (Blocks 709, 710, 712, 714), such as using ultrasonic welding techniques (Block 709), or using an appropriate solvent or glue (Block 710) or by snapping the halves together (Block 712). For example, if polystyrene is used, many known solvents are available that will dissolve the polystyrene just enough to result in sealing of the same as the plastic hardens upon evaporation of the solvent. Polystyrene is commonly used for plastic models, and thus, various modeling glues are available that provide suitable sealing.

Figure 8:
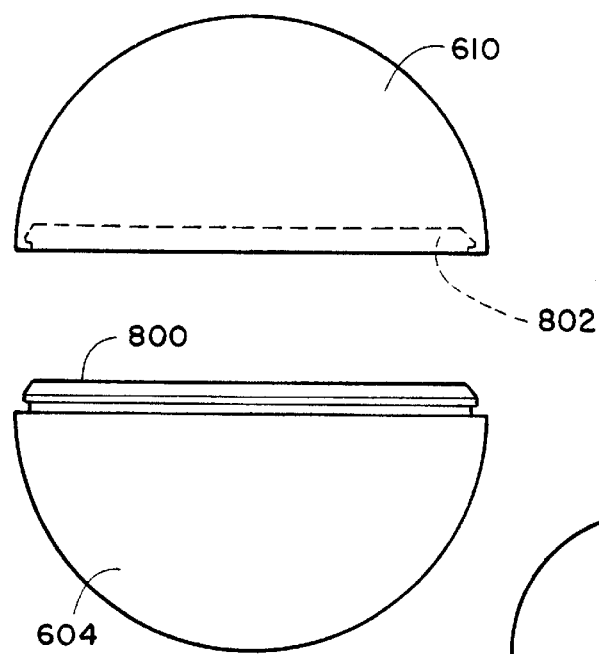
FIG. 8 is a side-view of a capsule in accordance with the projectile systems herein, illustrating a preferred snap-together structure employing mated flanges.

With respect to the alternative of sealing of the halves by snapping them together, FIG. 8 illustrates capsule halves 604, 610 that have been formed with interlocking flanges 800, 802 thereon such that the two halves may be mated and so snapped together (Block 712). Subsequent to mating the capsule halves and optionally, the capsule may be sealed (Block 714), such as by addition of a solvent, along the seam, which solvent essentially melts the plastic of the halves into one another as described above. In a most preferred embodiment herein, the flanges are formed with grooves 802 and tongues 800 such that the two halves (female and male, respectively) interlock when snapped together, providing at least a nearly hermetic seal to the capsule. (See, for example, FIGS. 8 and 10A through 11C.)

Referring then to FIG. 8, two capsule halves 604, 610 are shown with the above-mentioned interlocking flanges 800, 802. As can be seen, the flanges 800, 802 are slightly flared, so as to be slightly frustoconical in shape. Slight deformation of the respective flanges 800, 802 during assembly, and reformation as these flanges 800, 802 snap together, places these frustoconical shapes against one another, and thus holds the halves 604, 610 tightly in place against one another. As mentioned above, a droplet of solvent can be placed at the seam of the halves 604, 610, once the halves 604, 610 are assembled, thereby providing not only mechanical assembly of the halves but also insuring hermetic sealing thereof, which may be important in environments where, for example, water vapor may contaminate the substance contained in the capsule. Alternatively, the membranes 602, 608 (FIG. 2), previously described, may serve as a first and last line of defense against contaminants to the substance 605, 607, where the membranes are maintained in tact following assembly rather than being forcibly ruptured prior to use thereof. Further still, the flanges 800, 802 of the capsule halves 604, 610 may be designed to alone provide at least a near hermetic seal. Referring back to FIGS. 4 and 5, once the halves 604, 610 are assembled into a spherical capsule 600 and, optionally, sealed, the projectile system 600 is complete (Block 716).

In embodiments employing membranes, the membranes 602, 608 are selected to be strong enough to retain the substance 605, 607 within the halves 604, 610, as the two halves are joined, yet thin enough to readily rupture on or before impact of the projectile system 600 with the target. Most preferable, in this regard, are thin, circular cut, paper membranes that will tension against respective inner walls of the halves 604, 610 sufficiently to retain the substances 605, 607 therein. For example, the membrane may tension within an interior scoring of the capsule half (see, e.g. FIGS. 22A–22E, discussed further herein), where such is provided. In those embodiments employing membranes, the membranes 602, 608 are preferably gently air-cleaned along the circular contact surface after placement within the halves 604, 610 and prior to rotation of the halves 604, 610 to bring them together for welding, snapping and/or other sealing.

It will be appreciated by those of skill in the art that the membranes useful in these embodiments may be formed of any number of materials, including for example, paper, plastic or other polymer, rubber or even foam sponge. Generally, the membranes will be circular cut to be slightly larger than the interior circumference of the capsule half at the point where it is to contact that interior surface. Thus, when placed into the capsule half and, preferably, compressed, the membrane will tension against the interior surface of the capsule and thereby retain the substance therein. The membranes are preferably from between about 1 to about 5 mm thick, most preferably about 3 mm; however, other thickness are likewise contemplated herein, especially depending upon the specific substance contained within the capsule. For example, where both a liquid and a powdered substance are to be included in the capsule, it may be advantageous to provide a slightly thicker membrane to insure separation of the two substances until rupture of the capsule on or about the target.

As previously described, the spherical capsule of this embodiment of the present invention preferably has an outer diameter of about 1.8 cm and an inner diameter of about 1.7 cm. While these capsule dimensions are preferred for use in the present embodiments, other dimensions are likewise possible. The exact dimensions and specific percentages of the inhibiting substance or substances within different embodiments of the capsule will vary depending on the specific application, the launching device to be used, the range of the projectile, and the type of target to be impacted (for example, human targets may generally require a less percentage of inhibiting substance than large wildlife, for example), to name just a few factors.

While a spherical capsule 600 is illustrated, it will be readily appreciated by those of skill in the art that the projectile body, e.g., the capsule, or shell, may be of any convenient shape. What is of particular importance is that the capsule be optimally filled to, for example, at least greater than 50%, preferably about 60% to less than 100%, more preferably about 85% to 95%, e.g., about 90%, of its total volume with the substance 611. It is at these optimal fill levels that optimum dispersal of the substance is achieved and, therefore, that the effectiveness of the projectile system, whether to mark an individual target for later identification or to impair a target by, for example, irritating skin, mucous membranes, vision and/or lungs, is maximized.

Referring next to FIGS. 9A through 21, various embodiments of the projectile systems 600 described herein are illustrated wherein the projectile body, for example, the capsule, includes structurally weakening features or fracture points on the exterior or interior surface thereof, which fracture points primarily facilitate rupture of the projectile body, e.g., capsule, upon impact with a target. In particular, for example, the exterior or interior surface of the capsule is optionally provided with scorings (FIGS. 10A–11C) or with indentations/dimples (FIGS. 9A–9D) or with both (FIG. 15B, 15D, 16E and 21), thereby providing structural weak points within the capsule along which the capsule may readily fracture. Furthermore, alternative designs are shown for three-part capsules in comparison to the two-part capsules as shown above.

Figure 9C:
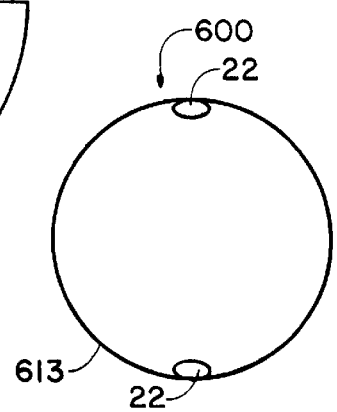
FIGS. 9A through 9C are side views of projectiles made in accordance with several variations of the projectile of FIG. 1 modified to include exterior or interior dimples arranged in various patterns that serve one or more of the tripartite purposes of decreasing drag, increasing lift, and facilitating atomization or dispersal of the inhibiting substance of the projectile upon impact with a target.
Figure 9A:
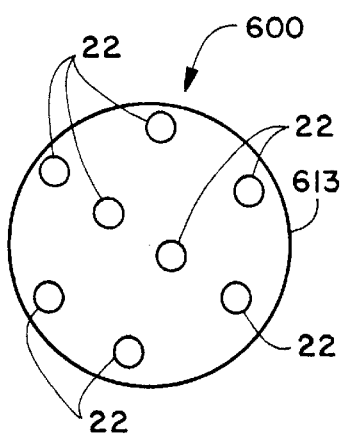

Referring to FIG. 9A, a side view is shown of a projectile system 600 made in accordance with one variation of the projectile system 10 (FIG. 1), described above, that has been modified to include a pattern of exterior dimples 22 in the capsule 613 that serve the tripartite purposes of facilitating fracture of the capsule 24 and atomization or dispersal of the substance contained therein, upon impact with the target and of improving flight of the projectile system 600 by decreasing drag and increasing lift thereof. Alternatively, these dimples may be on an interior surface of the capsule 613.

The projectile body, e.g., the capsule 613, of the projectile system 600 of FIG. 9A is similar in materials, dimensions and manufacture to the capsule 12 of the projectile system 10 shown in FIG. 1, but employs the pattern of exterior dimples 22 so as to facilitate rupture of the capsule 613 upon impact with a target and to provide lower drag and greater lift to the projectile system 600 during flight, thus potentially making possible longer distances of flight. Importantly, the dimples 22 provide structural weak points at which the capsule 613 can burst upon impact with the target, thereby improving atomization or dispersal of the inhibiting substance contained within the shell 613. This, in combination with the optimized fill specifications described herein, results in a larger and finer cloud of inhibiting/impairing substance being dispersed proximate to the target immediately following impact of the projectile system 600 with the target. The larger and finer cloud of inhibiting substance provides for more effective inhibition of the target than has heretofore been possible with conventional non-lethal or less-than-lethal projectiles.

The dimples 22 are most preferably round at their exterior edge, have a frustioconical-shaped wall and a flat, circular innermost surface, or basal portion. The dimples 22 preferably have a depth of at least about 0.05 mm preferably between about 0.05 mm and 2.0 mm, e.g., between about 0.1 mm and 1.5 mm, e.g., between about 0.2 mm and 1.0 mm, e.g., about 0.3 mm and preferably have a minimum depth of about 15% to 75%, e.g. 20% to 40% of the thickness of the casing or shell. Preferably, there are several dimples, for example, from between six and 50 dimples 22 (e.g., 20 dimples), on the shell/capsule 613 so as to provide omnidirectional atomization or dispersal of the inhibiting substance upon impact and a maximal decrease in drag and increase in lift.

The dimples 22 may be formed in the capsule 613 using known methods, for example, as a part of the injection molding process, using laser ablation techniques, or using other known plastics forming techniques.

Referring next to FIG. 9B, a side view is shown of a projectile system 600 made in accordance with another variation of the present invention, modified to include a different pattern of exterior dimples 32 (which may alternatively be on the interior surface of the capsule) in the shell 613 which dimples continue to serve the tripartite purposes of facilitating rupture of the capsule and atomization or dispersal of the inhibiting substance, upon impact with the target (whether a living target or a non-living target), and of decreasing drag and increasing lift of the projectile system during flight thereof.

Figure 9B:
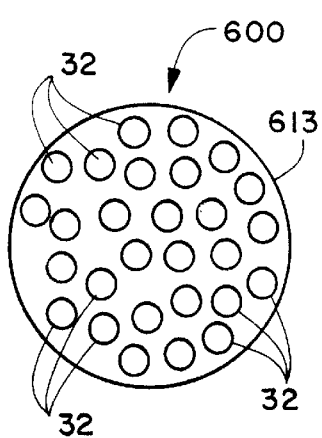
Figure 9D:
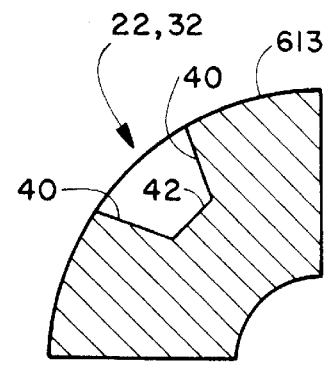
FIG. 9D is a partial cross-sectional view illustrating an example of an exterior dimple of the variations of the projectile as shown in FIGS. 9A through 9C.
Figure 10A:
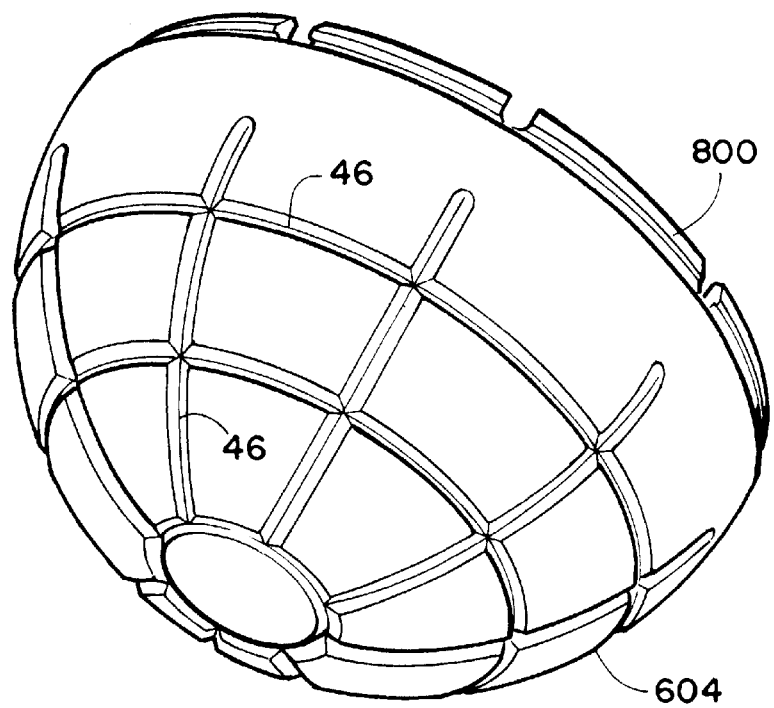
FIG. 10A is a perspective view of one half of a capsule of the present projectile system made in accordance with a further variation of the projectile system of FIG. 1 modified to include a matrix pattern of exterior global scoring and also showing the male flange of an embodiment of a snap-together capsule.
Figure 10B:
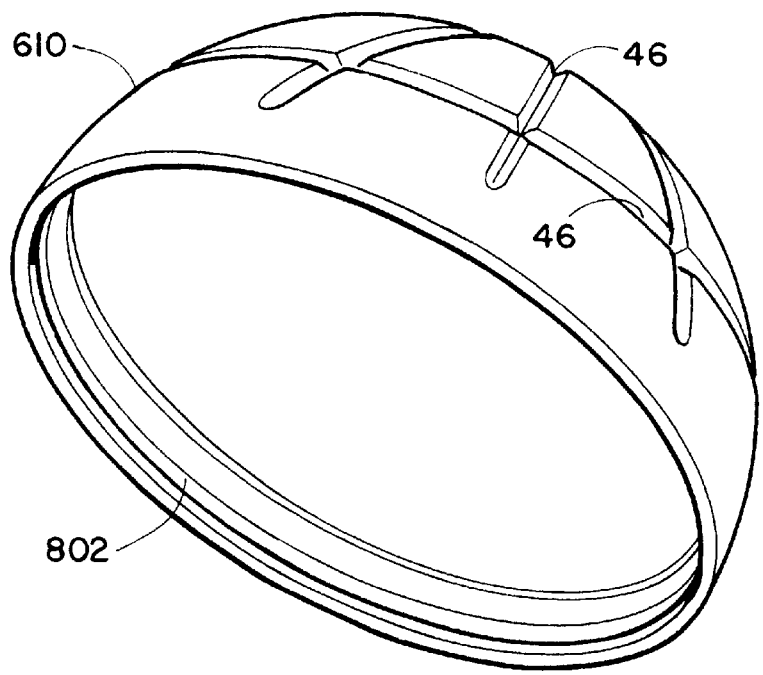
FIG. 10B is a perspective view of the complimentary, female, half of the capsule illustrated in FIG. 10A, also illustrating the matrix pattern of exterior global scoring and further showing an example of a female flange of the embodiment of the snap-together capsule.
Figure 11A:
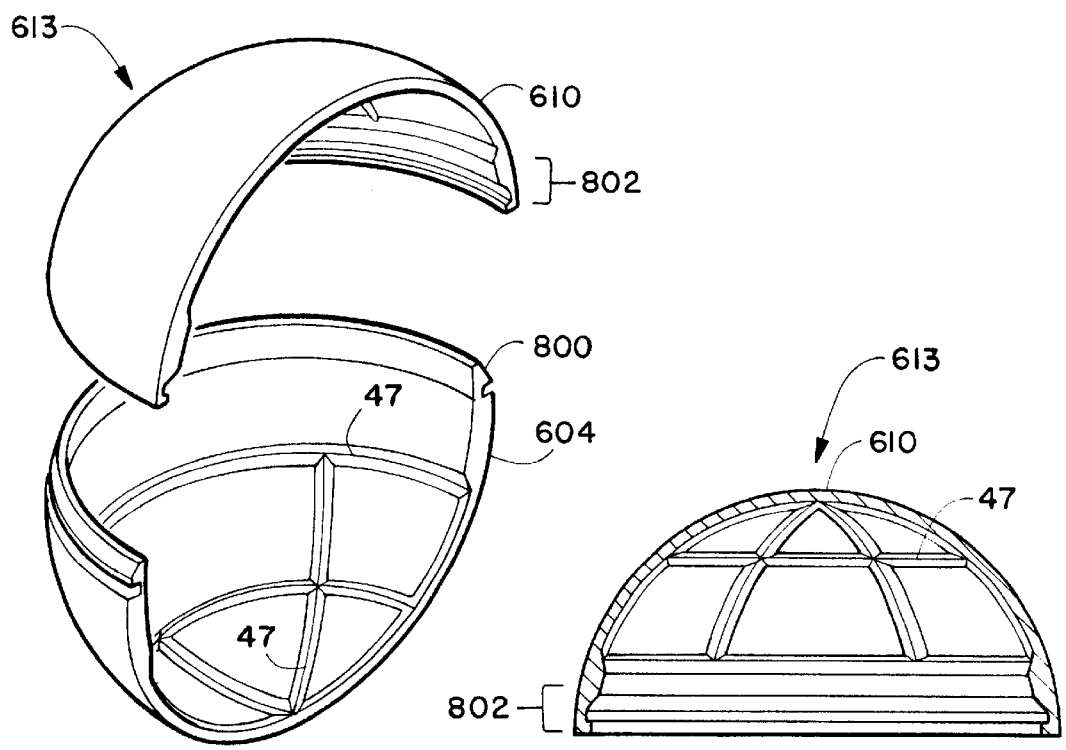
FIG. 11A is a cross-sectional perspective view of an alternative capsule in accordance with the projectile systems herein, wherein the capsule halves are not joined and illustrating interior scoring of the capsule.
Figure 11B:
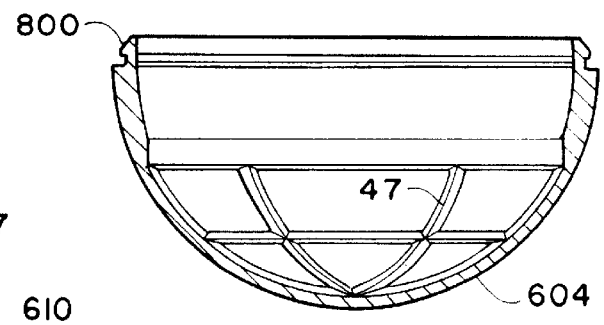
FIG. 11B is a cross-sectional side view of the capsule of FIG. 11A.
Figure 11C:
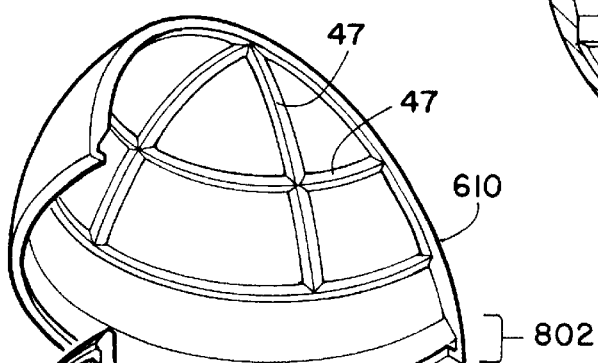
FIG. 11C is an additional cross-sectional perspective view of the capsule of FIGS. 11A and 11B.

As can be seen, there are a greater number of exterior dimples 32 in the variation of FIG. 9B in comparison to that of FIG. 9A, which may further improve rupture and atomization and further decrease drag and increase lift. Preferably, the dimples 3e are arranged in a pattern in the exterior surface of the casing 613 so that each of six equal sectors of the casing show at least one dimple 32 thereon. Other dimple arrangements, such as are known in the golfing arts, may also be suitable. See, e.g., U.S. Pat. No. 4,560,168, issued to Aoyama, for a GOLF BALL, incorporated herein by reference in its entirety.

Referring next to FIG. 9C, a side view is shown of a projectile made in accordance with another variation of the projectile of FIG. 1 modified to include two exterior dimples 22 (which alternatively may be formed on the interior surface of the capsule) in the shell 613, located at each pole of the projectile 600, that serves the tripartite purposes of decreasing drag, increasing lift, and facilitating atomization or dispersal of the inhibiting substance upon impact with the living target. As can be seen, this embodiment of the present invention contains only two exterior dimples compared to the embodiments shown in FIGS. 9A and 9B. Thus, even with as few as two exterior dimples 22, the projectile 600 will have an enhanced rupturing upon impact with a target. The two exterior dimples 22 are located at both poles of the projectile, e.g. the north pole and the south pole; however, the skilled artist may easily alter the location the two exterior dimples 22, or alternatively, only use one dimple.

Referring next to FIG. 9D, a partial cross-sectional view is shown of an example of a structure for the exterior dimples 22, 32 of the above-described capsules 613, as shown in FIGS. 9A through 9C. As can be seen, the dimples 22, 32 have frustioconical-shaped interior walls 40 and a flat innermost surface 42, or basal portion, with a depth of at least about 0.05 mm, preferably between about 0.05 mm and 2.0 mm, e.g., between about 0.1 mm and 1.5 mm, e.g., between abut 0.2 mm and 1.0 mm, e.g., about 0.3 mm and preferably have a minimum depth of about 15% to 75%, e.g. 20% to 40% of the thickness of the casing or shell. As mentioned above, the dimples 22, 32 can be produced using laser ablation techniques, by forming them into the shell using injection molding techniques or using other known forming techniques.

Alternatively, the dimples 22, 34 may be formed within an interior surface of the capsule 613, instead of at the exterior surface. The interior dimple may be formed the same as the exterior dimple, although positioned at the interior surface of the capsule 613.

FIGS. 10A and 10B are prospective views of two complimentary halves of a capsule 604, 610 (also referred to as a bottom or first part 604 and a top or second part 610 of a projectile body, e.g., capsule) made in accordance with a still further variation of the system of FIG. 1. In this embodiment, the capsule 604 and 610 together is modified to include a matrix pattern of exterior global scoring 46 that serve the tripartite purposes of facilitating rupture of the capsule and atomization of the inhibiting substance, upon impact with the living target, and of decreasing drag and increasing lift during flight of the projectile system.

The capsule halves 604, 610 of FIGS. 10A and 10B are similar in materials, dimensions and manufacture to those previously described, but employ the matrix pattern of exterior global scoring 46 as an added feature. The scoring provides a lattice of structural weak points at which the casing can burst upon impact with the target. As with the embodiment shown in FIGS. 9A–9D, this results in a larger and finer cloud of inhibiting substance being dispersed proximate to the target, immediately following impact of the projectile system with the target. Such dispersal provides for more effective inhibiting of the target than has heretofore been possible with conventional projectile approaches. The scoring 46 is preferably "V"-shaped in cross-section with an angled or slightly flat bottom portion of the "V" providing a basal portion of such scoring. The scoring preferably has a depth of from between about 0.1 mm and 1.5 mm, e.g., between about 0.2 mm and 1.0 mm, e.g., about 0.6 mm and preferably has a minimum depth of about 15% to 75%, e.g. 20% to 40% of the thickness of the casing or shell 604, 610. Preferably, there are from between about 2 and 10, e.g., between 4 and 7, circumferential (i.e., latitudinal) scores and from between about 2 and 10, e.g., between 6 and 8 longitudinal scores in the surface of the shell 604, 610 so as to provide omnidirectional atomization or dispersal of the inhibiting substance upon impact and a maximal decrease in drag and increase in lift for the projectile.

Furthermore, a feature illustrated in FIGS. 10A and 10B is that there are both longitudinal and latitudinal scoring 46 in the capsule halves 604, 610. Having both longitudinal and latitudinal scoring allows for a greater dispersal than simply having either longitudinal or latitudinal scoring alone since the substance contained within will be able to disperse radially along both longitudinal and latitudinal fractures of the capsule 613. Although a capsule without these structurally weakening features or dimples may fracture similarly, the fracturing process is more randomized or at best fractures about an axis of manufacture. Furthermore, if the walls of a capsule are not thick enough, the capsule may not fracture at all, but simply flex upon impact. The addition of structurally weakening scorings, and in particular, to the placement of these scorings along both longitudinal and latitudinal axises allow for the controlled fracturing or predictable fracturing of the capsule in such a way that maximizes the dispersal of the substance contained therein. Thus, the walls of the capsule may be made slightly thicker, so that the force upon impact is concentrated along the scoring (whether exterior or interior as shown in FIGS. 11A and 11B), which advantageously causes the capsule to fracture at the scoring.

FIGS. 11A through 11C are cut-away perspective and side views of yet another alternative embodiment of the capsules 613 of the present projectile systems. In these embodiments, interior surface scoring 47 is used to facilitate rupture of the capsule 613 and atomization or dispersal of the substance contained therein (not illustrated), upon impact of the projectile system with a living target. The structure and dimensions of the capsule 613 is as previously described. Similarly, the structure and dimensions of the interior scoring is the same as just described for the exterior scoring. The interior scoring 47 is preferably formed into the capsule halves 604, 610 (also referred to as a bottom or first part 604 and a top or second part 610 of the capsule) during manufacture thereof, for example during molding of the capsule halves. Alternatively, the interior scoring 47 may be added to the capsule halves 604, 610 after manufacture and before filling of the halves, such as by laser ablation. Again, advantageously, in this embodiment both longitudinal and latitudinal scoring are implemented to control and optimize the dispersal of the substance within the capsule.

Referring next to FIG. 12A, an illustration is shown of the components of a three-part capsule (also referred to more generically as a three-part projectile body) of a projectile or projectile system as a variation of the projectile of FIG. 1 and a variation of the two-part capsules of the projectiles of FIGS. 2–8 and 10A–11C in accordance with another embodiment of the present invention. Furthermore, while referring to FIG. 12A, concurrent reference will be made to FIG. 14, which is a flowchart 1400 of one embodiment of the steps performed in assembling and filling of the three-part capsule of FIGS. 12A through 13B.

Figure 12A:
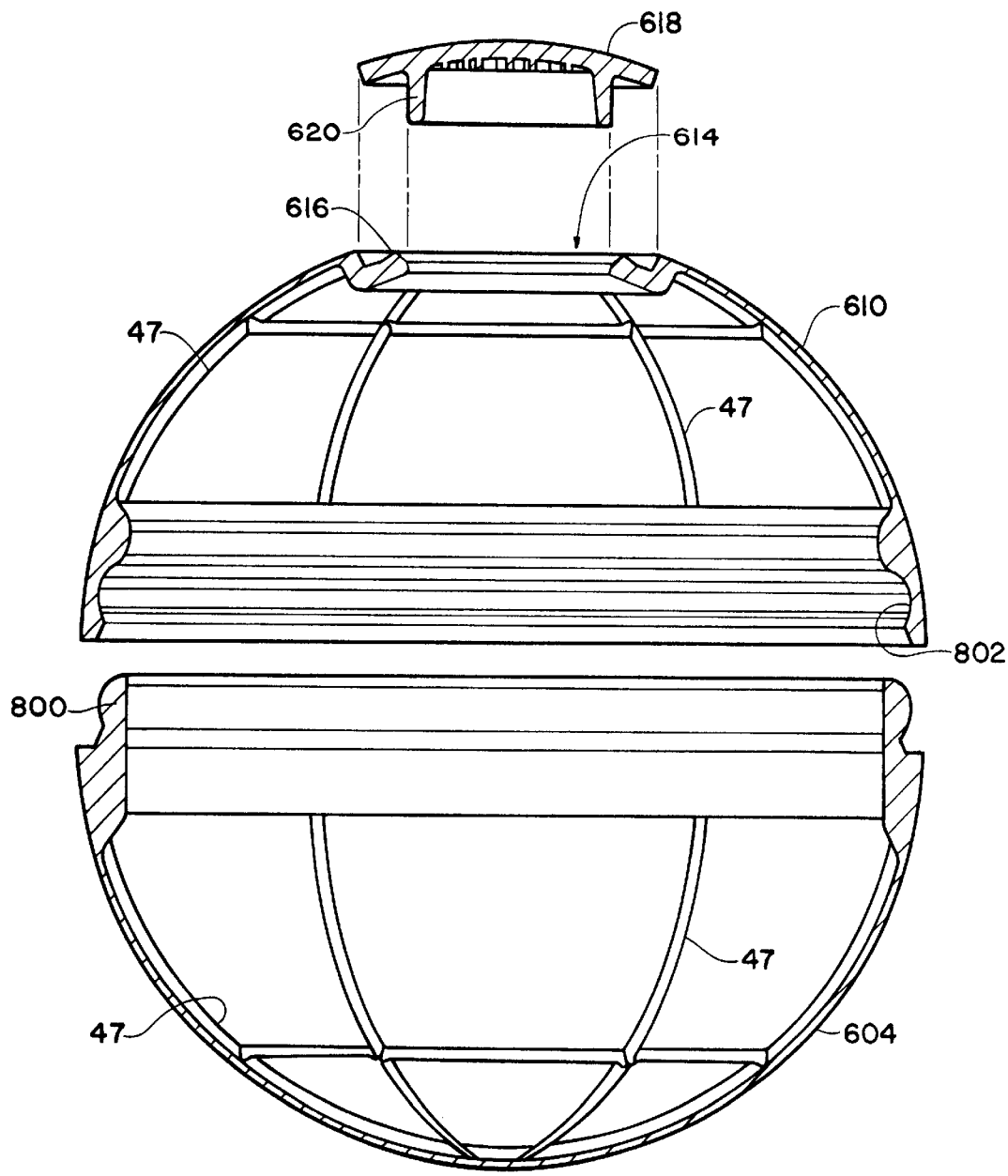
FIG. 12A is an illustration of the components of a three-part projectile capsule as a variation to the projectile of FIG. 1 and the two-part projectiles of FIGS. 2–8 and 10A–11C in accordance with another embodiment of the present invention.

Shown in FIG. 12A are two halves 604, 610 and a lid 618 of a three-part capsule. The two halves 604 may also be referred to as a bottom or first part 604 and a top or second part 610. The lid 618 may also be referred to as a third part 618. The first part 604 and the second part 610 are similar to the halves 604 and 610 described above. As an initial step in the assembly of the three-part projectile, the parts of the three-part capsule are fabricated (Step 1402 of FIG. 14), using similar techniques as described with reference to FIG. 7. The first part 604 includes a flange 800 that is designed to mate with a flange 802 of the second part 610. These flanges 800 and 802 may snap together, glued together, or otherwise bonded together, e.g. ultrasonic bonding, similar to the techniques described with reference to FIG. 7 and in the formation of hermetic seals.

Furthermore, the top or second part 610 includes a fill hole 614 formed at the pole of the second part 610. The fill hole includes a flange 616 at its perimeter that is designed to receive a lid 618 or third part 618. The lid 618 includes a rim 620 that is adapted to be inserted into the fill hole 614 against the flange 616 such that the top surface of the lid 618 fits preferably flush with the exterior surface of the second part 610. Note also, that interior surface scorings 47, both in a longitudinal and latitudinal pattern are formed within the first and second part 604 and 610. Such interior scorings 47 are not required, but are preferred since they provide a controlled fracturing of the projectile which optimizes the dispersal of substances contained therein.

The addition of the fill hole 618 formed in the second part 610 advantageously allows for a simple and effective operation of filling the capsule with either liquid or powder substances in a manner wherein a majority of the volume contained within the capsule is filled with the substances. For example, using the three-part capsule, the capsule may be filled with at least 90% of its interior volume with either a liquid or a powder substance. This is a departure from prior art attempts to filling a capsule with a powder substance or even a liquid substance such that greater than 50% of the interior volume is filled with the substance. The prior art, such as discussed above in U.S. Pat. No. 5,254,379 (Kotsiopoulos et al.) attempts to fill paint balls with a small capillary during the formation of the paint ball. Furthermore, it is not feasible to pour a powdered substance through a small capillary since a powdered substance will not pour effectively through a capillary, resulting in spillage. This is especially problematic when using inhibiting substances, such as oleoresin capsicum or capsaicin, either in powder or liquid form, since spillage potentially poses a risk to the manufacturers.

In contrast, the three-part capsule is manufactured by adhering and sealing the first part 604 to the second part 610 (Step 1404 of FIG. 14) similarly as described above with reference to FIG. 7, for example, by snapping, glueing or otherwise bonding the first part 604 to the second part 610 and includes forming hermetic seals as well. Then, the substance or substances to be delivered within the projectile are inserted into the volume of the combination of the first part 604 and the second part 610 through the fill hole 614 in the second part 610 (Step 1406 of FIG. 14). The fill hole 614 is large enough such that the substance, whether liquid or powder, may be poured into the capsule without spilling, at least when properly filled. Advantageously, the fill hole is large enough such that spillage rarely occurs with the proper techniques, for example, using a pipe, funnel or similar pouring and/or guiding device. As an optional step, particularly for use with a powdered substance, the powdered substance is compressed (Step 1408 of FIG. 14), for example, with a mandrel or similar object that can be placed within the fill hole 614 to mechanically compress the powder within the volume of the first and second parts 604, 610. Then, typically, the volume is refilled (Step 1410 of FIG. 14), which fills the remainder of the volume with the substance, or at least fills the volume to a desired level. Thus, the capsule may literally be filled such almost the entire interior volume of the capsule is taken up by the substance or substances, e.g. at least 80%, or at least 90% or even at least 98%. Advantageously, a higher fill allows the projectile to fly farther and in a straighter flight path.

Once the substance is filled into the capsule, the lid 618 is placed or positioned into the fill hole 614 (Step 1412 of FIG. 14) such that the rim 620 extends into the interior volume of the second part 610 and fits snugly against the flange 616 of the second part 610. The exterior surface of the lid 618 is then substantially flush with the exterior surface of the second part 610. To complete the assembly of the three-part capsule, the lid or third part 618 is fixed and sealed within the fill hole 614 (Step 1414 of FIG. 14), for example, by adhering, snapping the lid into the fill hole, heat bonding, ultrasonically bonding, friction bonding, or otherwise bonding the lid within the fill hole 614 such as described above with reference to FIG. 7. In preferred embodiments, a hermetic seal is created between the first part 604 and the second part 610, as well as between the lid 618 and the fill hole 614. Thus, at completion of the assembly a three-part projectile is created.

It is noted that the use of membranes, such as described above, or other devices to hold a substance or substances within respective halves, is not required. This provides a much simpler assembly. Further advantageously, a single capsule design will support the filling of both liquid substances and powder substances. Thus, a manufacturer does not need to design two types of capsules, one to be filled with a liquid substance and one to be filled with a powder substance.

Figure 12B:
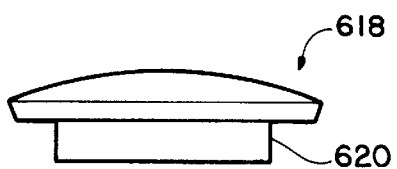
FIG. 12B is a perspective view of the lid of the three-part projectile of FIG. 12A.

Referring next to FIG. 12B, a perspective view is shown of the lid 618 of the three-part capsule of FIG. 12A. The lid 618 or third part 618 includes an exterior surface and a rim 620 that is adapted to extend into the volume of the second part 610. Although the lid 618 may simply be a cutout from the second part 610, e.g. like a pumpkin lid, the lid is advantageously formed separately to include the rim 620, which aids in the sealing between the second part 610 and the lid 618.

Figure 13A:
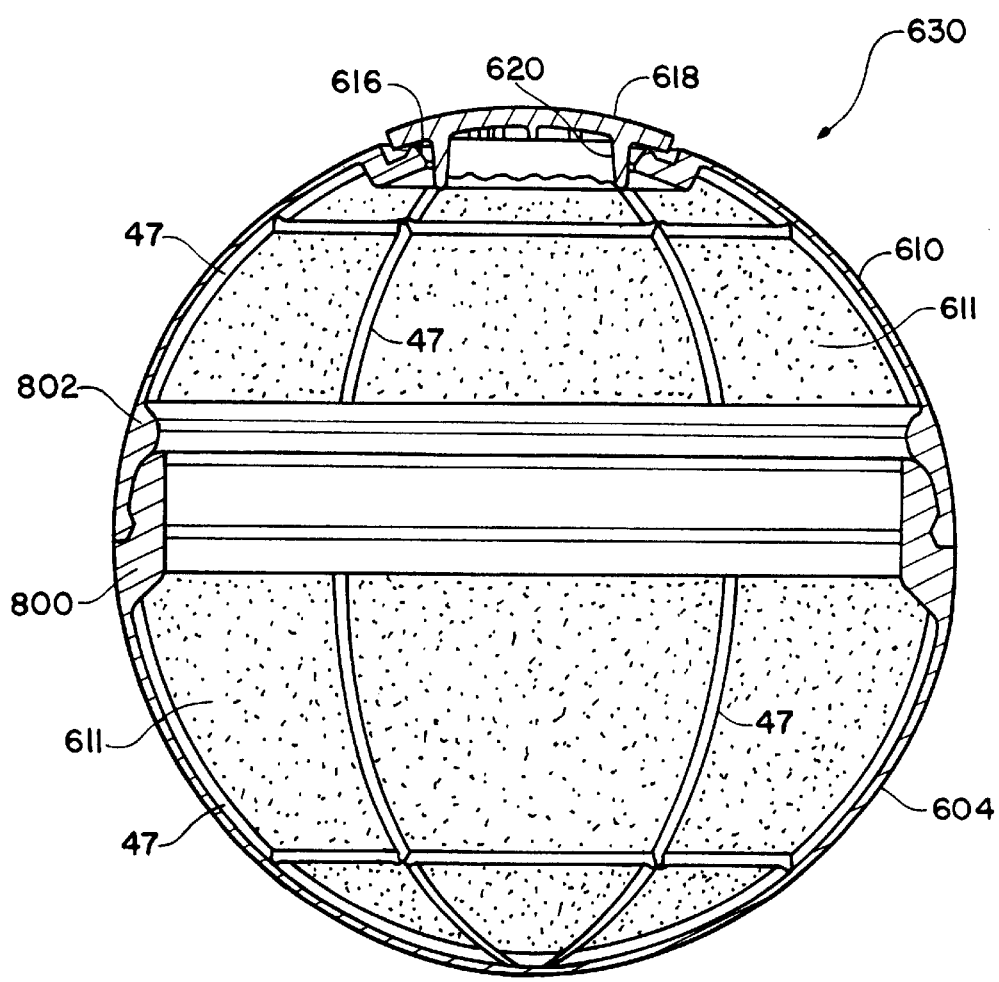
FIG. 13A is an illustration of an assembled three part projectile of FIGS. 12A and 12B containing one or more of an inhibiting substance, a marking substance, malodorant, and an inert substance.

Referring next to FIG. 13A, an illustration is shown of an assembled three-part projectile of FIGS. 12A and 12B containing one or more of an inhibiting substance, a marking substance, malodorant, and an inert substance. The three-part projectile 630 is shown including the first part 604, sealed within the second part 610 at flanges 800 and 802, the lid 618 or third part 618 sealed within the fill hole of the second part 610. Note that in this embodiment, the projectile body comprises the first, second and third parts 604, 610 and 618. The rim 620 of the lid 618 extends into and is sealed into the fill hole and engages the flange 616 such that the exterior surface of the lid 618 is substantially flush with the exterior surface of the second part 610. Also shown are the interior scoring 47, along both longitudinal and latitudinal axises. Further illustrated is the substance 611 contained within the three-part projectile 630. The substance 611 may actually comprise one or more substances, and may be either liquid and powder, as described above. Further illustrated is the approximate fill of the three-part projectile 630. It can be seen that the three-part capsule 630 may advantageously be filled almost entirely with the substance 611, for example, at least 90% of the volume within the three-part projectile 630.

Figure 13B:
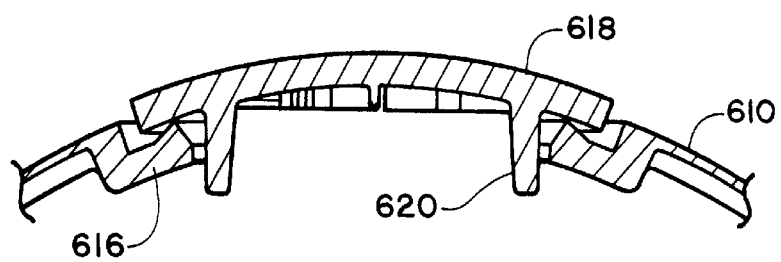
FIG. 13B is a cross sectional view of the lid as assembled into a second part or component of the three part projectile of FIG. 13A.

Referring next to FIG. 13B, a cross sectional view is shown of the lid as assembled into the second part or component of the three part projectile of FIG. 13A. The lid 618 which includes the rim 620 is inserted into the fill hole formed within flange 616 of the second part 610. The rim 620 engages the flange 616 and the flange 616 also provides a seat for the lid 618. Once bonded together, a hermetic seal is typically created between the lid 618 and the second part 610.

Referring next to FIGS. 15A through 15D, simplified side views are shown of various embodiments of a two-part projectile, such as produced according to FIG. 7, variously including structurally weakening features, such as exterior or interior scoring (longitudinal and/or latitudinal) and/or exterior or interior dimples, and containing one or more substances to be delivered to a target upon impact with the target as described above.

Figure 15A:
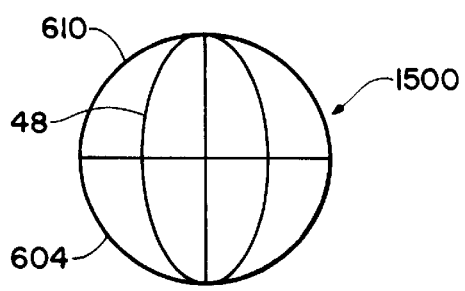
FIGS. 15A through 15D are simplified side views of various embodiments of a two-part projectile, variously including structurally weakening features, such as exterior or interior scoring (longitudinal and/or latitudinal) and/or exterior or interior dimples.

FIG. 15A is a variation of a projectile 1500 including a first part 604 and a second part 610 and further including latitudinal (or vertical) scorings 48. These latitudinal scoring 48 may be either on the exterior surface or the interior surface of the projectile 1500.

Figure 15B:
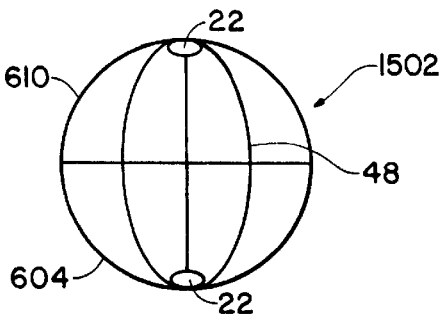

FIG. 15B is another variation of a projectile 1502 including a first part 604, a second part 610, latitudinal scorings 48, and dimples 22 at each pole of the projectile 1502. These dimples 22, as well as the latitudinal scorings 48, may be either on the exterior surface or the interior surface of the projectile 1502.

Figure 15C:
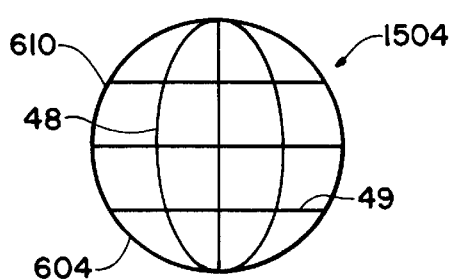

FIG. 15C is yet another variation of a projectile 1504 including a first part 604, a second part 610, latitudinal scorings 48, and longitudinal (or horizontal) scorings 49. The latitudinal and longitudinal scorings 48 and 49, may be either on the exterior surface or the interior surface of the projectile 1504.

Figure 15D:
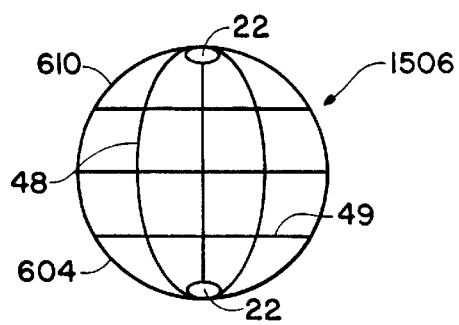

FIG. 15D is a further variation of a projectile 1506 including a first part 604, a second part 610, latitudinal scorings 48, longitudinal scorings 49, and dimples 22 at the poles of the projectile 1506. The latitudinal and longitudinal scorings 48 and 49, as well as the dimples 22, may be either on the exterior surface or the interior surface of the projectile 1506.

Furthermore, in accordance with the embodiments of FIGS. 15A through 15D, the number and location of the scoring and dimples may be altered to control and optimize the dispersal of the substance or substances contained within the various projectiles.

Figure 14:
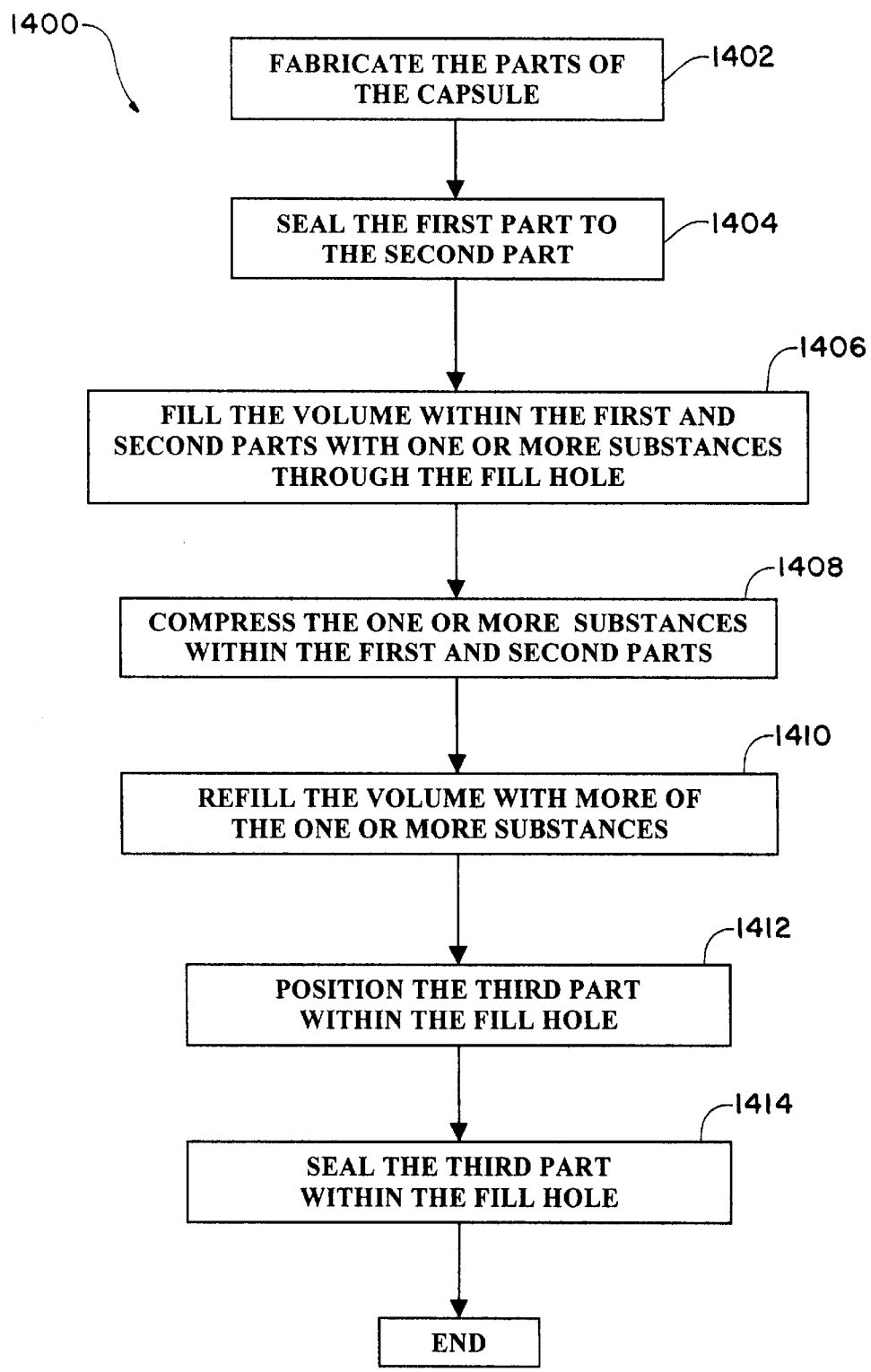
FIG. 14 is a flowchart of one embodiment of the steps performed in assembling and filling the three-part projectile of FIGS. 13A and 13B.
Figure 16A:
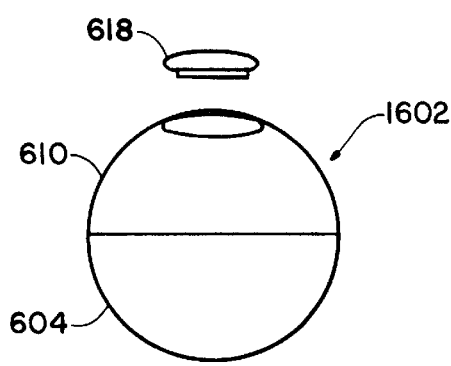
FIG. 16A is a simplified side view of a three-part projectile similar to that shown in FIGS. 1 and 13A without any structurally weakening features.

Referring next to FIG. 16A, a simplified side view is shown of a three-part projectile 1602 similar to that shown in FIGS. 1 and 13A, and assembled, for example, according to the method of FIG. 14, without any structurally weakening features. The three part projectile 1602 includes a projectile body (e.g., a capsule) including a first part 604, second part 610, lid 618 (or third part) and contains one or more substances to be delivered to a target upon impact with the target as described above.

Referring next to FIGS. 16B–16E, simplified side views are shown of various embodiments of the three-part projectile of FIG. 16A, variously including structurally weakening features, such as exterior or interior scoring (longitudinal and/or latitudinal) and/or exterior or interior dimples.

Figure 16B:
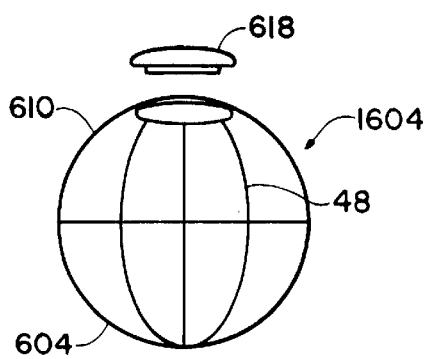
FIGS. 16B–16E are simplified side views of various embodiments of the three-part projectile of FIG. 16A, variously including structurally weakening features, such as exterior or interior scoring (longitudinal and/or latitudinal) and/or exterior or interior dimples.

First, referring to FIG. 16B, a projectile 1604 is shown that includes the first part 604, second part 610, lid 618, and latitudinal scorings 48. These latitudinal scorings 48 may be on the exterior or the interior of the projectile 1604.

Figure 16C:
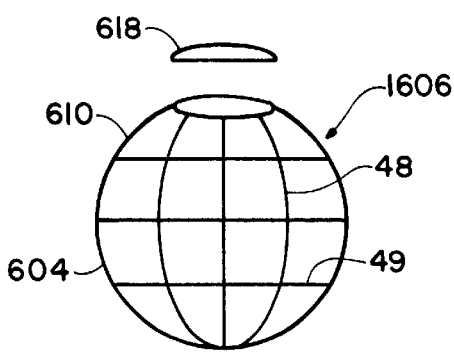

Referring next to FIG. 16C, a projectile 1606 is shown that includes the first part 604, second part 610, lid 618, latitudinal scorings 48 and longitudinal scorings 49. These latitudinal and longitudinal scorings 48 and 49 may be on the exterior or the interior of the projectile 1606.

Figure 16D:
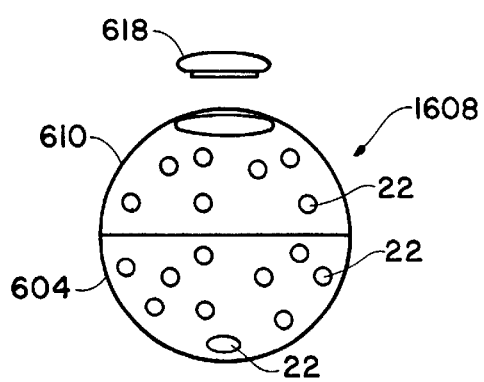

Referring next to FIG. 16D, a projectile 1608 is shown that includes the first part 604, second part 610, lid 618 and dimples 22 formed in the projectile 1608. Again, the dimples 22 may be on the exterior or the interior of the projectile 1608. Furthermore, these dimples 22 may be circular in shape or oblong or elliptical.

Figures 16E, 17A, 17B:
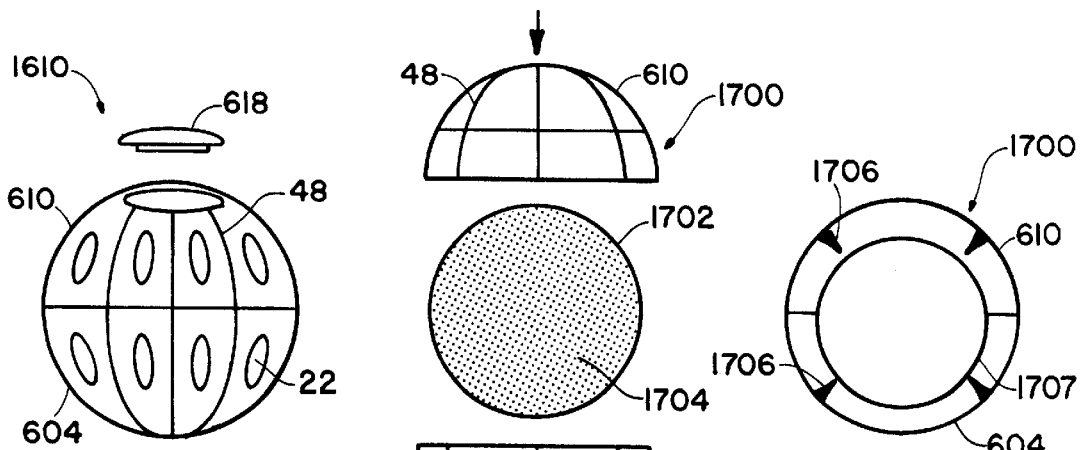
FIG. 17A is a side view of an embodiment of the projectile of FIG. 1 including a glass capsule within the projectile capsule for containing particularly difficult to contain malodorants until such time as upon impact with a target.
FIG. 17B is a cross sectional view of one embodiment of the interior of the projectile of FIG. 17A including protrusions to guide or position the glass capsule within the projectile capsule and facilitate the fracturing or rupturing of the glass capsule upon impact with the target.

Referring next to FIG. 16E, a projectile 1610 is shown that includes the first part 604, second part 610, lid 618, latitudinal scorings 48 and dimples 22, shown as elliptical dimples 22. Again, these latitudinal scorings 48 and dimples 22 may be on the exterior or the interior of the projectile 1610.

Furthermore, in accordance with the embodiments of FIGS. 16B through 16E, the number and location of the scoring and dimples may be altered to control and optimize the dispersal of the substance or substances contained within the various projectiles.

Referring next to FIG. 17A, a side view is shown of an embodiment of the projectile of FIG. 1 including a glass capsule within the projectile capsule for containing particularly difficult to contain malodorants until such time as upon impact with a target. Shown is the projectile 1700 including the first part 604, the second part 610, each optionally including latitudinal and/or longitudinal scorings 48 and 49 (either exterior or interior). Also shown is a glass capsule 1702 containing a malodorant 1704.

The glass capsule 1702 is formed using conventional methods, for example by fire sealing or fire welding, such that the malodorant 1704 is sealed within the glass capsule 1702. For example, the glass capsule 1702 may contain at least 20% of its volume with the malodorant 1704 and preferably at least 50%, and most preferably at least 80%. The glass capsule 1702 is preferably formed to have an exterior dimension slightly smaller than an interior dimension of the first part 604 and the second part 610. Furthermore, there may be guides or protrusions formed within the interior surface of the first and second parts 604 and 610 (see FIG. 17B) such that the glass capsule 1702 is centered within the first and second parts 604 and 610. In an alternative embodiment, an inhibiting substance, an inert substance and/or a marking substance, in either powder or liquid form may be within the capsule 604, 610, between the glass capsule 1702 and the inner surface of the capsule 604, 610.

Sealing the malodorant 1704 within the glass capsule 1702 is important for embodiments of the non-lethal projectiles that use compounds such as Dragons Breath made by DeNovo Industries of The Woodlands, Tex. Such a malodorant 1704 is an organic sulfur compound and will readily seep through, or eat through, or otherwise breach the plastic or similar construction of the first and second parts 604 and 610. As such, the malodorant 1704 has a solvent effect that will penetrate most plastic type capsules. Thus, the glass capsule 1702 within the first and second parts 604 and 610 acts to contain the malodorant 1704 until such time as being impacted at a target. It is noted that other materials, other than glass, may be used by the skilled artist to effectively contain such a malodorant 1704. Furthermore, the projectile 1700 retains several other useful features which will assist in the fracturing of the first and second parts 604 and 610 and in the dispersal of the malodorant 1704.

Referring next to FIG. 17B, a cross sectional view is shown of one embodiment of the interior of the projectile 1700 of FIG. 17A including protrusions 1706 to guide or position the glass capsule 1702 within the projectile capsule and facilitate the breakage or rupturing of the glass capsule 1702 upon impact with the target. The protrusions 1706 are illustrated as points that extend from the inner surface of the capsule. They may alternatively be described as rounded bumps, or ridges that extend a length (with either pointed or rounded edges). The protrusions 1706 serve to guide the glass capsule 1702 centrally within the capsule, protect the glass capsule 1702 during the stresses of launching, and also to assist in the fracturing of the glass capsule 1702 upon impact by concentrating the stresses of impact on specified points on the glass capsule 1702. Conveniently, the protrusions 1706 are evenly spaced or spaced in a desired pattern to optimize the fracturing of the glass capsule 1702 as the projectile capsule ruptures. Alternatively, an inhibiting substance, marking substance and/or an inert substance may be positioned between the inner surface of the capsule 604, 610 and the glass capsule 1702 in addition to or instead of the protrusions 1706.

Furthermore, in any of the above described embodiments, the substance or substances contained within the projectiles, particularly within the two-part and three part projectiles described in FIGS. 1 through 17B, whether the substances are gas, liquid, solid, or powder, the contents of the projectile may be pressurized. Such pressurization will further assist in the atomization or dispersal of the contents of the projectile upon impact with a target. Several techniques may be used to effectively pressurize the contents of the projectiles to a desired level of internal pressure which is dependent upon the materials and construction of the specific projectile.

First, the projectile may be produced within a pressurized atmosphere, such that upon completion of the assembly and removal into a normal pressure atmosphere, the sealed contents of the projectile will be at a higher internal pressure than the outside atmosphere. Second, a cold seltzer water may be added to the contents of the projectile. Such cold seltzer water produces carbon dioxide when heated up (or returning to room temperature) which would increase the pressure within the projectile. Third, a small particle of a cryogenic material, such as dry ice or liquid nitrogen, and preferably non-volatile, may be added to the contents of the projectile. Fourth, the contents of the projectile may be frozen which will be most effective typically for liquid contents. Fifth, liquid carbon dioxide may be mixed in with the contents of the projectile. These methods are conventional methods of increasing an internal pressure of a container.

Figures 18, 19:
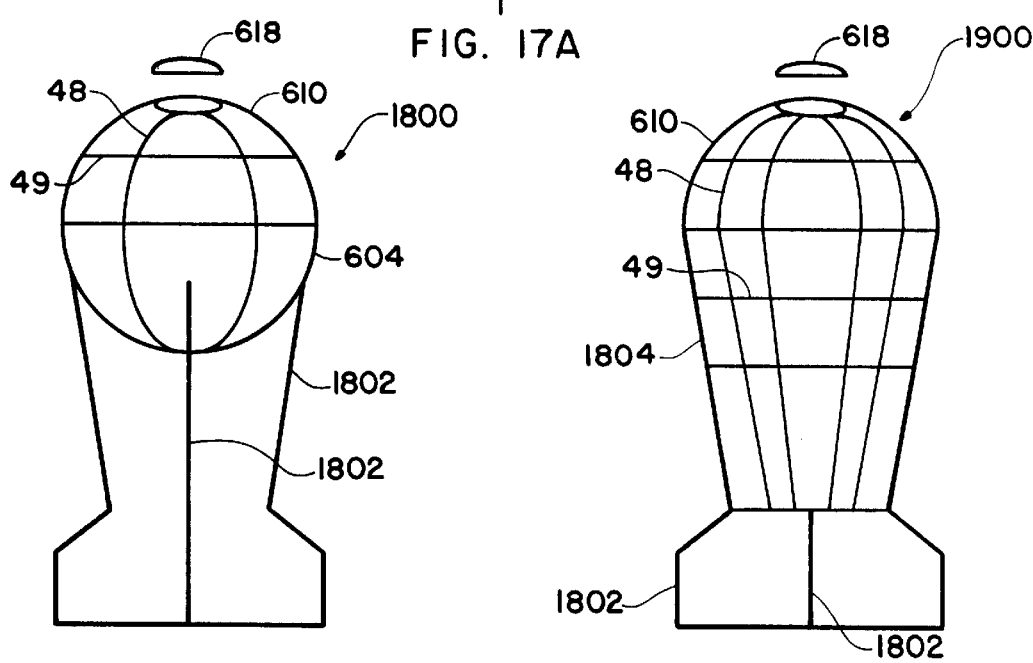
FIG. 18 is a side view of an embodiment of a variation of the projectile of FIG. 16A, illustrating a fins coupled to a portion of the projectile so as to assist in stabilizing the flight of the projectile.
FIG. 19 is a side view of a variation of the projectile of FIG. 18, illustrating a three-part projectile in which a bottom or a first part of the capsule is an integrated body including stabilizing fins and further illustrating a non-spherical projectile capsule.

Referring next to FIG. 18, a side view is shown of an embodiment of a variation of the projectile of FIG. 16A, illustrating a fins coupled to a portion of the projectile so as to assist in stabilizing the flight of the projectile. Shown is the projectile 1800 including the first part 604, the second part 610, the third part 618, and fins 1802. Also shown are optional structurally weakening features, such as scorings, for example, latitudinal and longitudinal scorings 48 and 49. The fins 1802 may be individual fins that are attached, bonded, or molded to a portion of the (projectile body) capsule, for example, to the first part 604 so as to help stabilize the projectile 1800 in flight in order to increase the range of the projectile 1800. The fins 1802 may be made of the same material as the capsule. Furthermore, the fins 1802 may be individual fins or may be a single fin body including more than one fin 1802, for example, four fins 1802, that are attached or bonded to the portion of the capsule. Note that although shown as a three-part projectile, the projectile 1800 may be a two-part projectile.

Referring next to FIG. 19, a side view is shown of a variation of the projectile of FIG. 18, illustrating a three-part projectile in which a first or bottom part of the projectile body, e.g., capsule, is an integrated body including stabilizing fins and further illustrating a non-spherical projectile capsule. Shown is a variation of a projectile 1900 including a second part 610, third part 618, fins 1802, and a modified first part 1804. Also shown are optional structurally weakening features, such as scorings, for example, latitudinal and longitudinal scorings 48 and 49. The first part 1804 in this embodiment is modified so as to be integrated with the fins 1802 and is typically no longer hemispherical in shape. The modified first part 1804 is illustrated as cup shaped and is configured to carry a larger payload of material within the body of the projectile 1900 than the projectile 1800 of FIG. 18. Thus, the capsule of this embodiment is not spherical. Again, the fins 1802 add stability for a greater flight range as well as a greater payload of the projectile 1900.

Figure 20A:
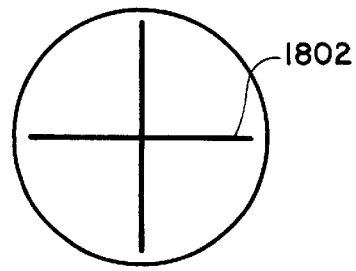
FIGS. 20A and 20B are end views of variations the stabilizing fins of FIGS. 18 and 19, illustrating straight fins and curved fins, respectively.
Figure 20B:
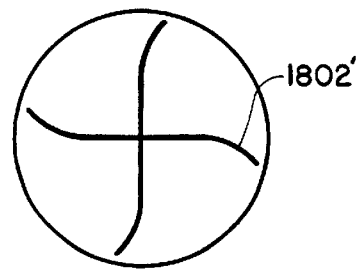

Referring next to FIGS. 20A and 20B, end views are shown of variations the stabilizing fins 1802 of FIGS. 18 and 19, illustrating straight fins 1802 and curved fins 1802', respectively. The view is, for example, looking up underneath the views as shown in FIGS. 18 and 19. In one embodiment, straight fins 1802 may be implemented to stabilize the flight of the projectile. In another embodiment, curved fins 1802' may be implemented that add an additional radial stability or spin stabilization to the projectile in flight.

Figure 21:
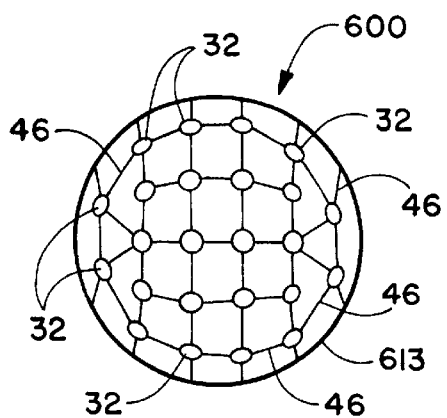
FIG. 21 is a side-view of a projectile system made in accordance with a still further variation of the system of FIG. 1, wherein the capsule is modified to include both a matrix pattern of exterior global scoring and a pattern of exterior dimples.

FIG. 21 is a side-view of a projectile system 600 made in accordance with a still further variation of the system of FIG. 1. In this embodiment, the capsule 613 is modified to include both a matrix pattern of exterior global scoring 46 and a pattern of dimples 32, which dimples are, preferably, interconnected by the matrix pattern of scoring. This combination of dimples and scoring serves tripartite purposes of facilitating rupture of the capsule, and atomization of the substance contained therein, upon impact with the living target and of decreasing drag and increasing lift during flight of the projectile system. As the exterior structurally weakening features of dimples and scoring are substantially as described above with reference to FIGS. 9A through 10B, further description of the structure, shape and dimensions of the dimples and scoring in FIG. 21 is not made herein.

The scoring and the dimples, illustrated in FIG. 21, provide a lattice of structural weak points interconnecting structurally weakening dimples, at all of which the capsule 613 can burst upon impact with the target. As with the above embodiments, this results in a larger and finer cloud of inhibiting substance being dispersed proximate to the target, immediately following impact of the projectile system 600 with the target. Such dispersal provides for more effective inhibiting of the target than has heretofore been possible with conventional projectile approaches. It is noted that these scorings and dimples may alternatively be located or formed within interior surfaces of the projectile.

Next, referring to FIGS. 22A through 22E, several embodiments are shown which focus on the contents of the non-lethal projectiles, as variously described above. The use of various additions to the substance or substances to be contained within the projectiles may further assist in the improved dispersal of the substance or substances contained therein upon impact with a target. The projectiles may be any of the embodiments described above.

Figure 22C:
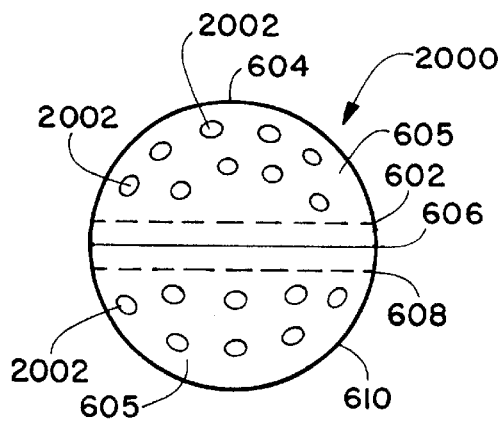
FIG. 22C is a cross-sectional view of still another variation of the projectile systems described herein, wherein metal shot has been added to the substance contained within the capsule.
Figure 22A:
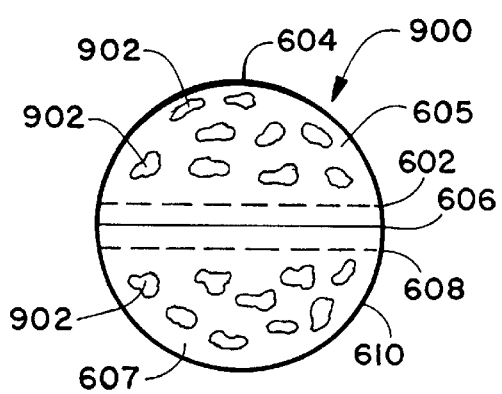
FIG. 22A is a cross-sectional view of a further variation of the projectile systems described herein, wherein solid material, such as walnut shells or rice, has been added to the substance contained within the capsule.

Referring first to FIG. 22A, a cross sectional view is shown of a further variation of the projectile systems described herein. The projectile system 900 is similar in structure and contents to the projectile systems as described above, except that solid material 902 has been added to the substance 605, 607 e.g., a powdered inhibiting substance, within the capsule. As can be seen, the halves 604, 610 (or first part 604 and second part 610), the membranes 602, 608 and the inhibiting substance 605, 607 are shown, and are substantially the same as described above, for example, with reference to FIGS. 2–4. Assembly is substantially as illustrated, for example, in FIGS. 2–6A and as described in FIG. 7 for a two-part projectile, but with the addition of the solid material to the substance within the capsule. Although FIGS. 22A through 22E primarily illustrate the two part projectile, it is noted that the same principals apply to a three-part projectile (as assembled in FIG. 14) as described above. The solid material 902 may be, for example, crushed walnut shells, rice, metal particles, such as metal powder or filings, wood particles, such as wood shavings or wood dust, or any other readily available solid that can be added to the substance 605. Facts such as cost, density, and toxicity factor into selection of the solid material 902.

Advantageously, the solid material 902 helps to disperse the substance 605, 607 by carrying the substance 605, 607 quickly away from the point of impact in a generally radial (or lateral) direction. Further discussion of the radial dispersion of the substance 605, 607 is made herein below, both with respect to projectiles carrying a solid material 902, and projectiles not carrying solid material.

Figure 22D:
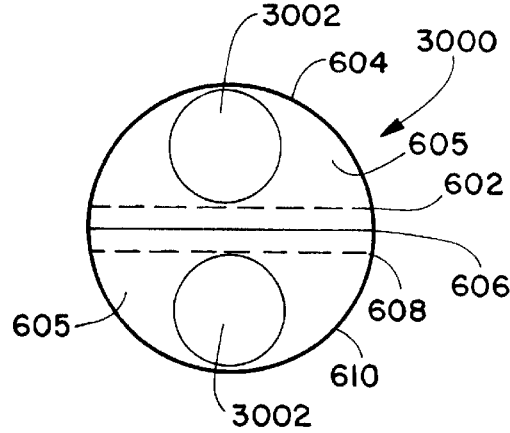
FIG. 22D is a cross-sectional view of a still further variation of the projectile systems described herein, wherein metal balls have been added to the substance contained within the capsule.
Figure 22B:
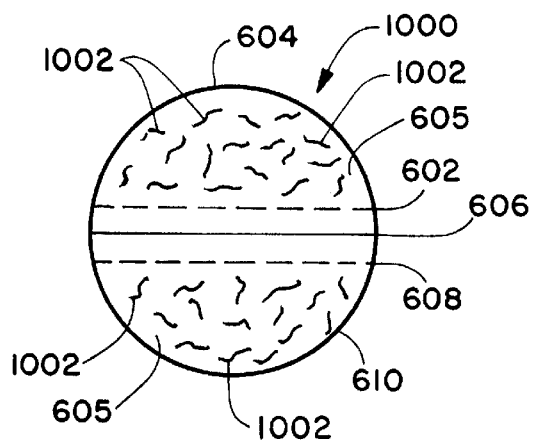
FIG. 22B is a cross-sectional view of another variation of the projectile Systems described herein, wherein metal filings have been added to the substance contained within the capsule.

Referring next to FIG. 22B, a projectile system 1000 is shown in accordance with a further variation of the embodiments described herein. Shown are the halves 604, 610, the membranes 602, 608, and the substance 605, 607 therein. Also shown are metal filings 1002, such as iron, steel, tungsten or bismuth filings, added to and intermixed with the substance. Alternatively, any of the previously mentioned solid substances, including for example metal powders, such as powdered iron, steel, tungsten or bismuth, may be used in lieu of the metal filings. The metal filings 1002 function in a manner similar to the manner in which the solid material 902 (FIG. 22A) functions in that, upon impact, the metal filings, being more dense than the substance 605, 607 are flung radially, thereby breaking up the substance, atomizing the substance and carrying the substance radially, perhaps further than the substance would be dispersed absent the metal filings 1002. In addition, the metal filings increase the mass of the projectile, thereby increasing the kinetic force applied by the projectile against the target upon impact of the projectile against the target. As a result, the variation shown may offer as an advantage, not only enhanced inhibiting of a target, due to a more widely dispersed cloud of inhibiting substance, but also enhanced kinetic "thumping" against the target, thereby increasing the initial stunning blow delivered by the projectile. This increase in kinetic force may also enhance the ability of the projectile to leave a bruise on the target, thereby enhancing the projectile's ability to serve not only as a tool for inhibiting a target, but also as an evidentiary tool, should doubt arise as to whether a certain individual is one that has been hit by a projectile of the embodiments specified herein. Furthermore, the "thumping" from the impact of the projectile should be with a sufficient force to temporarily stun the target, e.g. at least 2 to 3 ft-lbs of force for a human target, preferably at 6 ft-lbs, and most preferably at least 10 ft-lbs of force, which slows the target and allows the inhibiting substance to work more effectively. In comparison a typical paint ball impacts at about 10 ft-lbs of force and a non-lethal bean bag type projectile impacts at about 120 ft-lbs (i.e. at about 90 mph).

The projectile systems may be arranged such that successively fired projectiles or groups of projectiles are of relatively greater mass than previous projectiles or groups of projectiles, thereby gradually increasing the kinetic force of "thump" experienced by a target, assuring that both adequate kinetic force is used to achieve stunning of the target, while at the same time assuring that a minimum amount of kinetic force is applied to any given target. For example, a child or female target is much more likely to be affected by earlier, lower kinetic forces or "thumps" than will be a large male. This, combined with the possible inclusion of a powdered inhibiting substance of a prescribed concentration or of an increasing concentration, provides law enforcement and military personnel with a non-lethal approach suitable for delivering a minimumly necessary amount of non-lethal or less-than-lethal technology to a target of virtually any size, shape or tolerance level.

Referring next to FIG. 22C, a projectile system 2000 is shown in accordance with a further additional variation of the embodiments described herein. Shown are the halves 604, 610, the membranes 602, 608, and the substance 605, 607, therein. Also shown are metal shot 2002, such as iron or steel shot or, alternatively, metal, wood or ceramic balls which are added to and intermixed with the substance 605, 607. The metal shot 2002 function in a manner similar to the manner in which the metal filings 1002 (FIG. 22B) function, and thus, to that extent, further explanation of their functionality is not made herein. The metal shot 2002 have the added benefit that they may, in some circumstances, also provide an additional source of discomfort for the target, as the metal shot 2002 impact against the target after the projectile explodes.

Referring next to FIG. 22D, a projectile system 3000 is shown in accordance with a further additional variation of the embodiments described herein. Shown are the halves 604, 610, the membranes 602, 608, and the substance 605, 607 contained therein. Also shown are relatively large, metal balls 3002, such as iron or steel balls, (or alternatively ceramic, plastic or glass balls), added to each half of the capsule 604, 610 and generally surrounded by the substance 605, 607. The metal balls 3002 function in a manner similar to the manner in which the metal shot 2002 (FIG. 22C) function, and thus, to that extent, further explanation of their functionality is not made herein. The metal balls 3002, however, also have the added benefit that they may, in some circumstances, provide an additional source of discomfort for the target, as the metal balls 3002 impact against the target after the projectile explodes.

Furthermore, the addition of solid substances into the substance or substances contained within the capsule, such as the solid substances, metal filings, metal shot, and metal balls provide a synergistic effect of increasing the effectivity of the projectiles as non-lethal weapons. For example, as described above, the "thumping" or kinetic force of the projectiles alone provides a stunning effect to a living target. This stunning effect temporarily stalls or slows the target which allows the dispersing substance within to more effectively disperse onto and around the target. This stunning effect is greatly amplified if a target is impacted with multiple projectiles in short succession. For example, a target may feel as if the target has been "shot", which will psychologically slow or stop the target. If inhibiting substances such as oleoresin capsicum or capsaicin are contained within the projectile, they will be more effective since the target may have temporarily stopped movement. In practice, a target may be inhibited with fewer hits if those hits produce a kinetic thump. Thus, the thumping effect and the inhibiting substance or substances synergistically work together to produce more effective results than either technique alone.

Figure 22E:
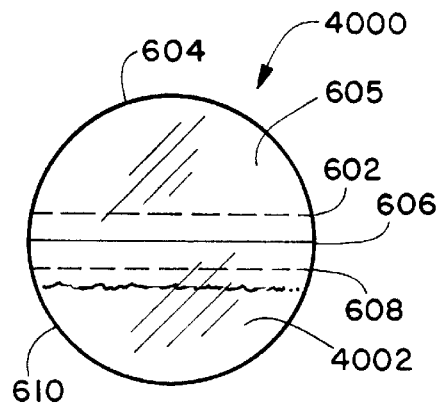
FIG. 22E is a cross-sectional view of a variation of the projectile systems described herein, wherein a liquid or gas substance is contained within one half of the capsule and a powdered substance is contained in the other half of the capsule.

Referring next to FIG. 22E, a cross sectional view is shown of yet another variation of the embodiments described herein. Shown are the halves 604, 610, the membranes 602, 604 and the substance 605, 607. In this variation, one of the halves 604 is filled with the powdered substance 605, as described above, while the other half 610 is, for example, filled with a liquid or gas substance 4002, which substance may be an irritant, a marking agent or may serve as additional weight to the projectile system 4000. In this variation, the benefits of an additional irritant (i.e., in addition to the powdered substance 605) lie in the particular application to which the teachings herein are put. With respect to marking, the evidentiary benefits will be apparent to the skilled artisan, and lie primarily in situations when a target temporarily eludes law enforcement officers. In this situation, it is important for law enforcement to be able to identify a target as having been the same target that was hit by a projectile fired by law enforcement personnel, e.g., as the target is escaping from a crime scene. Where the second substance 4002 is added to increase the mass of the projectile, then the benefit of increased kinetic force upon impact of the projectile against the target, and thus an increased ability to initially stun a target is realized.

It will be appreciated by those of skill in the art that numerous variations of these alternative embodiments are possible, and thus, are equally contemplated hereby. For example, in one alternative, one half of the capsule may be filled to about 90% or more of its volume with a powdered inhibiting substance and covered with a membrane as previously described. The other half of the capsule may then have, for example, a liquid marking/tagging substance placed therein, occupying about 60% or less of the total volume of the second half. A membrane may then be placed over the liquid substance and additional powdered substance placed on top of the membrane. Preferably the powdered substance added to the second half of the capsule containing the liquid marking substance will be in an amount equal to about 30% or more of the volume of the half capsule. The half capsule containing only powdered substance is then placed atop the second half capsule (containing the liquid and powder) and the two halves are joined, and, preferably sealed. Thus, the completely assembled capsule, according to the present alternative, will contain liquid marking substance at a volume of about 30% or less of the total volume of the capsule and will contain powdered substance at a volume of about 60% or more of the total volume of the capsule. Other combinations, including those employing more than two membranes, will be readily appreciated by those of skill in the art. Of course, those embodiments wherein the capsule contains both a liquid substance and a powder substance will preferably include membranes that rupture only upon impact, such that the liquid and powder are kept separate until deployed.

Advantageously, the projectile systems contemplated herein are muzzle safe, that is they may be safely and effectively fired at close range, including, for example, at arm's length. In contrast, other long range non-lethal projectiles have not proven to be safe immediately outside a muzzle. A further important feature of the present projectile systems is that they are not only easy to manufacture in large quantities, but they are also very inexpensive compared with prior art projectiles.

Applications and Tactics for using Non-Lethal Projectiles

Thus, having specified numerous variations and embodiments of the projectile, and methods of manufacture, FIGS. 23 through 31B show various applications and tactics for using the projectile embodiments. Such figures are described hereinbelow.

Figure 23:
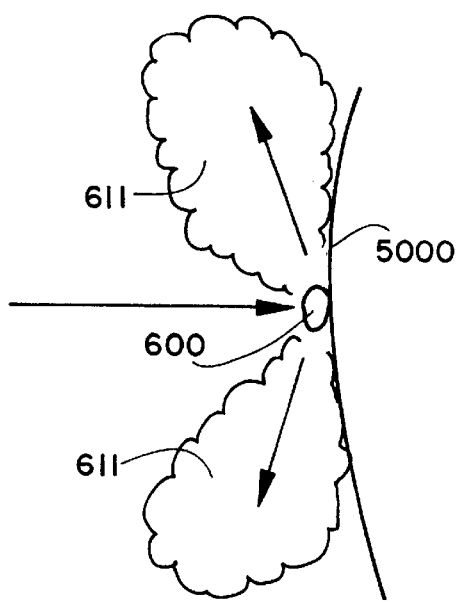
FIG. 23 is a side view of a projectile system, such as are illustrated in FIGS. 1, 4, 5, 9A–9D, 13A, 15A–15D, 16A–16E and 17, as it impacts a target.
Figure 24:
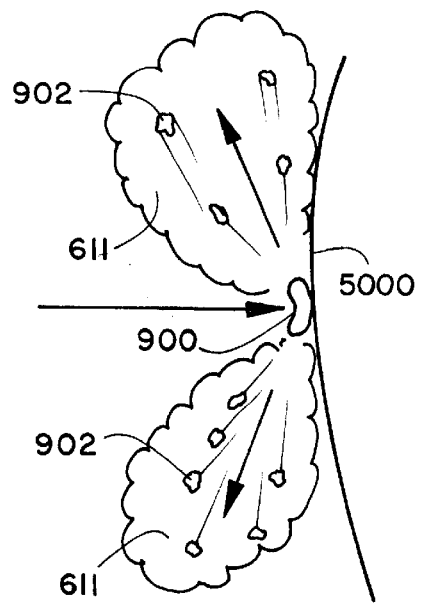
FIG. 24 is a side view of a projectile system, such as are illustrated in FIG. 22A or 22C, as it impacts a target.

Referring to FIGS. 23 and 24, side views are shown of the projectile systems described and illustrated above, for example, in FIGS. 1, 4, 5, 9A–9D, 13A, 15A–16E, and 21, and the projectile system of FIG. 22A–22C, respectively, as they impact against a target 5000. As can be seen, for example, in FIG. 23, the optimal fill, described above, results in a wide dispersion of the substance, substantially radially away from the point of impact and away from an axis defined by the projectile's 600 trajectory as it impacts the target. Similarly, FIG. 24 illustrates the solid material 902 being projected radially with the substance 611, thereby driving the substance 611 more radially away from the projectile 600, and enhancing its dispersion pattern. (It is noted that the substance 611 is the same as 11, 605, 607, for example, in those figures illustrating capsule halves although illustrated as a rapidly dispersed cloud 611 of a very fine powdered substance, containing, for example, powdered oleoresin capsicum and/or powdered capsaicin. (See for example, FIG. 5.)

As described earlier, in preferred embodiments, the substance 611 that forms the cloud advantageously is a finely ground powder that has particles having diameters generally, less than 1000, microns, preferably less than 500 microns, more preferably less than 250 microns, and most preferably less than 100 microns. Thus, the smaller the particle diameter, as well as using low surface tension particles, the more finely the resulting "cloud" will be radially dispersed and the larger the volume the cloud will cover.

In preferred embodiments, the substance comprises a powdered oleoresin capsicum powder or capsaicin powder that has a particle size of less than 500 microns, preferably less than 100 microns, more preferably less than 20 microns, and most preferably less than 10 microns, e.g. 5 microns in diameter. Thus, when such powder is contained within a small capsule 600, the capsule 600, upon impact and rupture, will produce a cloud of finely powdered substance 611 at least 2 feet in diameter, and preferably at least 3 feet in diameter. This cloud 611 advantageously "wafts" in the air for several seconds, for example, between 6 and 10 seconds before settling, allowing sufficient time to inhale the powdered substance. Furthermore, the cloud 611 generated is such that the substance would easily go through a handkerchief placed against the mouth of the target, due to again, the small size of the particles comprising the powdered substance.

Furthermore, in preferred embodiments, the substance contains a powdered pepper-derived substance, such as oleoresin capsicum and capsaicin, that is internally reacting, rather than simply a topical agent only. The radial dispersal of the substance 611 is dispersed and enters the mouth and nostrils of the target 5000 and contacting the lung tissue, for example, causing a temporary inability to breathe, whereby inhibiting the target 5000.

It should be noted that although a human target 5000 is illustrated, the projectiles of the various embodiments of the present invention may be impacted on a variety of targets, living (human or non-human) or non-living. For example, the projectiles may be employed against animals, such as dogs or other wildlife. In particular, projectiles containing inhibiting substances, such as oleoresin capsicum or capsaicin, are very effective at inhibiting dogs and other animals, as well as humans. Furthermore, the projectiles may be impacted upon non-living targets, such as walls or ceilings, such that upon impact with the non-living target, the dispersed material, or very finely dispersed cloud, in the case of a fine powder substance, is dispersed. Advantageously, living persons or animals located next to underneath, or otherwise near the impact, will be enveloped with the cloud of the dispersed substance (shown as 611) and; thus, the living persons and/or animals will be inhibited although, even though not actually impacted with the projectile.

The embodiments of the projectile systems described herein are particularly advantageous in that their use may be readily incorporated into existing officer training programs. This is because the projectiles are designed to be fired at a target's upper torso (See e.g., FIG. 25), which is the same area officers are trained to aim at when using lethal weapons. When officers are confronted with a situation in which they must use force, whether or not that force must be lethal, they are, of course, stressed. Having to take additional time to decide where to aim a weapon depending upon the projectiles contained therein can actually be dangerous for the officer. By providing a non-lethal projectile system that may be aimed in the same manner and at the same point on a target as are other, lethal, projectiles, an officer is more likely to be able to react quickly and accurately in firing such projectiles.

Referring to FIGS. 25 through 27, a sequence of profile views are shown of a target 5000, as he or she is impacted with a projectile system 600 of the present invention. In FIG. 25, the target 5000 is first impacted with a projectile system 600 of the present invention. The target's head 5002, at the time of impact, is illustrated as in a generally upright forward-looking position. Nearly immediately upon impact, the capsule of the projectile system ruptures, dispersing its contents 5004 in a radial, cloud-like manner on and about the target 5000 and radially away from the point of impact. About simultaneously with dispersal of the contents 5004 of the capsule, the target 5000 begins to hunch towards the point of impact of the capsule on his/her body in reaction to the impact. (See FIG. 26) Thus, the target's back side moves in a generally posterior (rearward) direction, while his/her head and upper chest region move in a generally anterior (forward) and inferior (down) direction so as to hunch around the point of impact. Quite advantageously for the purposes of the present invention, such movement is a natural reaction for people when they are hit by something with such force. Within a matter of seconds, and as illustrated in FIG. 27, the target's head 5002 is essentially surrounded by the dispersing cloud of inhibiting and/or marking substance 5004. Where an inhibiting substance is employed, the target 5000 will feel pain as the inhibiting substance contacts his/her mucous membranes (i.e., his/her eyes, nose, mouth and throat), and as the target inhales the substance (also a natural reaction), he/she will experience significant pain in his/her lungs, will temporarily be unable to breathe and will begin to panic. Under such circumstances, even the most aggressive target is easily subdued and apprehended. Thus, the target's movements, in response to impact of the projectile, combined with the radial dispersement of the substance on and about the target, provides a particularly effective non-lethal inhibition of the target.

This present embodiment, then, provides a method of slowing and/or stopping and/or marking a living target. According to this method, the projectile system is fired at a target; the mechanical force of the impact causes rupture of the capsule, thereby permitting dispersal of the capsule contents, additionally, the force is sufficient to cause the target to move towards the dispersing substance, resulting in inhalation of the same, as the target attempts to catch his/her breath following the impact. As the substance is inhaled and/or contacts the mucous membranes in the face region, the target is stunned, that is physically impaired, and thus, collapses.

Further contemplated herein, is providing a projectile system wherein the projectile, especially a generally spherical capsule, is sufficiently hard and is delivered with sufficient force to result in bruising of the target at and surrounding the point of impact. In this way, the target is not only exposed to an inhibiting substance, but is also temporarily marked for later identification. For example, if any confusion arises as to who has been hit by the non-lethal projectiles, such as where the target is able to recover from or escape the effects of the inhibiting substance before officers are able to apprehend him/her, then the target may later be identified by the bruising, should he/she ultimately be apprehended. Those of skill in the art, will readily appreciate that the force required to fire a projectile system in accordance herewith, at a target, such that the projectile ruptures upon impact with the target, will generally also be sufficient to cause bruising to the target. It will further be appreciated by those of skill in the art that the capsules of the present invention may alone be used to mark a target, by bruising of the same, with or without delivery of any substances.

Figure 28:
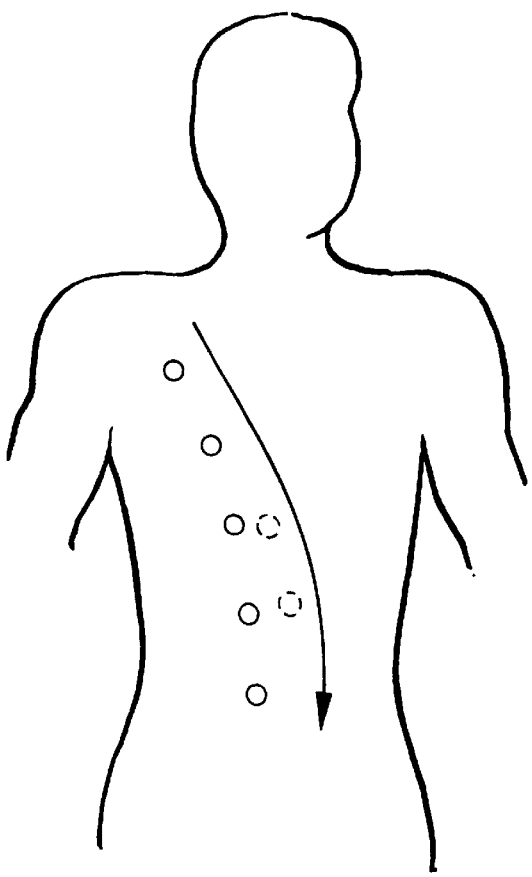
FIG. 28 is a frontal view of a human target with a preferred firing pattern, for the projectile systems herein, illustrated on his/her body.
Figure 29:
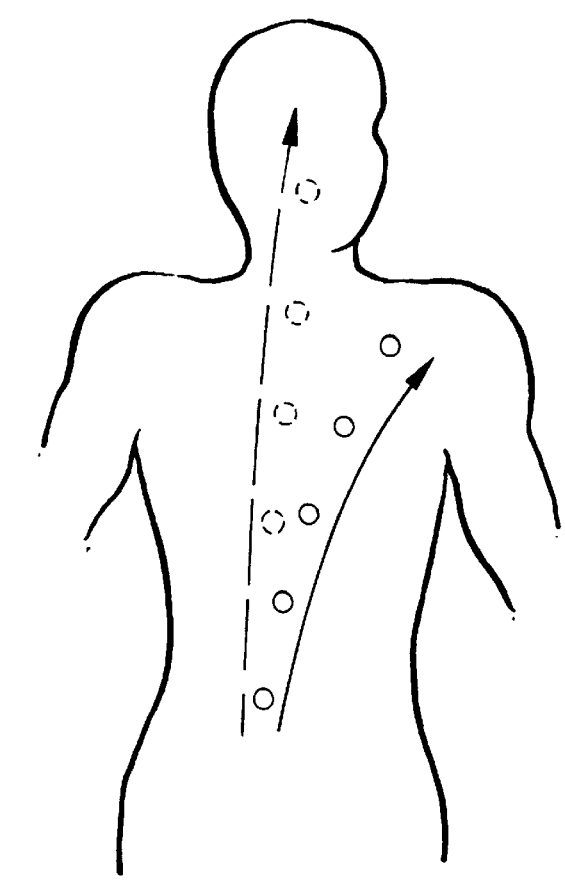
FIG. 29 is a frontal view of a human target with two alternatively preferred firing patterns, for the projectile systems herein, illustrated on his/her body.

Referring next to FIGS. 28 and 29, front views are shown of various firing patterns that may be used when firing the projectiles of the present invention, which firing patterns offer particular advantages when used in combination with the projectile systems described herein and with rapid firing techniques.

Quite advantageously, the projectile system of the present invention may be rapid fired, for example using a compressed air pistol, compressed air rifle, a fully automatic launcher, a dual-use modified PR24 police baton, and/or a dual-use modified flashlight.

A rapid fire weapon can be rapid fired in a vertical direction, such as illustrated in FIG. 28, from the top (superior region) of the target's torso, for example, near his/her shoulder, down to the bottom (inferior regions) of the torso and body, for example, near his/her groin. It has been discovered, by the inventors, that this firing method exploits the targets tendency to retract a stricken portion of their body, and to follow (i.e., hunch around) a pattern of impacts, thereby resulting in the target moving his/her body ever more downward and into the dispersing substance, resulting in maximum incapacitation of the target. In this instance, the target moves in a manner similar to that shown in FIGS. 25 through 27, however, the movement of the target's head into the cloud is even more dramatic when the illustrated rapid firing method is employed. (FIG. 28)

Note that while the rapid firing method has been discovered to offer particular advantages, traditional wisdom dictates a horizontal sweeping of the target's body with projectile impacts. The inventors are aware of no heretofore employed methods that specify vertical sweeping of a target's body with non-lethal or less-than-lethal projectiles.

Referring next to FIG. 29, a front view of a target, similar to that of FIG. 28, is shown. In this variation, however, the pattern of projectile impacts move from the lower (inferior region) of the target's torso/body up to the top (superior region) of the torso/body, e.g., from the target's groin area towards either the target's shoulder or head, with the "head pattern" being shown in dashed lines.

The variation illustrated in FIG. 29 is particularly advantageous in highly volatile, highly dangerous situations, such as when confronting targets under the influence of powerful drugs. While normally use of non-lethal projectiles would dictate that a target's head be avoided as a target area, this firing pattern provides a user with an option to move the projectile impact pattern to the target's head in the even that all other efforts fail to subdue the target. If, on the other hand, the target is subdued, the firing pattern can move safely to the target's shoulder. The inventors contemplate that this pattern of projectile impacts will be slightly less effective in getting a target to move his or her head into the cloud of substance; however, it does offer the advantage of providing a severe option, when, for example, deadly force would be justified.

Referring next to FIG. 30, a side view is shown of a tactic for stopping a car under chase. Contemplated herein is loading a weapon with both impairing capsules and kinetic capsules, that is, respectively, frangible capsules containing an inhibiting and/or marking substance and frangible capsules that are hollow or that contain an inert substance. Alternatively, breaker balls, e.g., stainless steel, tungsten, bismuth, ceramic, plastic or glass balls, contained in a frangible capsule in accordance herewith, may be substituted for kinetic capsules.

Thus, for example, as the weapon is rapid fired at a suspected criminal who is within a vehicle, the first rounds of capsules would be kinetic capsules or breaker balls that simply break the windows (solid line shows trajectory) of the vehicle to facilitate entry of the subsequent, impairing capsules that would then fill the vehicle (dashed line shown trajectory), at least in the vicinity of the criminal, with the inhibiting substance, thereby rendering the target unable to operate his or her vehicle.

Referring next to FIG. 31A, a perspective view of a tactic for delivering an inhibiting substance to a target within a building is shown. As with the tactic above, an initial one or more kinetic capsules are used to break glass or other glass-like, i.e. frangible, material of the building, such as, for example, acrylic, plexi-glass or the like. These "glass-breaker" capsules are followed by impairing capsules that deliver the inhibiting substance to the target. Again, as with the tactic described with respect to FIG. 30, frangible capsules in accordance herewith, containing breaker balls may be employed as the first round of projectile systems in order to break the glass-like barrier behind which the target is located.

Advantageously, the impairing capsules need not actually impact the target to be effective. Specifically, so long as the capsules impact sufficiently near the target that the cloud is inhaled by the target, or otherwise affects the target's respiration or other mucus membranes, such capsules will be effective at achieving their intended purpose, i.e., inhibiting or impairing the target. Thus, for example, where an animal, such as a dog or large cat, e.g. mountain lion, is being targeted, the capsules, in accordance herewith, may be impacted on the ground near the animal's face or on another object near the animal's head or may be targeted directly to the animal's head or body. In this case, (except, perhaps where the animal's head is targeted) the present invention provides a non-lethal means for subduing an animal that may pose a danger to humans or that may be in need of assistance itself.

Thus, in accordance with the present aspect, and quite advantageously, the projectile systems, because their dispersal mechanism is so optimized, may be used to inhibit a target when the target cannot actually be targeted. By way of further example, an individual hiding within a bathroom stall cannot be seen and thus for law enforcement personnel to attempt to confront the individual could place the law enforcement personnel in great danger. However, with the projectile systems of the present system, the officer need simply fire the projectiles at the wall above the stall within which the target is hiding or at a solid object near the target individual. The capsules of the system will rupture and the contents thereof will waft down into the stall, where they will be inhaled by the target and/or contact the target's mucous membranes, thereby incapacitating him/her. In fact, the inventors have tested this scenario using the projectiles of the present invention and have found the results to be quite impressive. The individual could not escape the effects of the inhibiting substance and was well incapacitated thereby.

A further advantage of embodiments described herein lies in the discovery that common, household hair spray performs well as a sealer to maintain a powdered inhibiting substance, such as powdered oleoresin capsicum or powdered capsaicin, against a surface. Thus, for example, a target that has been hit with one or more projectiles, as well as a surrounding area, can be sprayed with hair spray prior to being handled by law enforcement or military personnel in order to prevent said personnel from having to cope with powdered inhibiting substance residues that may be on a target or in an area around a target following use of embodiments described herein. As with many other aspects of the present embodiments, the use of hair spray to seal a powdered inhibiting substance to a surface following use of such embodiments, provides a low cost, practical, commercially viable, approach to a problem that, to the inventors' knowledge is unaddressed in the prior art. It is expected that various other spray adhesives, will similarly perform this sealing function, and thus, should be understood to be contemplated herein, by the inventors.

In any case, absent a solution to the problem of residual inhibiting substance or irritant, it is highly questionable whether any law enforcement or military agency (particularly law enforcement agency) would adopt a powder-filled projectile as a non-lethal or less-than-lethal solution. Presently, all commercially viable non-lethal or less-than-lethal approach used by law enforcement and the military, at least to the best of the inventors' knowledge, either do not employ a chemical irritant, or employ a gas, which is diluted and carried away by ambient air currents. In the case of tear gas, however, for example, residual tear gas is a significant problem for personnel operating in an area after tear gas has been deployed. For example, if medical personnel are needed in an area, they are required to wear a breathing apparatus, such as a gas mask, following the use a tear gas, at least until an area can be vented. With the present approach, however, an area can be sealed with hair spray or another spray adhesive following use of a powdered irritant projectile, after which personnel, such as medical personnel, can operate in the area almost immediately without the need for cumbersome and awkward breathing apparatuses with which such personnel may not have any training. Further, if, for example, mouth-to-mouth resuscitation needs to be performed, the present technology allows medical or law enforcement personnel to perform this type of resuscitation without first moving a victim out of an area contaminated by an inhibiting substance. Thus, the ability to seal both a target and an area around a target following use of the projectiles described herein provides a significant, and heretofore unaddressed, solution to a very real problem with heretofore available non-lethal or less-than-lethal projectiles that employ a chemical inhibiting substance or irritant.

Figure 31B:
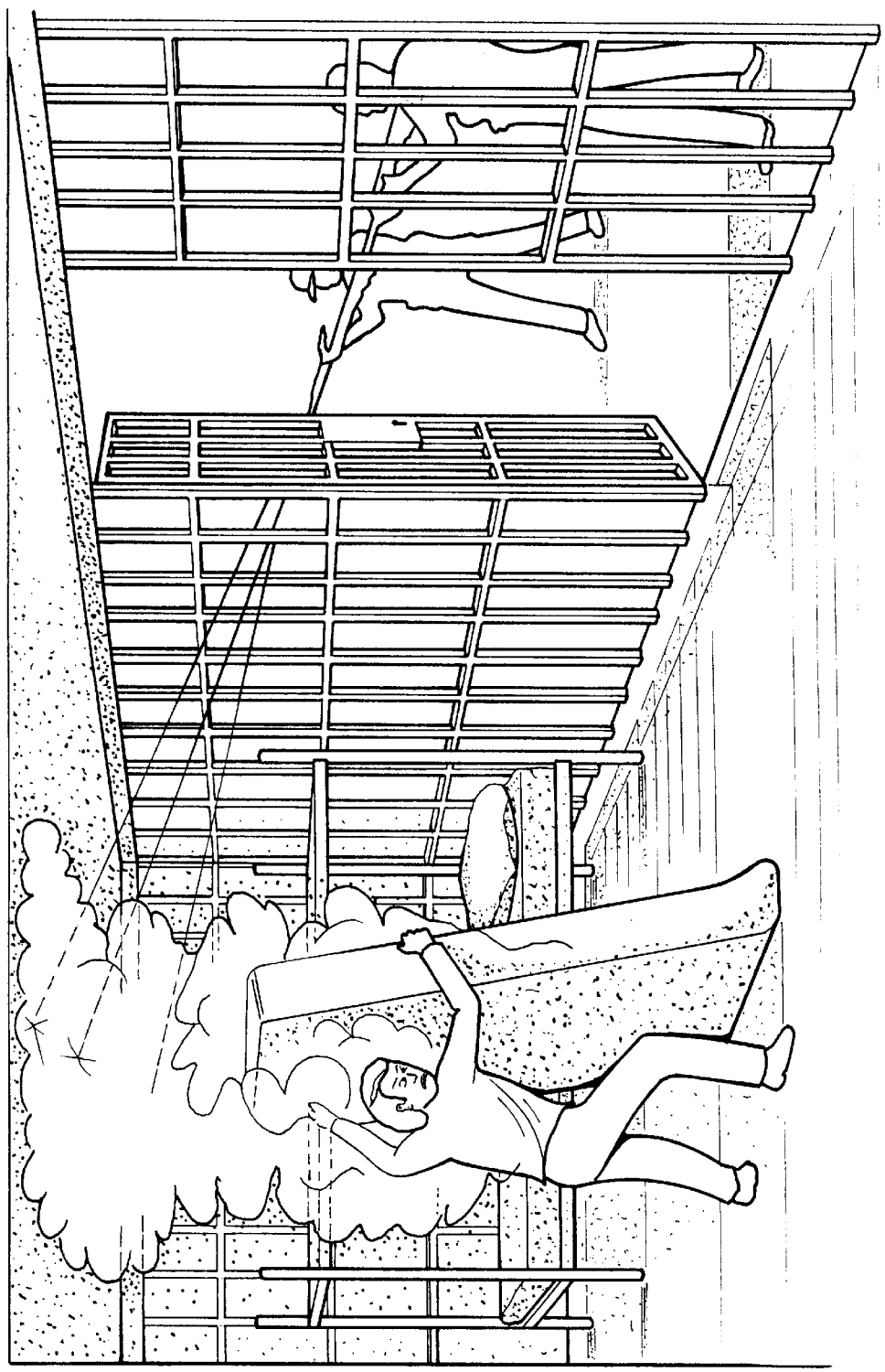
FIG. 31B is a perspective view of a further tactic contemplated herein, for delivering projectile systems and inhibiting a target, for example, by impacting an object, such as a ceiling, near the target.

Next referring to FIG. 31B, a perspective view is shown of a further tactic contemplated herein, for delivering projectile systems and inhibiting a target, for example, by impacting an object, such as a ceiling, near the target. Shown is a person to be inhibited by the projectile system, and law enforcement, launching non-lethal projectiles at and impacting a target near the person. For example, in a prison riot, or in a cell extraction, prisoners may barricade themselves or hide behind objects, such as the mattress shown, such that it is difficult for an officer to directly hit the prisoner with a projectile system, without risking injury or attack. In practice, the officer impacts an area near the prisoner, for example, the ceiling above the prisoner. The resulting dispersed "cloud" containing one or more inhibiting substances expands such that the substance is inhaled into the prisoners lungs. Shortly thereafter, typically within seconds, the prisoner is inhibited. For example, the prisoner is temporarily unable to breath, which will typically cause the prisoner to panic and fall to the ground. This allows the officers ample time to subdue and control the prisoner. Advantageously, even though the prisoner is obstructed from direct view by the object, for example, by the mattress, the projectile system can effectively inhibit the prisoner by impacting one or more projectile systems at a target near the prisoner. Firing multiple projectile system further enhances the "cloud" of dispersed substances.

This tactic applies to any situation where a suspect is not in a direct line of fire with law enforcement. For example, the suspect may be hiding behind a wall, or within a bathroom stall. The officer merely shoots the projectile systems at a target near the suspect, e.g. a ceiling or a bathroom stall wall, and waits for the resulting finely dispersed cloud containing an inhibiting powder, for example, a powdered oleoresin capsicum or a powdered capsaicin, expands to enter the suspects lungs. Thus, the suspect is effectively inhibited without actually impacting the suspect. Furthermore, this tactic may apply to inhibit a living animal, such as dog or other animal that may be hiding out of a direct line of fire, for example, behind a rock. The projectiles used may be any of the projectiles as described above, although in this application, powder containing substances are preferable.

Alternative Projectile System Designs

Turning now to FIGS. 32 through 40, various alternative designs for projectiles, in accordance with the present invention, are shown. Each of these embodiments, with the exception of the embodiments of FIGS. 36 through 40, employ some variation of the spherical projectile described above, and offer alternative designs suitable for some applications. The inventors, however, are presently of the opinion that the non-lethal projectile embodiments of FIGS. 1–22E are preferred, from the standpoint of effectivity, simplicity and cost.

Referring then to FIG. 32, a cross-sectional view is shown of a projectile system 50 for delivering an inhibiting substance to a living target in accordance with alternative embodiment of the present invention, wherein the projectile system 10 of the embodiment of FIG. 1 is employed to carry the inhibiting substance, and a stabilizer body 52 (which is one embodiment of a projectile body) is employed to increase range.

The projectile system 50 of FIG. 32 employs an inhibiting substance encapsulated within the shell 12, such as described previously above. Alternatively, the shell 12 may have a non-spherical shape, such as a bullet shape, e.g., elliptical, parabolical, prolate spheroidal, two-sheet hyperboloidal, or the like. The shell 12 is mounted to the stabilizer body 52, which has a stabilizer section 54, a puncture tube 56, and an atomization matrix 56. The shell 12 is mounted to the stabilizer body 52 on a forward edge 58 of the atomization matrix 56, and rests on a tip 60 of the puncture tube 56. Wax or adhesive may be used to hold the shell 12 in place.

Upon impact with the target, the shell 12 is forced backwards (relative to the direction of flight of the projectile) into the tip 60 of the puncture tube 56, which punctures the shell 12. This releases the inhibiting substance contained within the shell 12 into an interior region 62 of the atomization matrix 56. From the interior region 62 of the atomization matrix 56, the inhibiting substance is released through a plurality of exit orifices 64 passing through the periphery of the atomization matrix. There are preferably from between 2 and 20, e.g., 10 exit orifices 64 in the atomization matrix 56. Each exit orifice 64 preferably has a circular shape and a diameter of from between about 0.5 mm and 4 mm, e.g., 1 mm.

The stabilizer body 52 is preferably circular in cross-section (taken normal to its direction of flight), having an outer diameter equal to the outer diameter of the shell 12, i.e., from between about 1.0 cm and 5.0 cm, e.g., 1.8 cm. The length of the stabilizer body 52 is from between about 1.5 cm and 5 cm, e.g., 3 cm, and the overall length of the projectile system 50 (i.e., the stabilizer body and the shell) is from between about 2.5 cm and 10 cm, e.g., 5 cm. The stabilizer body 52 is preferably made from plastic or acrylonitrile butadiene styrene resin (ABS), and the stabilizer section 54 has a hollow rear section 66 that has a hollow interior with an inner diameter of from between 1.0 cm and 5 cm, e.g., 1.8 cm, and a depth of from between about 1 cm and 5 cm, e.g., 2 cm. The hollow rear section 66 serves to decrease the mass of the stabilizer body 52 without significant detrimental effect on the aerodynamics of the projectile system 50. The stabilizer body 52 can be made using known plastics molding techniques, such as injection molding.

Referring next to FIG. 33, a cross-sectional view is shown of a projectile system 70 made in accordance with one variation of the projectile 50 of FIG. 32, wherein a plunger 72, or impact piston, is employed to explode the shell 12 containing the inhibiting substance.

The projectile system 70 has a stabilizer body 74 (which is one embodiment of a projectile body), similar in function, dimensions and manufacture, to the stabilizer body 52 described above, and the impact piston 72 is slidable within a piston cylinder 76. The piston cylinder 76 is formed at a forward portion of an atomization matrix 78, similar to the atomization matrix 56 described above. The stabilizer body 74 also employs a stabilizer section 80, similar to the stabilizer section described above. The shell 12 is located between a pair of puncture tubes 82, 84, one of which forms a rearward portion of the impact piston 72, and one of which forms a forward portion of the stabilizer section 80. The shell 12 is located within the atomization matrix 78.

Upon impact with the target, the impact piston 72 is forced rearward by its impact against the target, squeezing the shell 12 between the puncture tubes 82, 84, ultimately causing the shell 12 to rupture. This releases the inhibiting substance within the shell 12 into an interior region 86 of the atomization matrix, from which the inhibiting substance escapes via exit orifices 88 similar to the exit orifices 64, described above.

Referring next to FIG. 34, a cross-sectional view is shown of a projectile system 90 made in accordance with another variation of the projectile system 50 of FIG. 32, wherein an impact piston 92 is employed to explode a shell 12 containing the inhibiting substance.

The projectile system 90 of FIG. 34 is similar in structure and operation to the projectile system 50 of FIG. 32 except as noted below. The projectile system 90 of FIG. 34 employs the impact piston 92 having a bullet-shaped, e.g., elliptic paraboloid, prolate spheroid, two-sheet hyperboloid, or the like, forward end 94. Advantageously, this bullet-shaped forward end 94 provides improved aerodynamics for the projectile system 90, thus facilitating firing over longer distances and/or facilitating use of a lower-powered weapon than is needed to fire the projectiles of FIGS. 32 or 33.

FIG. 35 is a cross-sectional view of a further variation of a projectile system 100, wherein a variation of the impact piston 110 is employed to explode the capsule 12 containing the inhibiting substance, and wherein the atomization matrix 104 is located at a rearward end of the projectile system 100.

Shown are the shell 12 mounted to a stabilizer body 106 (which is another embodiment of a projectile body), which has a puncture tube 108. An impact piston 110 is slidable within a piston cylinder 111 formed at a forward portion of the atomization matrix 104. The shell 12 is located between the impact piston 110 and the puncture tube 108. Advantageously, the atomization matrix 104 is located at a rearward section of the projectile system and exit orifices 114 that make up the atomization matrix 104 are angled forward so as to direct inhibiting substance escaping therethrough toward the front of the projectile, i.e., toward the target. The impact piston 110 of the present embodiment preferably includes a rubber tip 116 aimed at minimizing damage to the target.

Upon impact with the target, the impact piston 110 is forced rearward by impact against the target, squeezing the shell 12 between the impact piston 110 and the puncture tube 108, ultimately causing the shell 12 to rupture. Such rupturing of the shell 12 releases the inhibiting substance within the shell 12 into an interior region 118 of the atomization matrix 104, from which the inhibiting substance escapes via the exit orifices 114 which orifices direct the escaping substance toward the target.

FIG. 36 is a cross-sectional view of a projectile system 200 made in accordance with a variation of the projectile system of FIG. 35, wherein the impact piston 110 is employed to puncture a membrane 202 behind which is contained the inhibiting substance. The membrane may be made from, for example, wax, plastic, acrylic or polyvinylchloride. In all other respects, the projectile system 200 is substantially identical to the projectile system 100 of FIG. 35, and therefore further explanation of its structure and functionality is not made herein.

Referring next to FIG. 37, a cross-sectional view is shown of a projectile system 109 for delivering an inhibiting substance to a living target in accordance with a further embodiment of the present invention, wherein a pressurized canister 112 is employed to carry the inhibiting substance, and a stabilizer section 114 (i.e., yet another embodiment of a projectile body) is employed to increase range.

Shown are a plurality of radially oriented exit orifices 116 emanating from a central release chamber 118 into which a valve 120 expels inhibiting substance upon being rearwardly displaced. Also shown are the stabilizer body 80 and a piston 92. The piston 92 is bullet-shaped, similar to the piston 92 shown in FIG. 33 above, with a puncture tube 82 located on a rearward portion thereof. The piston 92 is housed in a cylinder 122 that forms a forward portion of the stabilizer body 114. Alternatively, the pressurized canister 112 may be long enough to itself act also as the target piston 92, thus eliminating the need for a separate piston such as the illustrated piston 92. The stabilizer body 114 also includes a stabilizer section 80 similar to the stabilizer sections 80 described above.

Upon impact, the piston 92 is displaced rearwardly within the cylinder 122, which forces the puncture tube 82 into the valve 120. In response to a force applied by the puncture tube 82, the valve 120 is rearwardly displaced. In response to such rearward displacement, the valve 120 releases the inhibiting substance into the central release chamber 118, from which the inhibiting substance escapes through the exit orifices 116, thereby dispersing the inhibiting substance proximate to the target. Preferably the exit orifices 116 are angled forward so as to better direct the inhibiting substance to the target.

The inhibiting substance is contained within the canister 112 which is formed in, or inserted into a portion 124 of the stabilizer body 114 in front of the stabilizer section. Within the canister 112, the inhibiting substance is pressurized so that it is readily expelled when the valve 120 is opened. The inhibiting substance may be pressurized using, e.g., compressed air techniques or aerosol techniques, such as are known in the art.

FIG. 38 is a cross-sectional view of the projectile system 250 for delivering an inhibiting substance to a living target, wherein a pressurized canister 112 is employed to carry the inhibiting substance, and a stabilizer section 114 (i.e., a further embodiment of a projectile body) is employed to increase range, and wherein the projectile system 250 employs an adhesive material 252 and a mechanical attachment system 254 to attach the projectile to the target during delivery of the inhibiting substance to the target.

Shown are a plurality of radially oriented exit orifices 116 emanating from a central release chamber 118 into which a valve 120 expels the inhibiting substance upon being rearwardly displaced. Also shown are the stabilizer body 80 and a piston 92. The piston 92 is bullet-shaped, similar to the piston shown in FIG. 37 above. The piston 92 is housed in a cylinder 122 that forms a forward portion of the stabilizer body 114. The stabilizer body 114 also includes a stabilizer section 80, which is similar to the stabilizer section 80 described above.

Upon impact the piston 92 is displaced rearwardly within the cylinder 122, which forces the pressurized canister 112 into the valve 120. In response to the force on the valve 120, the valve 120 is rearwardly displaced causing it to open and release the inhibiting substance into the central release chamber 118, from which the inhibiting substance escapes through the exit orifices 116, thereby dispersing the inhibiting substance proximate to the target.

Concomitantly with the rearward displacement of the piston 92, piston locks 256 lock the piston in its displaced position, which in turn locks the pressurized canister 112 in its displaced position, holding the valve 120 in an open state. The piston locks 256 may, for example, operate in a ratchet fashion.

The adhesive material 252 and mechanical attachment system 254, which may comprise a plurality of barbed tips 254, assure that once the projectile system 250 impacts the target it will attach to the target during release of the inhibiting substance, so as to increase the effectivity of the inhibiting substance against the target. The adhesive material is preferably centrally located on a forward end of the piston 92, whereas the barbed tips 254 preferably are located peripherically around the forward end of the piston 92. (Note that in variations of the present embodiment either the adhesive material 252 or the mechanical attachment 254 may be used alone, instead of in combination with each other.)

FIGS. 39A and 39B are side cross-sectional views of alternative projectile systems 300 for delivering an inhibiting substance to a living target in accordance with additional embodiments of the present invention, wherein a twelve-gauge shotgun shell 302 is packed with a rosin bag 304 (i.e., a further embodiment of a projectile body) FIG. 39A that contains an inhibiting substance, such as oleoresin capsicum, or, alternatively and preferably, is packed with one or more capsules 303 (i.e., an embodiment of a projectile body) containing an inhibiting substance 303 FIG. 39B, such as, for example, is shown in the various embodiments described herein. Advantageously, the modified shotgun shells in accordance with the embodiments illustrated in FIGS. 39A and 39B may be used with standard, commercially available shotguns.

Shown in FIG. 39A are the twelve-gauge shotgun shell 302, the rosin bag 304, an airtight seal 306, wadding 308, and black powder or gun powder 310. Shown in FIG. 39B are the twelve-gauge shotgun shell 302, three spherical capsules 303, protective diaphragms 305 between the capsules, an airtight seal 306, wadding 308, and black powder or gun powder 310. It will be appreciated by those of skill in the art that the diaphragms 305 may be formed of various materials such as, for example, sponge foam, cotton, plastic or other polymer, paper, wadding or similar cushioning material.

Upon firing of the twelve-gauge shotgun shell 302, the black powder 310 is ignited, which causes the expansion of gases forcing the wadding 308 and the rosin bag 304 or capsules 303 and diaphragms 305 out of the twelve-gauge shotgun shell 302. Such forcing out of the wadding 308 and the rosin bag 304 or capsules 303 and diaphragms 305 breaks the airtight seal 306. With respect to rosin bag 304 of FIG. 39A, it contains oleoresin capsicum in powder form, as mentioned above, which, upon impact with the target, causes the target to be inhibited. (The rosin bag 304 is, as is known in the art, porous, so as to allow release of the powdered inhibiting substance upon impact of the rosin bag 304 with the target.) With respect to the capsules 303 and diaphragms 305 of FIG. 39B, the capsules 303 rupture upon impact with the target, as previously described, thereby dispersing the oleoresin capsicum and inhibiting the target. The diaphragms 305 may impact the target or may fall short of the target. The primary purpose of the diaphragms, which are optionally included in this embodiment, is to prevent premature rupture of the capsules during shipment, carrying and/or loading of the shotgun shell 302.

Referring next to FIG. 40, an end cross-sectional view is shown of the projectile system 300. Shown are the twelve-gauge shotgun shell 302 and the rosin bag 304. As can be seen, the rosin bag 304 is folded within the twelve-gauge shotgun shell 302 so as to fit tightly within the twelve-gauge shotgun shell 302. Upon firing of the twelve-gauge shotgun shell 302, the rosin bag 304 expands and unfolds prior to impact with the target so as to maximize exposure of the target to the rosin bag 304, thus maximizing its inhibiting effect.

Multi-Functional Custom Launch Devices

Referring to FIGS. 41 through 53, several exemplary embodiments of delivery devices suitable for launching the projectiles described above at a target are shown. Advantageously, several of the embodiments of launching devices or delivery devices are multi-functional custom launch devices, such that in addition to performing the function of launching the projectiles described above, the launching devices perform other utilitarian functions as well. This multi-functionality is an important feature since it enables persons, such as law enforcement personnel, to physically carry fewer physical devices.

As can be imagined, law enforcement personnel or individuals may become "bogged down" with an assortment of devices. For example, a law enforcement agent may carry a gun or similar weapon, a baton, a flashlight, an inhibiting sprayer (e.g. tear gas), a radio, or other devices common to such professions, in addition to carrying a launching device that delivers the above mentioned non-lethal projectiles. Furthermore, in a time of need, the law enforcement agent may find it difficult to sort through the available devices quickly to select the appropriate device for use in a particular situation. Disadvantageously, the sheer number of devices carried by law enforcement personnel may become cumbersome and reduce mobility.

Thus, several of the embodiments shown below combine various functioning devices within the non-lethal projectile launching device, essentially enabling the user to carry one multi-functional launch device. The inventors of multi-functional launch devices are not aware of a prior art recognition of the problem of persons, in particular, law enforcement personnel, becoming bogged down with equipment and a subsequent need to free space occupied by many differently functioning devices by combining several functions into one integrated device. Some of the specific functions intended to be combined with the non-lethal projectile launching device are: flashlight functions, striking functions (e.g. a club or baton shaped launcher), siren/alarm functions, inhibitor spray functions (e.g. tear gas), marking functions (e.g. dyes and other marking sprays or malodorants), and pager functions.

While various devices are shown, it is to be appreciated that the projectiles described above with reference to FIGS. 1–22E, for example, can be satisfactorily launched using commercially available paint ball equipment, such as, for example, compressed gas paint ball launchers, which are of course readily available in the commercial market, and very inexpensive compared to heretofore available equipment for launching or firing the non-lethal or less-than-lethal projectiles of the prior art. For example, semi-automatic compressed gas launchers may be purchased for Tippmann Pneumatics, Inc. of Fort Wayne, Ind., or Airgun Design, of Chicago, Ill., and fully automatic compressed gas launchers may be purchased from Advanced Tactical Systems, of Minneapolis, Minn. Advantageously, the multi-functional launch devices described below incorporate common paint ball launcher and compressed gas launcher technologies into the bodies of other well known devices, such as a flashlight or a baton, to create a single, integrated multi-functional launch device that also functions as a flashlight or baton, respectively.

Referring first to FIG. 41 a cross-sectional view is shown of a custom launch device 400 useable in combination with projectiles described herein for delivering an inhibiting substance to a living target. Advantageously, the launch device depicted is in the form of a PR24 police baton, such as those commonly used by law enforcement officers. Thus, the launch device 400 combines the kinetic functions, enabling the user to strike a victim as a baton as well as function as a projectile launcher. Shown are a plurality of projectile systems 402 loaded within a chamber 404 of the launch device. The chamber 404 also houses a spring 406, which is used to push the projectile systems 402 into position for firing. A flapper valve 408 retains the projectile systems 402, allowing only a single projectile system 418 to move into the. barrel 410 for firing. The chamber 404 and the barrel 410 together form the baton portion of the PR24 police baton.

Within a handle portion of such baton, a valve switch 412 and a propellent cylinder 414 are housed. A removable cap 416 on an end of the handle portion can be used to load the propellant cylinder 414 into the device 400. When launch of a projectile is desired, the valve 412 is opened by operation of a button or trigger (not shown) which releases a measured amount of propellent from the propellent cylinder 414 into the barrel 410 behind the single projectile system 418. This propellent is preferably $CO_2$ or another compressed gas, such as nitrogen and air, for example, and propels the single projectile 418 down the barrel and out the end of the launch device toward a target. When reloading of the device is desired, another removable cap 420 is removed, along with the spring 406, and a plurality of projectiles are loaded into the chamber 402 behind the flapper valve 408.

Advantageously, the user of this embodiment of the custom launch device 400 does not have to carry a separate non-lethal projectile launcher and a separate baton since both functions are conveniently provided for in the same apparatus. Thus, less physical space is occupied on the person of a law enforcement officer, for example.

An additional benefit of the multi-functional launch devices described in FIG. 41 as well as the multi-functional launch devices to be described in, for example, FIG. 42 through 50, is that the non-lethal projectile launchers do not "look" like a weapon capable of firing a projectile. In other words, the launchers are not shaped like guns or launchers, but are shaped like other, less threatening, devices. From a suspect's or the publics' point of view, the non-lethal projectile launchers look like a flashlight or a baton. Thus, a suspect may underestimate the ability that the officer has to subdue him or her. Additionally, people may not be frightened or intimidated when the launchers are in plain view to the public.

Referring next to FIG. 42, a cross-sectional view is shown of another custom launch device 450 useable with projectiles described above for delivering an inhibiting substance in accordance with another embodiment of the present invention. Advantageously the launch device 450 assumes the form of a flashlight, including batteries 452, an on/off switch 454 and a reflector housing 456 of conventional design. Also shown are a propellent cylinder 458 (or canister or cartridge), a valve switch 460, a projectile system 462, a barrel 464 and a removable cap 466.

Advantageously, the custom launch device 450 combines the functions of acting as a flashlight (i.e. illuminating function), a projectile launcher, and depending on the construction of the flashlight, could provide a kinetic function to be used as a striking device as well. Therefore, a user does not have to carry a separate flashlight and a separate non-lethal projectile launcher since both functions are integrated into the same apparatus.

When firing of the projectile system 462 is desired, the removal cap 466, which may be attached on one side, such as by a hinge, is opened, the device 450 is aimed at the target and the valve switch 460 is opened by the depression of a button or trigger (not shown). The opening of the valve switch 460 releases propellent gas from the propellent cylinder 458 into the barrel 464 behind the projectile system 462, thus propelling the projectile system 462 down the barrel 464 toward the target whereat it delivers the inhibiting substance to the target.

In FIG. 43, a cross-sectional view of an adaptation of the custom launch device 500 of FIG. 41, for delivering ball-type projectile systems in rapid successive firings, is shown. The spring 502, the projectile chamber 504, the valve 506, the propellent cylinder 508, the barrel 510, the flapper valve 512, the projectile system in position for launch 514, the removable cap 516 and the other removable cap 518 can be seen. Operation of the launch device 500 depicted in FIG. 43 is substantially identical to operation of the launch device 400 depicted in FIG. 41 and therefore further explanation of the functionality and structure depicted is not made herein.

Referring next to FIG. 44, a cross-sectional view is shown of an adaptation of a custom launch device 550 for delivering ball-type projectile systems, wherein a plurality of barrels 566, 568 are employed to allow the simultaneous or rapid successive firing of projectile systems 562, 565 without reloading. Shown are the batteries 552, the on/off switch 554, the reflector housing 556, the propellent cylinder 558 (or canister or cartridge), the valve switch 560 and the removable cover 570. The propellant cartridge 558, the valve switch 560, the removable cover 570, the projectile systems 562, 565 and the barrels 566, 568 are housed within an enlarged portion 570 of the launch device 550 so as to accommodate the two barrels 566, 568 within the circumference of the launch device 550.

Except as noted hereinabove, the structure and operation of the launch device depicted in FIG. 44 is substantially identical to the structure and function of the launch device depicted in FIG. 42, and therefore further explanation of the launch device of FIG. 44 is not made herein except to note that the valve switch 560 is preferably selective, such that the firing of a projectile from only one of the barrels 566, 568 at a time occurs. For example, a first depression of a button, may cause the valve switch 560 to direct a measured amount of propellant gas into one of the barrels 566, and a second depression of the button may cause the valve switch 560 to direct the measured amount of propellant gas into the other of the barrels 568. Other embodiments may allow simultaneous firing of projectiles from both barrels 566, 568 or manual selection of from which barrel 566, 568 to fire, and therefore selection of which projectile to fire. This latter embodiment may be useful for example when two different projectiles, carrying two different substances, for example, an inhibiting substance and marking substance are utilized.

Referring next to FIG. 45, an end view is shown of the launch device 550 described in FIG. 44, wherein two or more barrels 566, 568 allow multiple, simultaneous or rapid successive projectile launches.

Referring next to FIG. 46, a cross sectional view is shown of an embodiment of a multi-functional custom launch device 1100, similar to the device of FIG. 41, useable in combination with projectiles described herein for delivering an inhibiting substance to a living target. Shown is a multi-functional custom launch device 1100 having generally a launcher body 1101 including a handle portion 1102 and a baton portion 1104. The handle portion 1102 includes a chamber 1106, a loader 1105, guard 1108, removable cap 1109, projectiles 1110, and first spring 1112. The baton portion 1104 includes a bolt assembly 1114 having a central passageway 1128, regulator 1116, actuator assembly 1118, propellant canister 1120 (also referred to as a gas cartridge), barrel 1122, secondary canister 1124, spray nozzle 1126, and trigger (not shown, but typically located under the guard 1108).

Advantageously, the launch device 1100 and launcher body 1101 depicted is in the form of a PR24 police baton, similar to the launch devices as depicted in FIGS. 41 and 43, such as those commonly used by law enforcement officers. Thus, the launch device 1100 combines the kinetic functions, enabling the user to strike or subdue a suspect as a baton as well as function as a projectile launcher. A plurality of projectiles 1110 are loaded within a chamber 1106 (also referred to as a magazine) of the launch device 1100. The chamber 1106 is located in the handle portion 1102 of the launch device 1100 and is loaded through the removable cap 1109 and guard 1108. The chamber 1106 also houses a loader 1105 and the first spring 1112 which applies pressure to the loader 1105; thus, holding the projectiles 1110 up against the bolt assembly 1114. The bolt assembly 1114 moves back and forth within the barrel 1122; thus, loading and steadying the projectiles 1110 at firing. The bolt assembly 1104 is caused to move by the bursts of compressed gas from the regulator 1116.

The user activates the launch device 1100 by pushing the trigger (not shown), which causes the actuator assembly 1118 to puncture the propellant canister 1120 and release a regulated (or unregulated) burst of compressed gas, as is common in the art or paint ball and compressed gas launchers. The propellant canister 1120 is typically a compressed gas, such as $CO_2$, Nitrogen, air or another gas, and is replaceable upon depletion. The burst of compressed gas is directed by the regulator 1116 (which acts as a valve switch) such that the bolt assembly 1114 is moved back allowing a projectile 1110 to be positioned in the barrel 1122 by the loader 1105 and first spring 1112. The regulator 1116 directs a portion of the burst of compressed gas through a central passageway 1128 of the bolt assembly 1114 at the projectile; thus, propelling the projectile 1110 down the barrel toward the target.

Advantageously, the user of this embodiment of the custom launch device 1100 does not have to carry a separate non-lethal projectile launcher and a separate baton since both functions are conveniently provided for in the same apparatus. Thus, less physical space is occupied on the person of a law enforcement officer, for example.

In some embodiments, a secondary canister 1124 is used which may comprise an inhibiting spray canister, a marking spray, or a siren, for example. In operation, the baton shaped launching device 1100 can be turned such that the barrel 1122 is pointing down toward the ground and the spray nozzle 1126 is depressed by the user, which causes a spray of compressed material to be released from the secondary canister 1124. For example, the secondary canister 1124 may be a tear gas canister, as is known in the art, or may contain liquid oleoresin capsicum (liquid OC) or liquid capsaicin. Again, advantageously, the multi-functional launch device 1100 replaces a baton, a non-lethal projectile launcher, and an inhibiting sprayer. In additional embodiments, the secondary canister 1124 may contain a marking substance or malodorant that is used to mark or tag suspects for identification. The secondary canister 1124 may also be a siren (also referred to as a "screamer"), which functions as a panic alarm by emitting a loud scream when the spray nozzle 1126 is depressed. Such secondary canisters 1124 should be designed to withstand a physical blow in the event the multi-functional launcher is used as a baton, and preferably has a cap or lock over the secondary canister (not shown), such that the secondary canister 1124 is not activated accidentally.

Figure 47:
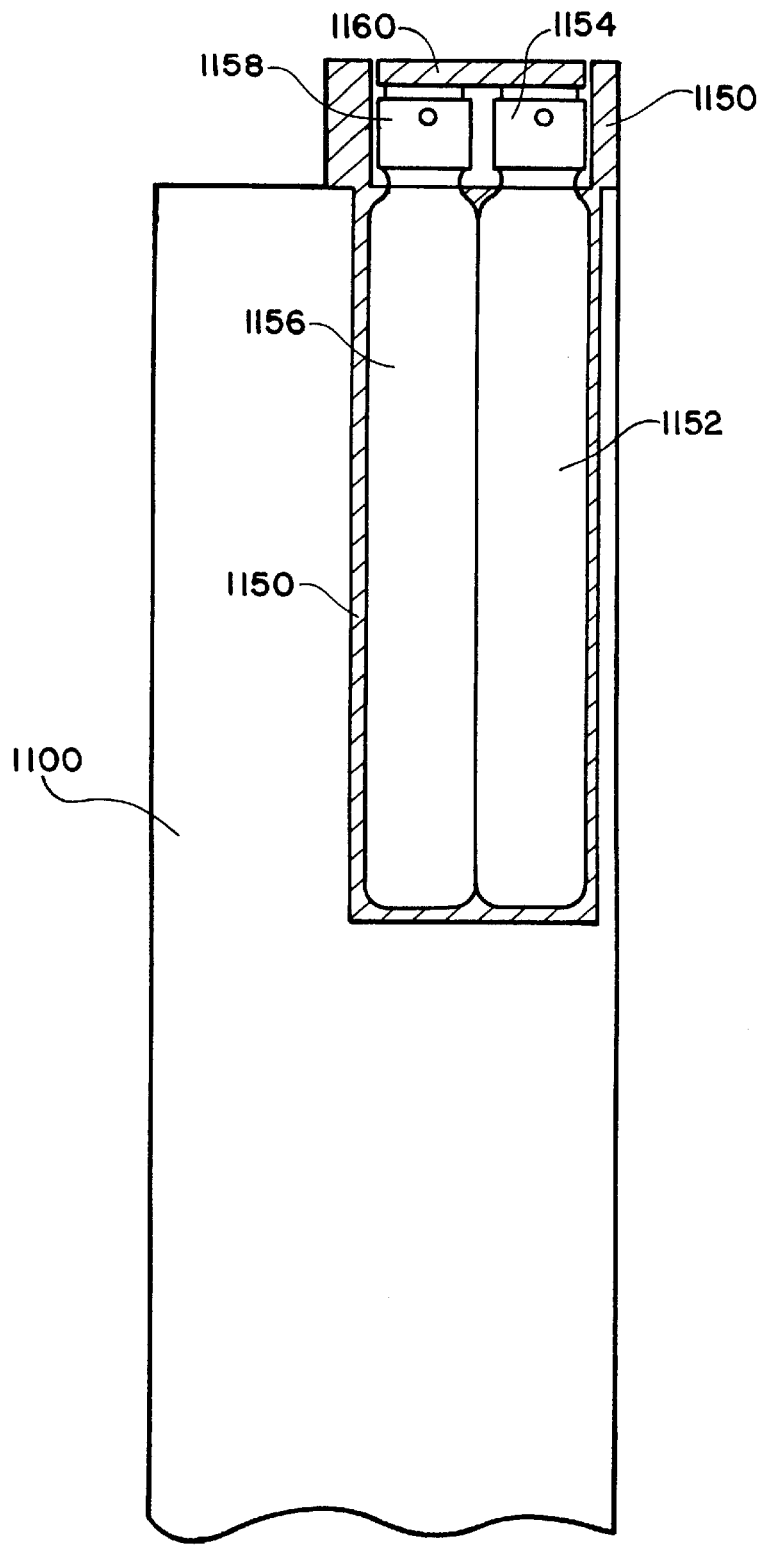
FIG. 47 is a cross-sectional view of a multi-spray cartridge attachment which attaches to the multi-functional launch device of FIG. 46, in which more than one type of pressurized substance may be sprayed at one time.

Referring next to FIG. 47, a view is shown of a multi-spray cartridge attachment to the multi-functional launch device 1100 shown in FIG. 46 that incorporates two types of spray canisters. Shown are a cartridge body 1150 including a first canister 1152, first nozzle 1154, a second canister 1156, second nozzle 1158, button 1160, and button guard (not shown).

The cartridge body 1150 contains two types of spray canisters instead of the one secondary canister 1124 as shown in FIG. 46. The cartridge body 1150 is adapted to be placed into the baton shaped launcher in place of a secondary canister 1124 and produces two different effects upon activation. For example, the first canister 1152 may contain a pressurized inhibiting (e.g. tear gas or liquid oleoresin capsicum/capsaicin) spray while the second canister 1156 may contain a pressurized siren or "screamer".

In operation, the user simply depresses the button 1160 which applies pressure to both spray nozzles 1154 and 1158, releasing a spray of inhibitor (tear gas/OC) and at the same time releases a loud shrieking noise as a panic alarm. Additionally, the spray canisters may contain any other of the types of pressurized contents discussed, including markers, malodorants, etc, as described throughout the specification. Thus, advantageously, the baton-shaped multi-functional launch device 1100 of FIG. 46 can be configured to include two separate spray functions, in addition to functioning as a baton and non-lethal projectile launcher. Again, a button guard (not shown) may be used to prevent accidental use of first canister 1152 and the second canister 1156.

Referring next to FIG. 48, a cross sectional view is shown of another embodiment of a multi-functional custom launch device 1200, which is similar to the device of FIGS. 42, 44, and 45, in the form of a flashlight body (i.e. an example of a launcher body) useable in combination with projectiles described herein for delivering an inhibiting substance to a living target. Shown is a multi-functional custom launch device 1200 fashioned out of a flashlight body 1201 (i.e., launcher body 1201) that includes a chamber 1202, projectiles 1204, loader 1206, first spring 1208, removable cap 1210, barrel 1212, bolt assembly 1214, propellant canister 1216 (similar to propellent cylinder 414 and also referred to as a gas cartridge), regulator 1218, actuator assembly 1220, and retaining assembly (not shown). The flashlight portion includes a reflector 1224, bulb 1226, on/off switch 1228, and batteries (not shown), all of a conventional design. Also included are electronics portion 1232 and electronics button 1230.

In practice, the multi-functional custom launch device 1200 advantageously combines a non lethal projectile launch device into a flashlight body 1201 to form a single multi-functional launch device. Thus, law enforcement personnel do have to carry a separate non-lethal projectile launcher and a separate flashlight. As compared to the launching device as shown in FIGS. 42 and 44, the multi-functional launch device launches projectiles 1204 from its front end, not from the back end of the flashlight body 1201. This is an important feature of the embodiment shown in FIG. 47. This feature allows the user to operate the launch device at night as a flashlight, and at the same time, launch non-lethal projectiles at a target while the target is illuminated by the beam of the flashlight. The devices of FIGS. 42 and 44 have to be turned around backwards to be fired, such that either the flashlight is turned off when being fired or the flashlight remains on, possibly interfering with the user's vision when being fired.

Furthermore, the multi-functional launch device 1200 can fire multiple projectiles without having to be reloaded since multiple projectiles 1204 are stored in the chamber 1202. The multiple projectiles may be fired in rapid succession (i.e. rapid fire) by using existing paint ball launching techniques that cause the loader 1206 to reload a new projectile 1204 into the barrel 1212 immediately after firing. Projectiles 1204 are loaded into the device through the removable cap 1210 and then stored in the chamber 1202. The embodiment shown holds 6 projectiles 1204, but can be configured to hold more or less depending on the ultimate size of the projectile 1204 (i.e. diameter) and the length of the chamber 1202 within the multi-functional launch device 1200. The projectiles 1204 are held into place within the chamber 1202 by a loader 1206 and the first spring 1208. The loader 1206 is positioned within the front end (i.e. the end toward the bulb 1226 or the front of the flashlight body 1201) of the chamber 1202 such that the loader 1206 prevents projectiles from entering the barrel 1212 until the launch device 1200 is ready to fire. The first spring 1208 places pressure on the loader 1206 which slides easily within the chamber 1202.

In firing the multi-functional custom launch device 1200, the trigger (not shown) is pressed by the user which causes the actuator assembly 1220 to puncture the propellant canister 1216. The trigger may have a locking clip or cover that will not allow the trigger to be pressed unintentionally. The actuator assembly 1220 engages the regulator 1218 (which acts similar to the valve switch 460 of FIG. 42) and punctures the propellant 1216 canister which releases a flow of pressurized gas through to the regulator 1218. The actuator assembly 1220 is typically a needle shaped valve that punctures one end of the propellant canister 1216, thus releasing an amount of pressurized gas from within the propellant canister 1216. The propellant canister 1216 typically contains a form of pressurized gas, such as carbon dioxide ($CO_2$), air, or nitrogen, for example. Additionally, the propellant canister 1216 is intended to be replaceable upon depletion.

The actuator assembly 1220 and the regulator 1218 either release a metered, regulated or an unregulated burst of high pressure gas. The pressurized gas then flows through a central passageway (not shown) of the bolt assembly 1214, which supports the projectile within the barrel 1212. In this embodiment, the bolt assembly 1214 is stationary (as opposed to the movable bolt assembly 1114 of FIG. 46). The pressurized gas is directed through the central passageway at the projectile, propelling the projectile through the barrel 1212 toward the target. At the same time, a portion of the pressurized gas is directed into the chamber 1202 such that the projectiles and the loader 1206 are pushed toward the front (towards the first spring 1208) of the chamber 1202, which "loads" the next projectile 1204 into the barrel 1212 against the bolt assembly 1214 for firing. This feature enables a rapid fire function of the launch device, since while one projectile 1204 is being "launched", the next projectile 1204 is being "loaded" into the barrel 1212.

Depending on the specific launcher configuration, a single depression of the trigger may cause the actuator assembly 1220 to release a continuous flow of pressurized gas which will cause projectiles 1204 to be rapidly fired until there are no more projectiles or there is no more pressurized gas in the propellant canister 1216. Alternatively, metered pressurized bursts of gas may be released and timed such that the bursts are released in rapid succession. For example, as many as 3–6, and up to 12 projectiles may be launched a second. In another embodiment, a single depression of the trigger may cause only sufficient pressurized gas to be released to launch one projectile 1204. Thus, to launch several projectiles, the user must physically press the trigger several times.

The projectiles are prevented from rolling out (or falling out) of the barrel by the retaining assembly (not shown), in the event the launch device is held at a downward angle. The retaining assembly is typically a small bump, or similar structure, which holds the projectile in place against the bolt assembly 1214 in the barrel 1212, but does not prevent the projectile 1204 from firing.

In an alternative embodiment, the multi-functional custom launch device 1200 may include an inhibiting spray function. As such a pressurized canister of an inhibiting substance (not shown), such as tear gas, oleoresin capsicum, capsaicin, marker, or a malodorant may be attached into the end of the chamber at the removable cap similar to the secondary canister 1124 shown in FIG. 46 and the multi-spray cartridge attachment shown in FIG. 47. The inhibiting spray canister (not shown) includes a spray nozzle (not shown) and is simply molded into a cartridge (not shown) that fits into the end of the chamber where the removable cap 1210 is located. Thus, the flashlight body 1201 is held such that the beam of light from the bulb 1226 shines downward in order to spray the inhibiting spray forward. The inhibiting spray cartridge would then face up such that the spray nozzle can be pressed releasing the inhibiting substance in a spray. Alternative cartridges may contain marking substances, malodorants, siren or other irritants.

In a further embodiment, an electronics portion 1232 and an electronics button 1230 are included. The electronics button 1230 is a simple push (on/off) button that activates the functionality of the electronics section 1232 (i.e. electronics circuitry). Alternatively, the electronics button 1230 may actually be several buttons, depending on the functionality of the electronics portion 1232.

In one embodiment, the electronics button 1232 activates a panic feature such that a radio frequency (RF) transmitter (not shown) within the electronics section 1232 sends an RF signal from the multi-functional custom launch device 1200. The RF signal function may simply send a signal to an appropriate RF receiver in a custom home security system. For example, the RF signal instructs the home security system to automatically call the police or security. This feature may automatically occur during the launch of projectiles. This feature is very useful in a home security application, such that if a user (e.g. home owner) is required to use the launch device 1200 against an intruder, the electronics section 1232 will automatically send an RF signal to the home security system, which will respond by dialing the police or other security according to home security system protocol. Alternatively, the RF transmitter may send an RF signal to a nearby police vehicle which is then instructed to call in for backup. For example, the police vehicle that receives the RF signal from the multi-functional launch device 1200 will automatically radio headquarters or other nearby officers for backup according to a configured protocol.

The launching components of the multi-functional custom launch device 1200 (except for the projectiles 1204 themselves) are well known in the art of paint ball launchers. Rapid fire techniques and the structure enabling such techniques are further known in the art of paint ball launchers. The multi-functional custom launch device is a combination of known paint ball launching technologies and other known technologies incorporated into conventional flashlight packaging; thus, further explanation of the operation and construction of the launch device is not needed.

Referring next to FIG. 49, an end cross section view of the multi-functional custom launch device 1200 of FIG. 48 is shown. The end view illustrates the both the flashlight portion and the barrel of the non-lethal projectile launcher. Shown are the flashlight body head 1240, the bulb 1226, reflector 1224, and the barrel 1212. As can be seen, advantageously, the multi-functional custom launch device fires projectiles from the same end as the beam of the flashlight is emitted; thus, a target can be illuminated while firing a non-lethal projectile.

Figure 50:
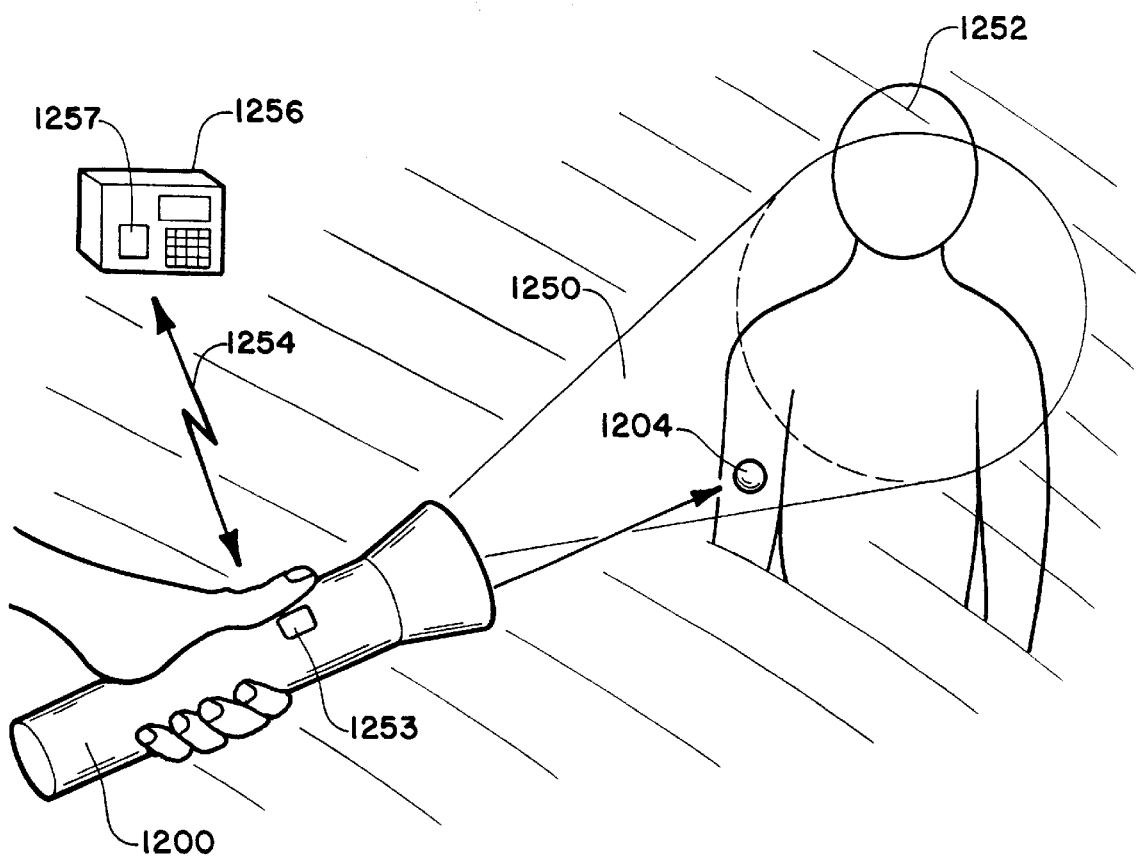
FIG. 50 is an illustration of the operation of the multi-functional launch device of FIGS. 48 and 49 such that while the flashlight is being operated, non-lethal projectiles may be launched from the barrel of the multi-functional launch device, and wherein an RF signal may be automatically transmitted to a respective security system.

Referring next to FIG. 50, an illustration is shown of the operation of the multi-functional launch device of FIGS. 48 and 49. Shown are the flashlight shaped multi-functional launch device 1200 including an RF transmitter 1253, beam of light 1250, non-lethal projectile 1204, target 1252, radio frequency signal 1254 (referred to as "RF signal 1254"), security system 1256 including an RF receiver 1257.

In operation, the user (for example, a home owner) is able to illuminate a target 1254 with the beam of light 1250 from the multi-functional launch device 1200, while at the same time, firing a non-lethal projectile 1204 at the target 1254. In this embodiment, upon firing a non-lethal projectile 1204, the RF transmitter 1253 of the multi-function launch device 1200 automatically sends an RF signal 1254 to the security system 1256, which is received by the RF receiver 1257. In response to the RF signal 1254, the security system 1256 automatically dials the police or other security for help.

Alternatively, this embodiment could be used by police officers, such that the RF signal 1254 is sent to an appropriate receiver within the police officer's squad car. The receiver in the squad car then radios other officers or police headquarters for backup. Thus, the multi-functional launch device 1200 provides paging functions, as well as the lighting functions and launcher functions. As can be readily seen in FIG. 50, the embodiment shown offers an advantage over the flashlight style custom launch devices shown in FIGS. 42, 44, and 45, since it does not have to be "turned backwards" to fire a non-lethal projectile. Turning the flashlight backwards, may interfere with the vision of the user, or enable the target to escape if the flashlight is turned off. Furthermore, advantageously, the launching of projectiles from the multi-functional launch device 1200 will automatically transmit an RF signal that causes the security or backup to be alerted, providing paging functions.

Figure 51:
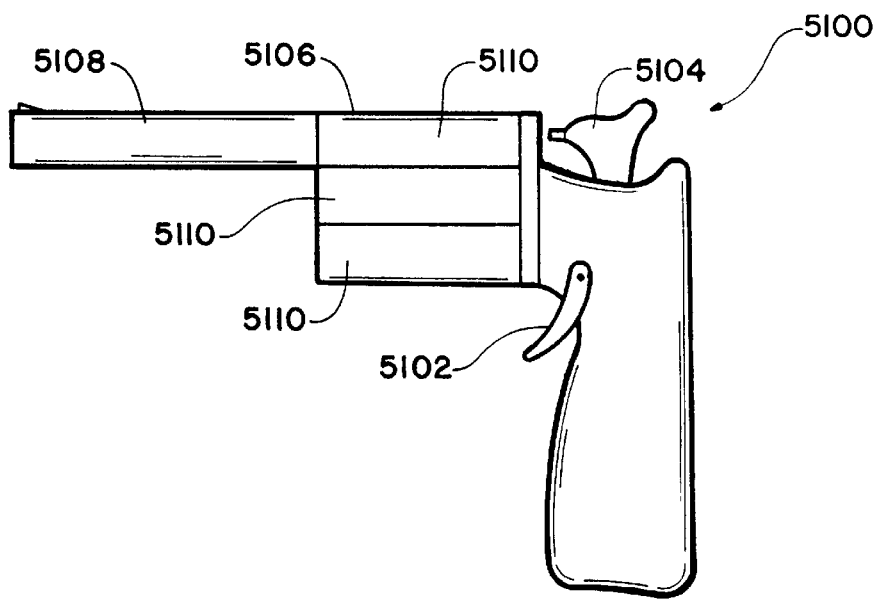
FIG. 51 is an illustration of a "six gun style" or revolver style non-lethal projectile launcher in accordance with a further embodiment of the present invention and capable of launching several of the embodiments and variations of the non-lethal projectiles described herein.

Referring next to FIG. 51, an illustration is shown of a "six-gun style" or "revolver-style" non-lethal projectile launcher in accordance with a further embodiment of the present invention and capable of launching several of the embodiments and variations of the non-lethal projectiles described herein. Shown is the launcher 5100 including a trigger 5102, spring driven hammer 5104 (also referred to as the hammer 5104), projectile cylinder 5106 (also referred to as the cylinder 5106) containing chambers 5110, and a barrel 5108.

In operation, non-lethal projectiles, such as described with reference to FIGS. 52 and 53 may be launched from a launcher 5100 very similar to pistol or cap gun. The trigger 5102 actuates the spring loaded hammer 5104 and moves a common cam and gear drive system that advances or rotates the cylinder 5106 to the next chamber 5110 for firing. The hammer 5104 contacts the rear of the projectile contained within the chamber 5110 causing the projectile be launched through the barrel 5108.

Figure 52:
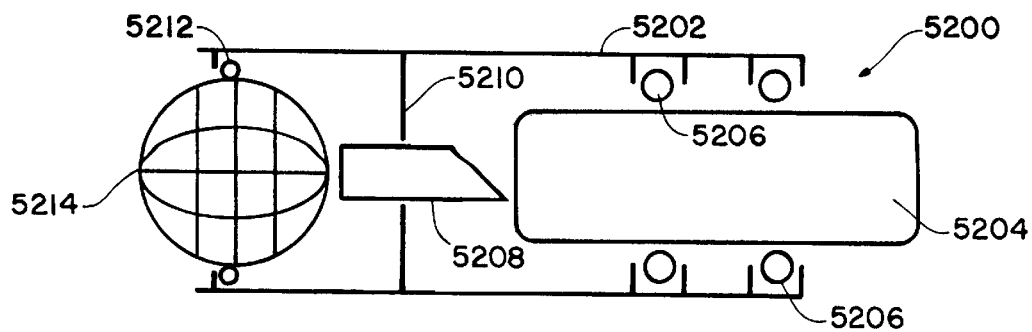
FIG. 52 is an illustration of a projectile system that may be used in firing the "six gun style" projectile launcher of FIG. 51.

Next referring to FIG. 52, an illustration is shown of a projectile system that may be used in firing the "six gun style" projectile launcher 5100 of FIG. 51. The projectile system 5200 includes a casing 5202, propellant canister 5204 (also referred to as a propellant or gas cartridge), canister seals 5206 (also referred to as o-rings 5206), an actuator 5208 (also referred to as a puncture pin), a projectile retaining seal 5212 (also referred to as o-ring 5212), wall 5210, and a projectile 5214 including optional scorings, either exterior or interior, as described above.

The casing 5202 is shaped to fit within a chamber 5110 of the cylinder 5106. The casing 5202 includes a propellant canister 5204 that contains a compressed gas, such as carbon dioxide, air, or nitrogen, at a relatively high pressure (e.g. between 400 and 4000 psi). The propellant canister 5204 is held in position within the casing 5202 by first the canister seals 5206. Ideally, these canister seals 5206 allow the propellant canister 5204 to be moved into the casing 5202 without allowing the propellant canister 5204 to slip or fall out of the casing 5202. Furthermore, they seal or prevent released compressed gas from exiting the rear of the casing 5202.

In operation, the hammer 5104 of the launcher 5100 impacts the propellant canister 5204, moving or forcing it into the actuator 5208, which contains a sharpened point or end. The actuator 5208 punctures the propellant canister 5204 and allows the compressed gas to escape the canister 5204. The compressed gas follows a path typically extending through a hollow opening within the actuator 5208 (i.e the actuator 5208 is hollow in this embodiment), which extends through wall 5210, directly behind the projectile 5214 to be launched. The projectile 5214 is held in position by the projectile retaining seal 5212. However, the release of the compressed gas behind the projectile 5214 and against the wall 5210 of the casing 5202 applies enough pressure against the projectile 5214 such that the projectile 5214 is pushed past or overcomes the retaining force of the projectile retaining seal 5212 and is propelled through the barrel 5108 at a high speed. Thus, the projectile 5214 is launched while the remainder of the casing 5202 remains in the chamber or is ejected from the chamber like a shotgun shell. Note that the propellant canister 5204 is held by the canister seals 5206 such that the canister 5204 is prevented from being pushed back away from the actuator by the first o-rings 5206 and the hammer 5104 contacting the propellant canister 5204. Furthermore, the canister seals 5206 prevent the released compressed gas from exiting the rear of the casing 5202 between the canister seals and the canister 5204; thus, substantially all of the pressure of the compressed gas is released behind and launches the projectile 5214 through the barrel 5108. Each projectile system 5200 is typically designed as a one-shot device, such that multiple projectile systems 5200 are loaded into the multi-chamber 5110 cylinder. The projectile systems 5200 may be discarded after use. It is noted that the skilled artist could easily slightly alter the interior of the projectile system 5200, such as the various components of the projectile system 5200, for example, the canister seals 5206, the projectile retaining seal 5212, and/or the shape and design of the actuator 5208, wall 5210, and propellant canister 5204 depending on the specific use of the projectile system 5200.

Figure 53:
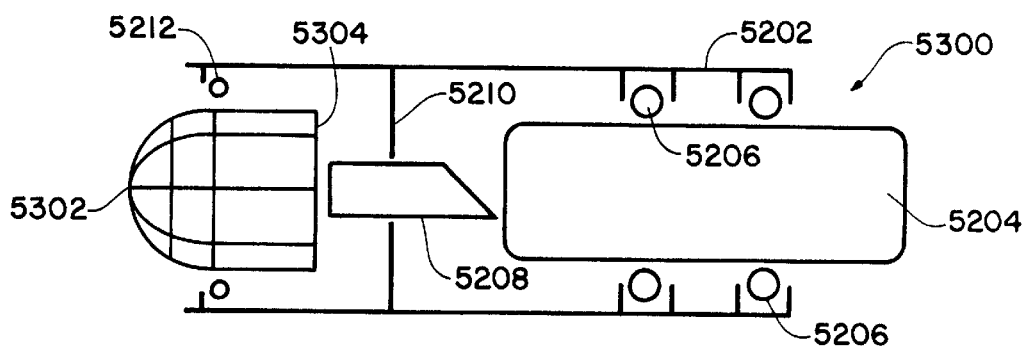
FIG. 53 is an illustration of a variation of the projectile of FIG. 52 to be used when firing the "six gun style" projectile launcher of FIG. 51.

Referring next to FIG. 53, an illustration is shown of a variation of the projectile system of FIG. 52 to be used in firing the "six gun style" projectile launcher 5100 of FIG. 51.

This embodiment of a projectile system 5300 is identical to the projectile system 5200 of FIG. 52 except that the projectile 5302 is shaped differently than the projectile 5214 of FIG. 52. The projectile 5302 is shaped as having a flat rear surface 5304. Advantageously, the flat rear surface 5304 provides a large surface for the released compressed gas to effectively "push" against. Thus, the projectile 5302 may more easily overcome the projectile retaining seal 5212 than the projectile 5214 of FIG. 52.

Figure 54:
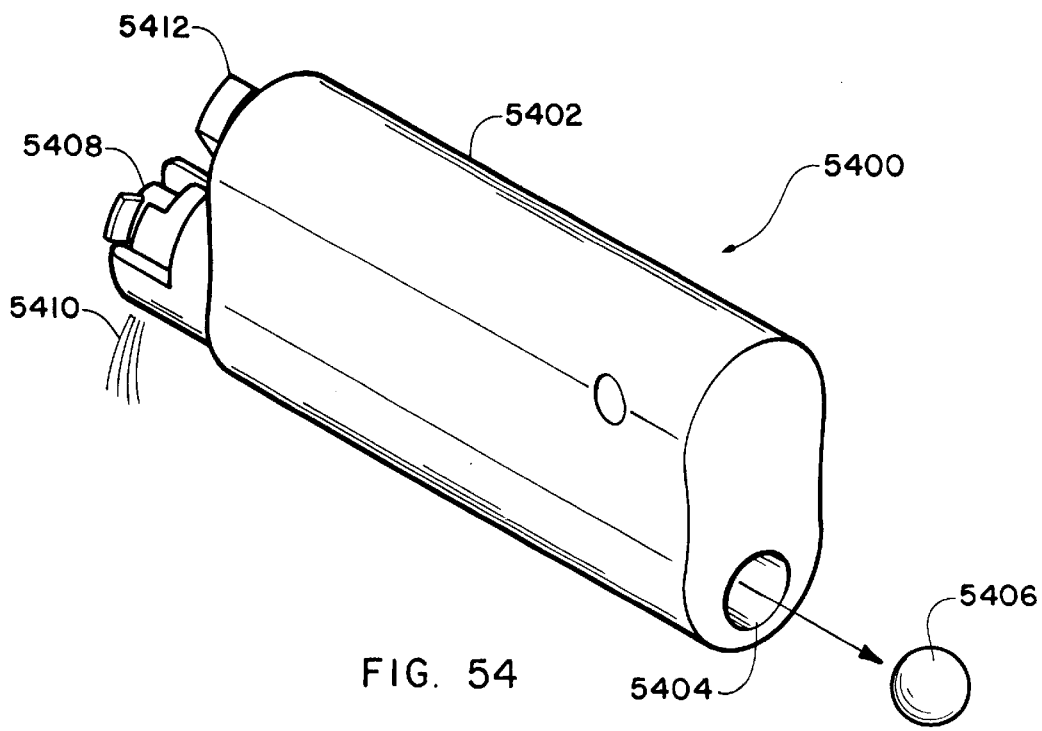
FIG. 54 is a perspective view of a hand-held, multi-functional, non-lethal projectile launcher in accordance with another embodiment of the invention.

And finally, referring next to FIG. 54, a perspective view is shown of a handheld, multi-functional non-lethal projectile launcher capable of launching non-lethal projectile systems as described above and also capable of being used as an inhibiting spray device. Shown is the multi-functional launch device 5400 having a launcher body 5402 including the launch barrel 5404 at one end of the launcher body 5402 and extending into the launcher body 5402, and a non-lethal projectile 5406 being fired from the launch barrel 5404. Further illustrated at the other side or end of the launcher body 5402 is a spray nozzle 5408 coupled to a spray canister (not shown) contained within the launcher body 5402. The spray nozzle 5408 emits a spray of an inhibiting substance (shown as spray 5410), such as pepper spray, tear gas, mace, etc. upon depressing the spray nozzle 5408. The spray nozzle 5408 may be equipped with a cap or other structure that prevents the spray nozzle 5408 from being depressed accidentally. Also shown is a firing button 5412 which, when engaged, causes the non-lethal projectile 5406 to be fired from the launch barrel 5404. Similarly, a safety feature may be included that prevents accidental launching of one or more non-lethal projectiles 5406. This safety feature may be embodied at the location of firing button 5412, such that the firing button is placed at another location on the launcher body 5402.

This embodiment is intended to be a small handheld personal safety device that may be placed in a pocket or purse to inhibit a target, e.g. an attacker before the attacker gets too close, for example, by launching a non-lethal projectile at the attacker. Advantageously, the device further includes a spray nozzle 5408 and canister to be used at very close ranges and eliminates the need to have two separate personal safety devices, contained, for example, within a users purse.

Although, the specific internal composition is not shown, the skilled artist could easily construct such an embodiment given the earlier descriptions, for example, with reference to FIGS. 46 through 49, by simply conforming the components found in conventional paint ball launchers and the components found in conventional hand held inhibiting spray devices into a body of a small hand held personal safety device, or multi-functional non-lethal projectile launcher. For example, hand held spray devices are known in the art and include spray nozzles and spray canisters.

Additionally, such hand held paint ball launcher technology is well known in the art; however, in this case is simply being applied in a different size constraint, for example, a differently sized and shaped launcher body 5402. For example, the launcher body 5402 may include, as earlier described, an inhibiting spray canister, a spray nozzle, a propellant canister, an actuator (controlled by the firing button 5412) for releasing pressurized gas from the canister behind a non-lethal projectile, a bolt assembly (or equivalent thereof), a regulator, a retaining assembly and a reservoir holding, for example, up to 6 non-lethal projectiles 5406.

While the invention herein disclosed has been described by means of specific embodiments and applications thereof, numerous modifications and variations could be made thereto by those skilled in the art without departing from the scope of the invention as set forth in the claims.

What is claimed is:

1. A system comprising:

a frangible projectile to be impacted with a target;

the frangible projectile comprising a rigid frangible shell having a thickness and a volume formed within, wherein the rigid rangible shell ruptures upon impact with the target; and a substance contained within the volume and occupying at least about 50% of the volume;

wherein the substance comprises a powdered inhibiting substance, wherein upon impact with the target the rigid frangible shell ruptures, thereby radially dispersing the powdered inhibiting substance proximate to the target into a cloud; and wherein the rigid frangible shell comprises:

a first part;

a second part attached to the first part to contain the volume, the volume being formed within the first part and the second part;

a fill hole formed within the second part, the second part including a flange at a perimeter of the fill hole; and a third part having a rim seated against the fill hole and a portion of the third part overlapping the flange.

2. The system of claim 1 wherein the frangible projectile is without a cartridge containing an ignitable powder for launching the frangible projectile.

3. The system of claim 1 further comprising a compressed gas launcher for launching the frangible projectile.

4. The system of claim 1 wherein the rigid frangible shell includes a material selected from the group consisting of polymers and plastics.

5. The system of claim 1 wherein the rigid frangible shell further comprises at least one structurally weakening feature.

6. The system of claim 1 wherein the substance further comprises a solid substance contained within the volume.

7. The system of claim 1 wherein the substance further comprises a weighting substance contained with the volume.

8. The system of claim 1 wherein the substance further comprises a marking substance contained within the volume.

9. The system of claim 1 wherein the powdered inhibiting substance includes at least one of capsaicin, dihydrocapsaicin, nordihydrocapsaicin, and nonivamide.

10. The system of claim 1 wherein the powdered inhibiting substance includes a capsaicinoid wherein the capsaicinoid is one of three capsaicinoids: capsaicin, dihydrtcapsaicin, and nordihydrocapsaicin.

11. The system of claim 1 wherein the powdered inhibiting substance comprises at least 0.1% of capsaicin by volume.

12. The system of claim 1 wherein the powdered inhibiting substance comprises at least 1% of capasaicin by volume.

13. The system of claim 1 wherein the powdered inhibiting substance comprises a powdered substance having particle sizes less than 1000 microns in diameter.

\* \* \* \* \*